(12) United States Patent
Morgan et al.

(10) Patent No.: US 11,486,593 B2
(45) Date of Patent: Nov. 1, 2022

(54) SYSTEMS AND METHODS WITH VARIABLE MITIGATION THRESHOLDS

(71) Applicant: EMERSON CLIMATE TECHNOLOGIES, INC., Sidney, OH (US)

(72) Inventors: Stuart K. Morgan, West Chester, OH (US); Hung Pham, Dayton, OH (US); Brian R. Butler, Centerville, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 55 days.

(21) Appl. No.: 17/078,019

(22) Filed: Oct. 22, 2020

(65) Prior Publication Data
US 2021/0041118 A1 Feb. 11, 2021

Related U.S. Application Data

(63) Continuation of application No. 17/048,982, filed as application No. PCT/US2019/028408 on Apr. 19, 2019.

(Continued)

(51) Int. Cl.
*F24F 3/16* (2021.01)
*F24F 3/14* (2006.01)
(Continued)

(52) U.S. Cl.
CPC ............. *F24F 3/16* (2013.01); *F24F 3/14* (2013.01); *F24F 7/00* (2013.01); *F24F 11/30* (2018.01);
(Continued)

(58) Field of Classification Search
CPC .... F24F 3/16; F24F 11/64; F24F 11/30; F24F 3/14; F24F 7/00; F24F 2110/70;
(Continued)

(56) References Cited

U.S. PATENT DOCUMENTS 4,135,370 A 1/1979 Hosoda et al.
4,136,529 A 1/1979 McCarty
(Continued)

FOREIGN PATENT DOCUMENTS

CN 102019120 A 4/2011
CN 102353751 A 2/2012
(Continued)

OTHER PUBLICATIONS

Josef Ammann, Process for Regulating Room Temperature by Using an Air Conditioning Apparatus with a Ventilator Switched Step-By-Step (WO 9616363A1 Translation), Nov. 22, 1994, Espacenet machine translation (Year: 1994).*

(Continued)

*Primary Examiner* — Rocio Del Mar Perez-Velez
*Assistant Examiner* — Christopher W Carter
(74) *Attorney, Agent, or Firm* — Harness, Dickey & Pierce, P.L.C.

(57) ABSTRACT

An indoor air quality (IAQ) system for a building includes an IAQ sensor that is located within the building and that is configured to measure an IAQ parameter. The IAQ parameter is one of: an amount of particulate of at least a predetermined size present in air; an amount of volatile organic compounds (VOCs) present in air; and an amount of carbon dioxide present in air. A mitigation module is configured to: selectively turn on a mitigation device based on a comparison of the IAQ parameter with a first ON threshold and a second ON threshold; and selectively turn off the mitigation device based on a comparison of the IAQ parameter with an OFF threshold. A clean module is configured to determine a clean value for the IAQ parameter. A thresholds module is configured to, based on the clean value, determine the first ON threshold and the OFF threshold.

14 Claims, 29 Drawing Sheets

Related U.S. Application Data

(60) Provisional application No. 62/660,354, filed on Apr. 20, 2018.

(51) Int. Cl.
*F24F 7/00* (2021.01)
*F24F 11/30* (2018.01)
*G05B 19/042* (2006.01)
*F24F 11/64* (2018.01)
*F24F 110/10* (2018.01)
*F24F 110/66* (2018.01)
*F24F 110/70* (2018.01)

(52) U.S. Cl.
CPC ............ *F24F 11/64* (2018.01); *G05B 19/042* (2013.01); *F24F 2110/10* (2018.01); *F24F 2110/66* (2018.01); *F24F 2110/70* (2018.01); *G05B 2219/2614* (2013.01)

(58) Field of Classification Search
CPC .............. F24F 2110/66; F24F 2110/10; G05B 2219/2614; G05B 19/042
USPC ........................................................ 700/276
See application file for complete search history.

(56) References Cited

U.S. PATENT DOCUMENTS

| | | | |
|---|---|---|---|
| 4,735,054 A | 4/1988 | Beckey | |
| 4,873,649 A | 10/1989 | Grald et al. | |
| 4,922,808 A | 5/1990 | Smith | |
| 4,977,818 A | 12/1990 | Taylor et al. | |
| 5,067,394 A | 11/1991 | Cavallero | |
| 5,129,234 A | 7/1992 | Alford | |
| 5,259,553 A | 11/1993 | Shyu | |
| 5,267,897 A | 12/1993 | Drees | |
| 5,303,561 A | 4/1994 | Bahel et al. | |
| 5,351,855 A | 10/1994 | Nelson et al. | |
| 5,394,934 A | 3/1995 | Rein et al. | |
| 5,428,964 A | 7/1995 | Lobdell | |
| 5,520,328 A | 5/1996 | Bujak, Jr. | |
| 5,598,715 A | 2/1997 | Edmisten | |
| 5,707,005 A | 1/1998 | Kettler et al. | |
| 5,832,411 A | 11/1998 | Schatzmann et al. | |
| 5,887,784 A | 3/1999 | Haas | |
| 5,892,690 A | 4/1999 | Boatman et al. | |
| 5,904,896 A | 5/1999 | High | |
| 5,915,473 A * | 6/1999 | Ganesh ................ F24F 11/0008 165/230 |
| 6,161,764 A | 12/2000 | Jatnieks | |
| 6,187,263 B1 | 2/2001 | Nielsen | |
| 6,230,980 B1 | 5/2001 | Hudson | |
| 6,251,344 B1 | 6/2001 | Goldstein | |
| 6,288,646 B1 | 9/2001 | Skardon | |
| 6,358,374 B1 | 3/2002 | Obee et al. | |
| 6,369,716 B1 | 4/2002 | Abbas et al. | |
| 6,377,858 B1 | 4/2002 | Koeppe | |
| 6,391,102 B1 | 5/2002 | Bodden et al. | |
| 6,392,536 B1 | 5/2002 | Tice et al. | |
| 6,394,427 B1 | 5/2002 | Guetersloh et al. | |
| 6,406,367 B1 | 6/2002 | Chou et al. | |
| 6,406,506 B1 | 6/2002 | Moredock et al. | |
| 6,423,118 B1 | 7/2002 | Becerra et al. | |
| 6,448,896 B1 | 9/2002 | Bankus et al. | |
| 6,466,133 B1 | 10/2002 | Skardon | |
| 6,493,638 B1 | 12/2002 | McLean et al. | |
| 6,494,053 B1 | 12/2002 | Forkosh et al. | |
| 6,494,940 B1 | 12/2002 | Hak | |
| 6,503,462 B1 | 1/2003 | Michalakos et al. | |
| 6,557,365 B2 | 5/2003 | Dinnage et al. | |
| 6,578,770 B1 | 6/2003 | Rosen | |
| 6,582,295 B1 | 6/2003 | Abouchaar | |
| 6,588,250 B2 | 7/2003 | Schell | |
| 6,622,993 B2 | 9/2003 | Mulvaney | |
| 6,691,526 B2 | 2/2004 | Gether et al. | |
| 6,698,219 B2 | 3/2004 | Sekhar et al. | |
| 6,711,470 B1 | 3/2004 | Hartenstein et al. | |
| 6,752,713 B2 | 6/2004 | Johnson, Jr. | |
| 6,790,136 B2 | 9/2004 | Sharp et al. | |
| 6,826,920 B2 | 12/2004 | Wacker | |
| 6,843,068 B1 | 1/2005 | Wacker | |
| 6,848,266 B1 | 2/2005 | Sheehan | |
| 6,884,399 B2 | 4/2005 | Reisfeld et al. | |
| 6,898,960 B1 | 5/2005 | Bodnar | |
| 6,902,592 B2 | 6/2005 | Green et al. | |
| 6,916,239 B2 | 7/2005 | Siddaramanna et al. | |
| 6,919,809 B2 | 7/2005 | Blunn et al. | |
| 6,920,874 B1 | 7/2005 | Siegel | |
| 6,924,326 B2 | 8/2005 | Meyer et al. | |
| 6,926,079 B2 | 8/2005 | Kensok et al. | |
| 6,941,193 B2 | 9/2005 | Frecska et al. | |
| 6,952,715 B1 | 10/2005 | Kronz | |
| 7,016,791 B2 | 3/2006 | Carnegie et al. | |
| 7,048,776 B2 | 5/2006 | Moore et al. | |
| 7,059,400 B2 | 6/2006 | Sekhar et al. | |
| 7,114,343 B2 | 10/2006 | Kates | |
| 7,151,264 B2 | 12/2006 | Ehlers, Sr. | |
| 7,178,350 B2 | 2/2007 | Shah | |
| 7,186,290 B2 | 3/2007 | Sheehan et al. | |
| 7,222,494 B2 | 5/2007 | Peterson et al. | |
| 7,241,326 B2 | 7/2007 | Han et al. | |
| 7,253,743 B2 | 8/2007 | Liang et al. | |
| 7,255,831 B2 | 8/2007 | Wei et al. | |
| 7,261,762 B2 | 8/2007 | Kang et al. | |
| 7,266,960 B2 | 9/2007 | Shah | |
| 7,267,017 B1 | 9/2007 | Bodnar | |
| RE39,871 E | 10/2007 | Skardon | |
| 7,291,206 B1 | 11/2007 | Kiern et al. | |
| 7,291,315 B2 | 11/2007 | Obee et al. | |
| 7,302,313 B2 | 11/2007 | Sharp et al. | |
| 7,306,650 B2 | 12/2007 | Slayzak et al. | |
| 7,325,748 B2 | 2/2008 | Acker, Jr. | |
| 7,326,388 B2 | 2/2008 | Uslenghi et al. | |
| 7,357,828 B2 | 4/2008 | Bohlen | |
| 7,366,588 B2 | 4/2008 | Kim et al. | |
| 7,368,003 B2 | 5/2008 | Crapser et al. | |
| 7,369,955 B2 | 5/2008 | Lee | |
| 7,378,064 B2 | 5/2008 | Uslenghi et al. | |
| 7,381,244 B2 | 6/2008 | Tyndall et al. | |
| 7,389,158 B2 | 6/2008 | Desrochers et al. | |
| 7,398,821 B2 | 7/2008 | Rainer et al. | |
| 7,407,624 B2 | 8/2008 | Cumberland et al. | |
| 7,413,594 B2 | 8/2008 | Paterson et al. | |
| 7,434,413 B2 | 10/2008 | Wruck | |
| 7,475,828 B2 | 1/2009 | Bartlett et al. | |
| 7,552,030 B2 | 6/2009 | Guralnik et al. | |
| 7,552,635 B2 | 6/2009 | Chang et al. | |
| 7,574,871 B2 | 8/2009 | Bloemer et al. | |
| 7,621,985 B1 | 11/2009 | Kuo | |
| 7,632,178 B2 | 12/2009 | Meneely, Jr. | |
| 7,632,340 B2 | 12/2009 | Brady et al. | |
| 7,635,845 B2 | 12/2009 | Jensen et al. | |
| 7,645,323 B2 | 1/2010 | Massenbauer-Strafe et al. | |
| 7,651,256 B2 | 1/2010 | Lee et al. | |
| 7,721,560 B2 | 5/2010 | Carpenter | |
| 7,740,184 B2 | 6/2010 | Schnell et al. | |
| 7,748,639 B2 | 7/2010 | Perry | |
| 7,758,408 B2 | 7/2010 | Hagentoft | |
| 7,765,792 B2 | 8/2010 | Rhodes et al. | |
| 7,780,092 B2 | 8/2010 | Ahmed | |
| 7,789,951 B2 | 9/2010 | Sung et al. | |
| 7,809,472 B1 | 10/2010 | Silva et al. | |
| 7,811,363 B2 | 10/2010 | Zhang | |
| 7,836,712 B2 | 11/2010 | Sasao et al. | |
| 7,837,958 B2 | 11/2010 | Crapser et al. | |
| 7,839,275 B2 | 11/2010 | Spalink et al. | |
| 7,857,884 B2 | 12/2010 | Bohlen | |
| 7,857,890 B2 | 12/2010 | Paterson et al. | |
| 7,918,407 B2 | 4/2011 | Patch | |
| 7,932,490 B2 | 4/2011 | Wang et al. | |
| 7,938,896 B2 | 5/2011 | Paterson et al. | |
| 7,951,327 B2 | 5/2011 | Reisfeld et al. | |
| 7,966,104 B2 | 6/2011 | Srivastava et al. | |

(56) References Cited

U.S. PATENT DOCUMENTS

| | | |
|---|---|---|
| 7,979,163 B2 | 7/2011 | Terlson et al. |
| 8,024,982 B2 | 9/2011 | Pettit et al. |
| 8,024,986 B2 | 9/2011 | Pettit et al. |
| 8,066,558 B2 | 11/2011 | Thomle et al. |
| 8,079,575 B2 | 12/2011 | Novotny et al. |
| 8,083,398 B2 | 12/2011 | Doll |
| 8,086,407 B2 | 12/2011 | Chan et al. |
| 8,097,067 B2 | 1/2012 | Fox et al. |
| 8,118,236 B2 | 2/2012 | Lestage et al. |
| 8,147,302 B2 | 4/2012 | Desrochers et al. |
| 8,172,154 B1 | 5/2012 | Figley et al. |
| 8,190,367 B2 | 5/2012 | Bassa |
| 8,219,249 B2 | 7/2012 | Harrod et al. |
| 8,231,112 B2 | 7/2012 | Cao et al. |
| 8,231,716 B2 | 7/2012 | Poon |
| 8,239,066 B2 | 8/2012 | Jennings et al. |
| 8,267,164 B2 | 9/2012 | Lestage et al. |
| 8,292,270 B2 | 10/2012 | Terlson et al. |
| 8,318,084 B2 | 11/2012 | Johnson et al. |
| 8,328,910 B2 | 12/2012 | Mulholland |
| 8,333,816 B2 | 12/2012 | Kummer et al. |
| 8,335,593 B2 | 12/2012 | Johnson et al. |
| 8,347,643 B2 | 1/2013 | Taras et al. |
| 8,392,025 B2 | 3/2013 | Orfield |
| 8,397,522 B2 | 3/2013 | Springer et al. |
| 8,398,917 B2 | 3/2013 | Itzhak et al. |
| 8,398,923 B2 | 3/2013 | Mole |
| 8,402,815 B2 | 3/2013 | Marra |
| 8,423,192 B2 | 4/2013 | Liu |
| 8,428,901 B2 | 4/2013 | Hsieh |
| 8,442,694 B2 | 5/2013 | Jang |
| 8,467,977 B2 | 6/2013 | Xia et al. |
| 8,473,429 B2 | 6/2013 | Cheng et al. |
| 8,479,560 B2 | 7/2013 | Cobianu et al. |
| 8,492,722 B2 | 7/2013 | Chang et al. |
| 8,496,514 B2 | 7/2013 | Kim et al. |
| 8,496,735 B2 | 7/2013 | Jones et al. |
| 8,529,830 B2 | 9/2013 | Zhou et al. |
| 8,544,288 B2 | 10/2013 | MacDonald |
| 8,554,375 B2 | 10/2013 | Nerling |
| 8,555,662 B2 | 10/2013 | Peterson et al. |
| 8,560,126 B2 | 10/2013 | Vass et al. |
| 8,567,204 B2 | 10/2013 | Seem |
| 8,574,343 B2 | 11/2013 | Bisson et al. |
| 8,615,327 B2 | 12/2013 | Takagi et al. |
| 8,640,970 B2 | 2/2014 | Dorendorf |
| 8,651,391 B2 | 2/2014 | Patch |
| 8,683,845 B2 | 4/2014 | Fleischer et al. |
| 8,689,572 B2 | 4/2014 | Evans et al. |
| 8,691,144 B2 | 4/2014 | Garfield et al. |
| 8,696,800 B2 | 4/2014 | Storm |
| 8,700,227 B2 | 4/2014 | Vass et al. |
| 8,726,721 B2 | 5/2014 | Minges |
| 8,734,565 B2 | 5/2014 | Hoglund et al. |
| 8,744,629 B2 | 6/2014 | Wallaert et al. |
| 8,755,942 B2 | 6/2014 | Bonilla et al. |
| 8,757,154 B2 | 6/2014 | Schuller |
| 8,758,262 B2 | 6/2014 | Rhee et al. |
| 8,761,945 B2 | 6/2014 | Hadzidedic |
| 8,768,521 B2 | 7/2014 | Amundson et al. |
| 8,797,159 B2 | 8/2014 | Kirkpatrick et al. |
| 8,813,583 B2 | 8/2014 | Klips et al. |
| 8,838,037 B2 | 9/2014 | Niederberger et al. |
| 8,852,501 B2 | 10/2014 | Hedman |
| 8,860,569 B2 | 10/2014 | Hruska et al. |
| 8,880,224 B2 | 11/2014 | Eaton et al. |
| 8,883,083 B2 | 11/2014 | Law et al. |
| 8,886,785 B2 | 11/2014 | Apte et al. |
| 8,889,079 B2 | 11/2014 | Zahedi |
| 8,892,797 B2 | 11/2014 | Grohman |
| 8,899,055 B2 | 12/2014 | Kuenzel et al. |
| 8,900,518 B2 | 12/2014 | Seek |
| 8,907,803 B2 | 12/2014 | Martin |
| 8,920,537 B2 | 12/2014 | Seike |
| 8,922,971 B2 | 12/2014 | Abate et al. |
| 8,930,030 B2 | 1/2015 | Bester et al. |
| 8,955,761 B2 | 2/2015 | Malloy |
| 8,958,918 B2 | 2/2015 | Voysey |
| 8,961,881 B2 | 2/2015 | Hagh et al. |
| 8,963,728 B2 | 2/2015 | Kates |
| 8,973,845 B2 | 3/2015 | Kanaya et al. |
| 8,978,445 B2 | 3/2015 | Bergsten |
| 8,986,427 B2 | 3/2015 | Hauville et al. |
| 9,010,172 B2 | 4/2015 | Xia et al. |
| 9,019,111 B1 | 4/2015 | Sloo et al. |
| 9,023,304 B2 | 5/2015 | Nikles |
| 9,040,007 B2 | 5/2015 | Hui et al. |
| 9,040,008 B2 | 5/2015 | Zahedi |
| 9,061,230 B2 | 6/2015 | Barakat |
| 9,073,009 B2 | 7/2015 | Vanderspurt et al. |
| 9,078,082 B2 | 7/2015 | Gill et al. |
| 9,080,784 B2 | 7/2015 | Dean-Hendricks et al. |
| 9,091,497 B2 | 7/2015 | Schwendinger et al. |
| 9,092,040 B2 | 7/2015 | Fadell et al. |
| 9,095,636 B2 | 8/2015 | Schmidt et al. |
| 9,097,432 B2 | 8/2015 | Kreft et al. |
| 9,101,904 B2 | 8/2015 | Yates et al. |
| 9,103,557 B2 | 8/2015 | Choi et al. |
| 9,109,981 B2 | 8/2015 | Sharp |
| 9,109,989 B2 | 8/2015 | Hamann et al. |
| 9,121,618 B2 | 9/2015 | Fisher et al. |
| 9,121,837 B2 | 9/2015 | Chan et al. |
| 9,143,344 B2 | 9/2015 | Cho et al. |
| 9,157,647 B2 | 10/2015 | Leen et al. |
| 9,164,519 B2 | 10/2015 | Holloway |
| 9,166,992 B1 | 10/2015 | Stickle et al. |
| 9,175,872 B2 | 11/2015 | McKie et al. |
| 9,182,751 B1 | 11/2015 | Reeder |
| 9,186,609 B2 | 11/2015 | Sherman, III et al. |
| 9,200,804 B2 | 12/2015 | Park et al. |
| 9,208,676 B2 | 12/2015 | Fadell et al. |
| 9,233,472 B2 | 1/2016 | Angle et al. |
| 9,234,667 B2 | 1/2016 | Ito et al. |
| 9,250,633 B2 | 2/2016 | Chen et al. |
| 9,254,459 B2 | 2/2016 | Miller |
| 9,261,290 B2 | 2/2016 | Storm |
| 9,278,304 B2 | 3/2016 | Lee |
| 9,280,884 B1 | 3/2016 | Schultz et al. |
| 9,286,779 B2 | 3/2016 | Shaw et al. |
| 9,304,511 B2 | 4/2016 | Blount et al. |
| 9,304,521 B2 | 4/2016 | Kates |
| 9,308,492 B2 | 4/2016 | Obee et al. |
| 9,310,088 B2 | 4/2016 | Melikov et al. |
| 9,311,807 B2 | 4/2016 | Schultz et al. |
| 9,316,410 B2 | 4/2016 | Meirav et al. |
| 9,317,659 B2 | 4/2016 | Balinski et al. |
| 9,323,895 B2 | 4/2016 | Balinski et al. |
| 9,325,516 B2 | 4/2016 | Pera et al. |
| 9,328,936 B2 | 5/2016 | Meirav et al. |
| 9,332,322 B2 | 5/2016 | Niemeyer et al. |
| 9,344,753 B2 | 5/2016 | Yerli |
| 9,347,678 B2 | 5/2016 | Stakutis et al. |
| 9,347,860 B1 | 5/2016 | Lalain et al. |
| 9,347,925 B2 | 5/2016 | Shen et al. |
| 9,353,964 B2 | 5/2016 | Kates |
| 9,353,966 B2 | 5/2016 | Finkam |
| 9,360,229 B2 | 6/2016 | Modi et al. |
| 9,366,448 B2 | 6/2016 | Dean-Hendricks et al. |
| 9,372,010 B2 | 6/2016 | Jung et al. |
| 9,375,672 B2 | 6/2016 | Meirav et al. |
| 9,375,847 B2 | 6/2016 | Angle et al. |
| 9,377,768 B2 | 6/2016 | Grohman |
| 9,390,388 B2 | 7/2016 | Drees et al. |
| 9,395,096 B2 | 7/2016 | Fisher et al. |
| 9,399,187 B2 | 7/2016 | Meirav et al. |
| 9,400,119 B2 | 7/2016 | Malloy |
| 9,404,666 B2 | 8/2016 | Terlson et al. |
| 9,405,301 B2 | 8/2016 | Montero et al. |
| 9,406,212 B2 | 8/2016 | De Luca et al. |
| 9,410,752 B2 | 8/2016 | Wallace |
| 9,416,987 B2 | 8/2016 | Ragland et al. |
| 9,417,005 B1 | 8/2016 | Roth et al. |
| 9,417,637 B2 | 8/2016 | Matsuoka et al. |
| 9,423,144 B2 | 8/2016 | Evans et al. |

(56) References Cited

U.S. PATENT DOCUMENTS

| | | |
|---|---|---|
| 9,423,146 B2 | 8/2016 | Bruce et al. |
| 9,427,728 B2 | 8/2016 | Sidheswaran et al. |
| 9,449,491 B2 | 9/2016 | Sager et al. |
| 9,459,606 B2 | 10/2016 | Takayama et al. |
| 9,463,339 B2 | 10/2016 | Nozaki |
| 9,464,818 B2 | 10/2016 | Holm et al. |
| 9,498,555 B2 | 11/2016 | Hingorani et al. |
| 9,520,250 B2 | 12/2016 | O'Keeffe |
| 9,522,210 B2 | 12/2016 | Worrilow |
| 9,523,665 B2 | 12/2016 | Fleischer et al. |
| 9,535,407 B2 | 1/2017 | Durham et al. |
| 9,537,670 B2 | 1/2017 | Cho et al. |
| 9,557,069 B2 | 1/2017 | Matsui et al. |
| 9,568,445 B2 | 2/2017 | Klein et al. |
| 9,593,859 B2 | 3/2017 | Niazi |
| 9,593,861 B1 | 3/2017 | Burnett |
| 9,597,627 B2 | 3/2017 | Zhang |
| 9,599,353 B2 | 3/2017 | Cur et al. |
| 9,599,357 B2 | 3/2017 | Vogel |
| 9,612,188 B2 | 4/2017 | Johnston et al. |
| 9,618,224 B2 | 4/2017 | Emmons et al. |
| 9,638,434 B2 | 5/2017 | Alston |
| 9,638,436 B2 | 5/2017 | Arensmeier et al. |
| 9,643,117 B2 | 5/2017 | Rahlin et al. |
| 9,645,112 B2 | 5/2017 | Chan |
| 9,677,777 B2 | 6/2017 | Karamanos et al. |
| 9,694,309 B2 | 7/2017 | Weatherman et al. |
| 9,696,049 B2 | 7/2017 | Metteer |
| 9,696,735 B2 | 7/2017 | Matsuoka et al. |
| 9,709,291 B2 | 7/2017 | Dostmann |
| 9,714,844 B1 | 7/2017 | Stamatakis et al. |
| 9,715,242 B2 | 7/2017 | Pillai et al. |
| 9,723,380 B2 | 8/2017 | Patel et al. |
| 9,726,579 B2 | 8/2017 | Han et al. |
| 9,729,945 B2 | 8/2017 | Schultz et al. |
| 9,737,842 B2 | 8/2017 | Matlin et al. |
| 9,752,789 B2 | 9/2017 | Staniforth et al. |
| 9,759,437 B2 | 9/2017 | Kim et al. |
| 9,789,436 B2 | 10/2017 | Meirav et al. |
| 9,797,620 B2 | 10/2017 | Matsugi et al. |
| 9,797,812 B2 | 10/2017 | Hamann et al. |
| 9,798,309 B2 | 10/2017 | Tirpak |
| 9,802,322 B2 | 10/2017 | Angle et al. |
| 9,803,877 B2 | 10/2017 | Yun |
| 9,810,441 B2 | 11/2017 | Dean-Hendricks et al. |
| 9,816,724 B2 | 11/2017 | Phannavong et al. |
| 9,821,260 B2 | 11/2017 | Stoner, Jr. et al. |
| 9,833,734 B2 | 12/2017 | Fox et al. |
| 9,835,348 B2 | 12/2017 | Storm et al. |
| 9,839,872 B2 | 12/2017 | Spartz |
| 9,851,299 B2 | 12/2017 | Bertaux |
| 9,854,335 B2 | 12/2017 | Patel et al. |
| 9,856,883 B1 | 1/2018 | Olsen |
| 9,857,301 B1 | 1/2018 | Nourbakhsh et al. |
| 9,874,873 B2 | 1/2018 | Angle et al. |
| 9,890,969 B2 | 2/2018 | Martin |
| 9,986,313 B2 | 5/2018 | Schwarzkopf et al. |
| 9,990,842 B2 | 6/2018 | Zribi et al. |
| 10,139,384 B1 | 11/2018 | Nourbakhsh |
| 10,222,360 B1 | 3/2019 | Nourbakhsh et al. |
| 10,650,621 B1 | 5/2020 | King et al. |
| 10,712,036 B2 | 7/2020 | Mowris et al. |
| 11,232,655 B2 | 1/2022 | Bhattacharyya et al. |
| 2003/0070544 A1 | 4/2003 | Mulvaney et al. |
| 2005/0076655 A1 | 4/2005 | Wong |
| 2005/0098495 A1 | 5/2005 | Hughes |
| 2005/0277381 A1 | 12/2005 | Banerjee et al. |
| 2006/0055547 A1 | 3/2006 | DiMaggio |
| 2006/0267756 A1 | 11/2006 | Kates |
| 2007/0013534 A1 | 1/2007 | DiMaggio |
| 2007/0082601 A1 | 4/2007 | Desrochers et al. |
| 2007/0155305 A1 | 7/2007 | Heidel et al. |
| 2008/0014857 A1 | 1/2008 | Spadafora et al. |
| 2008/0022705 A1 | 1/2008 | Clearman |
| 2008/0078842 A1 | 4/2008 | MacDonald |
| 2008/0182506 A1* | 7/2008 | Jackson .......... F24F 11/30 454/354 |
| 2008/0315000 A1 | 12/2008 | Gorthala et al. |
| 2009/0079098 A1 | 3/2009 | Ezra |
| 2009/0126382 A1 | 5/2009 | Rubino et al. |
| 2009/0179338 A1 | 7/2009 | Cottier |
| 2009/0204262 A1 | 8/2009 | Nishimura |
| 2010/0241287 A1 | 9/2010 | Nishino et al. |
| 2011/0010071 A1 | 1/2011 | Rhodes et al. |
| 2011/0125044 A1 | 5/2011 | Rhee et al. |
| 2011/0151766 A1 | 6/2011 | Sherman et al. |
| 2011/0184250 A1 | 7/2011 | Schmidt et al. |
| 2012/0095684 A1 | 4/2012 | Chan et al. |
| 2012/0150333 A1 | 6/2012 | De Luca et al. |
| 2012/0323374 A1 | 12/2012 | Dean-Hendricks et al. |
| 2013/0014522 A1 | 1/2013 | Lukasse et al. |
| 2013/0085613 A1 | 4/2013 | Bester et al. |
| 2013/0144527 A1 | 6/2013 | Kuhnreichi |
| 2013/0174646 A1 | 7/2013 | Martin |
| 2013/0174841 A1 | 7/2013 | McAuley et al. |
| 2013/0184875 A1 | 7/2013 | Miura |
| 2013/0226352 A1 | 8/2013 | Dean-Hendricks et al. |
| 2013/0260668 A1 | 10/2013 | Stakutis et al. |
| 2013/0287626 A1 | 10/2013 | Benedek et al. |
| 2013/0289778 A1 | 10/2013 | Ishizaka |
| 2013/0323781 A1 | 12/2013 | Moularat et al. |
| 2013/0344609 A1 | 12/2013 | Mayer et al. |
| 2014/0020559 A1 | 1/2014 | Meirav et al. |
| 2014/0053586 A1 | 2/2014 | Poecher et al. |
| 2014/0079564 A1 | 3/2014 | Becerra et al. |
| 2014/0083292 A1 | 3/2014 | Weiden |
| 2014/0109649 A1 | 4/2014 | Fleischer et al. |
| 2014/0129004 A1 | 5/2014 | Takayama et al. |
| 2014/0139342 A1 | 5/2014 | Brown |
| 2014/0190679 A1 | 7/2014 | Roosli et al. |
| 2014/0207693 A1 | 7/2014 | Horst et al. |
| 2014/0217185 A1 | 8/2014 | Bicknell |
| 2014/0244043 A1 | 8/2014 | Foster |
| 2014/0262837 A1 | 9/2014 | Sidheswaran et al. |
| 2014/0266755 A1 | 9/2014 | Arensmeier et al. |
| 2014/0313048 A1 | 10/2014 | Sabata et al. |
| 2014/0346237 A1 | 11/2014 | Mirza et al. |
| 2014/0354976 A1 | 12/2014 | Evenstad et al. |
| 2014/0365017 A1 | 12/2014 | Hanna et al. |
| 2014/0370800 A1 | 12/2014 | Ansari |
| 2014/0371917 A1 | 12/2014 | Rite |
| 2015/0011154 A1 | 1/2015 | Holm et al. |
| 2015/0032264 A1 | 1/2015 | Emmons et al. |
| 2015/0046179 A1 | 2/2015 | Kang |
| 2015/0050876 A1 | 2/2015 | Sakai et al. |
| 2015/0052975 A1 | 2/2015 | Martin |
| 2015/0077737 A1 | 3/2015 | Belinsky et al. |
| 2015/0088786 A1 | 3/2015 | Anandhakrishnan |
| 2015/0140919 A1 | 5/2015 | Zwijack |
| 2015/0153061 A1 | 6/2015 | Riberon et al. |
| 2015/0153317 A1 | 6/2015 | Krebs |
| 2015/0168003 A1 | 6/2015 | Stefanski et al. |
| 2015/0168964 A1 | 6/2015 | Wu et al. |
| 2015/0194039 A1 | 7/2015 | Martin |
| 2015/0202563 A1 | 7/2015 | Spartz |
| 2015/0241318 A1 | 8/2015 | Hamann et al. |
| 2015/0246150 A1 | 9/2015 | De Koster et al. |
| 2015/0256355 A1 | 9/2015 | Pera et al. |
| 2015/0285524 A1 | 10/2015 | Saunders |
| 2015/0285755 A1 | 10/2015 | Moss et al. |
| 2015/0289802 A1 | 10/2015 | Thomas et al. |
| 2015/0298043 A1 | 10/2015 | Meirav et al. |
| 2015/0301513 A1 | 10/2015 | Sager et al. |
| 2015/0306271 A1 | 10/2015 | Willette |
| 2015/0323206 A1 | 11/2015 | Chan et al. |
| 2015/0323427 A1 | 11/2015 | Sharp |
| 2015/0323941 A1 | 11/2015 | Pariseau et al. |
| 2015/0330650 A1 | 11/2015 | Abiprojo et al. |
| 2015/0330817 A1 | 11/2015 | Law et al. |
| 2015/0335834 A1 | 11/2015 | Anandhakrishnan |
| 2015/0347910 A1 | 12/2015 | Fadell et al. |
| 2015/0348400 A1 | 12/2015 | Zribi et al. |
| 2015/0354848 A1 | 12/2015 | Abel et al. |
| 2015/0369503 A1 | 12/2015 | Flaherty et al. |

(56) References Cited

U.S. PATENT DOCUMENTS

| | | |
|---|---|---|
| 2015/0369507 A1 | 12/2015 | Flaherty et al. |
| 2015/0370986 A1 | 12/2015 | Hayward |
| 2015/0375187 A1 | 12/2015 | Yates et al. |
| 2016/0015277 A1 | 1/2016 | Dumoulin et al. |
| 2016/0015278 A1 | 1/2016 | Campo et al. |
| 2016/0015314 A1 | 1/2016 | Dusanter et al. |
| 2016/0015315 A1 | 1/2016 | Auphan et al. |
| 2016/0026201 A1 | 1/2016 | Vellanki et al. |
| 2016/0029805 A1 | 2/2016 | Arens et al. |
| 2016/0041074 A1 | 2/2016 | Pliskin |
| 2016/0048143 A1 | 2/2016 | Chan et al. |
| 2016/0054018 A1 | 2/2016 | Motodani et al. |
| 2016/0054023 A1 | 2/2016 | Baker et al. |
| 2016/0061472 A1 | 3/2016 | Lee et al. |
| 2016/0061794 A1 | 3/2016 | Schultz et al. |
| 2016/0078751 A1 | 3/2016 | Sloo et al. |
| 2016/0088438 A1 | 3/2016 | O'Keeffe |
| 2016/0089089 A1 | 3/2016 | Kakkar et al. |
| 2016/0091216 A1 | 3/2016 | Tran et al. |
| 2016/0107114 A1 | 4/2016 | Fu et al. |
| 2016/0110782 A1 | 4/2016 | Tadajewski |
| 2016/0116181 A1 | 4/2016 | Aultman et al. |
| 2016/0125714 A1 | 5/2016 | Kates et al. |
| 2016/0132031 A1 | 5/2016 | Kozura et al. |
| 2016/0133108 A1 | 5/2016 | Bucsa et al. |
| 2016/0139038 A1 | 5/2016 | Oldsen et al. |
| 2016/0147506 A1 | 5/2016 | Britt et al. |
| 2016/0153674 A1 | 6/2016 | Lancaster |
| 2016/0153884 A1 | 6/2016 | Han et al. |
| 2016/0161137 A1 | 6/2016 | Chen et al. |
| 2016/0166974 A1 | 6/2016 | Marra |
| 2016/0169544 A1 | 6/2016 | Fischer et al. |
| 2016/0169545 A1 | 6/2016 | Mangsuli et al. |
| 2016/0178586 A1 | 6/2016 | Stark |
| 2016/0209065 A1 | 7/2016 | Hagstrom et al. |
| 2016/0209070 A1 | 7/2016 | Hrejsa et al. |
| 2016/0209316 A1 | 7/2016 | Buseyne et al. |
| 2016/0228809 A1 | 8/2016 | Meirav et al. |
| 2016/0228811 A1 | 8/2016 | Meirav et al. |
| 2016/0231014 A1 | 8/2016 | Ro et al. |
| 2016/0238527 A1 | 8/2016 | Tseng et al. |
| 2016/0245784 A1 | 8/2016 | Matocha et al. |
| 2016/0256097 A1 | 9/2016 | Manautou et al. |
| 2016/0256590 A1 | 9/2016 | Taghipour |
| 2016/0263263 A1 | 9/2016 | Robert |
| 2016/0263268 A1 | 9/2016 | Kirschman |
| 2016/0267776 A1 | 9/2016 | Martin |
| 2016/0292781 A1 | 10/2016 | Nahmad et al. |
| 2016/0313290 A1 | 10/2016 | Forzani et al. |
| 2016/0332170 A1 | 11/2016 | Wennerstrom |
| 2016/0334121 A1 | 11/2016 | Oobayashi |
| 2016/0348938 A1 | 12/2016 | Simon et al. |
| 2016/0356511 A1 | 12/2016 | Messinger et al. |
| 2016/0363332 A1 | 12/2016 | Blackley |
| 2016/0363339 A1 | 12/2016 | Blackley |
| 2016/0370021 A1 | 12/2016 | Wiley et al. |
| 2016/0370029 A1 | 12/2016 | Kurelowech |
| 2016/0377305 A1 | 12/2016 | Kwa |
| 2017/0007954 A1 | 1/2017 | Ehdaie |
| 2017/0010006 A1 | 1/2017 | Kim et al. |
| 2017/0021298 A1 | 1/2017 | Williams et al. |
| 2017/0080373 A1 | 3/2017 | Engelhard |
| 2017/0089810 A1 | 3/2017 | Novaro |
| 2017/0095762 A1 | 4/2017 | Wolowicz |
| 2017/0097165 A1 | 4/2017 | Yasuda et al. |
| 2017/0098230 A1 | 4/2017 | Orangkhadivi |
| 2017/0103633 A1 | 4/2017 | Khire et al. |
| 2017/0108231 A1 | 4/2017 | Hasegawa et al. |
| 2017/0130981 A1 | 5/2017 | Willette et al. |
| 2017/0159964 A1 | 6/2017 | Arai et al. |
| 2017/0167743 A1 | 6/2017 | Dempsey et al. |
| 2017/0189844 A1 | 7/2017 | McLeod et al. |
| 2017/0193788 A1 | 7/2017 | Kim et al. |
| 2017/0193792 A1 | 7/2017 | Bermudez Rodriguez et al. |
| 2017/0234570 A1 | 8/2017 | Livchak et al. |
| 2017/0248332 A1 | 8/2017 | Wright et al. |
| 2017/0268797 A1 | 9/2017 | Mowris et al. |
| 2017/0273256 A1 | 9/2017 | Hutzel |
| 2017/0273845 A1 | 9/2017 | Phillips et al. |
| 2017/0314812 A1 | 11/2017 | Hurley |
| 2017/0323550 A1 | 11/2017 | Patil et al. |
| 2017/0328591 A1 | 11/2017 | Kelly et al. |
| 2017/0333838 A1 | 11/2017 | Bender et al. |
| 2017/0341001 A1 | 11/2017 | Jousma et al. |
| 2017/0341002 A1 | 11/2017 | Cama et al. |
| 2017/0343227 A1 | 11/2017 | Mowris |
| 2017/0347499 A1 | 11/2017 | Ross et al. |
| 2017/0350610 A1 | 12/2017 | Michielsen et al. |
| 2017/0350611 A1 | 12/2017 | Su et al. |
| 2017/0356670 A1 | 12/2017 | Zhang et al. |
| 2017/0368488 A1 | 12/2017 | Wall |
| 2018/0001249 A1 | 1/2018 | Sher |
| 2018/0017275 A1 | 1/2018 | Merrill |
| 2018/0017278 A1 | 1/2018 | Klein et al. |
| 2018/0017513 A1 | 1/2018 | Le Neel et al. |
| 2018/0017536 A1 | 1/2018 | Le Neel et al. |
| 2018/0021613 A1 | 1/2018 | Li |
| 2018/0023831 A1 | 1/2018 | Ha et al. |
| 2018/0023834 A1 | 1/2018 | Hatch et al. |
| 2018/0073759 A1 | 3/2018 | Zhang et al. |
| 2018/0119973 A1 | 5/2018 | Rothman et al. |
| 2018/0119974 A1 | 5/2018 | Kotake et al. |
| 2018/0135877 A1 | 5/2018 | Seiler |
| 2018/0148180 A1 | 5/2018 | Fagundes et al. |
| 2018/0304472 A1 | 10/2018 | Angle et al. |
| 2018/0350226 A1 | 12/2018 | Martin |
| 2019/0097827 A1 | 3/2019 | Angle et al. |
| 2019/0178522 A1 | 6/2019 | Sun et al. |
| 2019/0209806 A1 | 7/2019 | Allen et al. |
| 2019/0242592 A1 | 8/2019 | Adamek et al. |
| 2019/0353378 A1 | 11/2019 | Ramamurti et al. |
| 2019/0353379 A1 | 11/2019 | Lee et al. |
| 2019/0361412 A1 | 11/2019 | Park et al. |
| 2020/0273268 A1 | 8/2020 | Bhattacharyya et al. |
| 2021/0045640 A1 | 2/2021 | Poltorak |
| 2021/0131681 A1 | 5/2021 | Duncan |
| 2021/0156582 A1 | 5/2021 | Stevenson et al. |
| 2021/0158975 A1 | 5/2021 | Turney et al. |

FOREIGN PATENT DOCUMENTS

| | | |
|---|---|---|
| CN | 102393882 A | 3/2012 |
| CN | 202792383 U | 3/2013 |
| CN | 203090662 U | 7/2013 |
| CN | 104089361 A | 10/2014 |
| CN | 203949322 U | 11/2014 |
| CN | 104359815 A | 2/2015 |
| CN | 104534617 A | 4/2015 |
| CN | 103958976 B | 11/2016 |
| CN | 106196506 A | 12/2016 |
| CN | 107676931 A | 2/2018 |
| CN | 107940682 A | 4/2018 |
| DE | 10108274 A1 | 9/2002 |
| EP | 0893657 A1 | 1/1999 |
| EP | 1402935 A1 | 3/2004 |
| EP | 1904905 A2 | 4/2008 |
| EP | 2450640 A2 | 5/2012 |
| EP | 2134556 B1 | 7/2012 |
| EP | 2368616 B1 | 12/2012 |
| EP | 2564114 A1 | 3/2013 |
| EP | 2713159 A2 | 4/2014 |
| EP | 2891019 A1 | 7/2015 |
| EP | 2937961 A1 | 10/2015 |
| EP | 3040948 A1 | 7/2016 |
| EP | 3073883 A1 | 10/2016 |
| EP | 3121524 A1 | 1/2017 |
| JP | H05180487 A | 7/1993 |
| JP | 2007083106 A | 4/2007 |
| JP | 2007120815 A | 5/2007 |
| JP | 2011146137 A | 7/2011 |
| JP | 5231476 B2 | 7/2013 |
| JP | 2014208343 A | 11/2014 |
| JP | 2015114014 A | 6/2015 |
| JP | 2015152175 A | 8/2015 |

(56) References Cited

FOREIGN PATENT DOCUMENTS

| | | |
|---|---|---|
| JP | 2018017403 A | 2/2018 |
| KR | 100182648 | 5/1999 |
| KR | 20000007498 A | 2/2000 |
| KR | 100355352 B1 | 9/2002 |
| KR | 20030016787 A | 3/2003 |
| KR | 100509332 B1 | 8/2005 |
| KR | 100556066 B1 | 3/2006 |
| KR | 100721458 B1 | 5/2007 |
| KR | 20070072787 A | 7/2007 |
| KR | 100782175 B1 | 12/2007 |
| KR | 100819077 B1 | 4/2008 |
| KR | 100930346 B1 | 12/2009 |
| KR | 20100089605 A | 8/2010 |
| KR | 101013372 B1 | 2/2011 |
| KR | 20110074222 A | 6/2011 |
| KR | 20110093329 A | 8/2011 |
| KR | 10-1492316 B1 | 2/2015 |
| KR | 101566592 B1 | 11/2015 |
| KR | 101765454 B1 | 8/2017 |
| KR | 101771053 B1 | 8/2017 |
| KR | 20170122043 A | 11/2017 |
| KR | 20180007381 A | 1/2018 |
| LU | 92350 A1 | 7/2015 |
| WO | WO-9409324 A1 | 4/1994 |
| WO | WO-2005110580 A2 | 11/2005 |
| WO | WO-2012177072 A2 | 12/2012 |
| WO | WO-2013163612 A1 | 10/2013 |
| WO | WO-2015078672 A1 | 6/2015 |
| WO | WO-2016102337 A1 | 6/2016 |
| WO | WO-2016139544 A1 | 9/2016 |
| WO | WO-2017146637 A1 | 8/2017 |
| WO | WO-2017157987 A1 | 9/2017 |

OTHER PUBLICATIONS

U.S. Appl. No. 17/048,798, filed Oct. 19, 2020, Stuart K. Morgan.
U.S. Appl. No. 17/048,887, filed Oct. 19, 2020, Stuart K. Morgan.
Non-Final Office Action regarding U.S. Appl. No. 17/048,798 dated Sep. 14, 2021.
"Clean Your Air with Keen Home Smart Filters", Keen Home, Inc., <https://keenhome.io/pages/smart-filter> 2018.
"Home Comfort: Digital, App-Based Climate Control", Ecovent Systems Inc., <https://www.ecoventsystems.com/> 2018.
"Meet the Keen Home Zoning System—How It Works", Keen Home, Inc., <https://keenhome.io/pages/how-it-works> 2018.
Doty, Steve, et al., "Building Operations: Balancing Energy Efficiency with Indoor Air Quality", 2009.
El Mankibi, Mohamed, "Indoor air quality control in case of scheduled or intermittent occupancy based building: Development of a scale model", 2009.
Emmerich, Steven, et al., "Indoor air quality impacts of residential HVAC systems, phase 1 report: Computer simulation plan", NISTIR 5346: Building and Fire Research Laboratory; National Institute of Standards and Technology: http://www.researchgate.net/profile/Steven_Emmerich/publication/236454476_Indoor_air_quality impacts of residential HVAC systems phase 1 report Computer simulation plan/links/565f5f2308ae1ef929854780.pdf; Feb. 1994; 108 Pages.
Footbot; Product Specifications; www.footbot.io. Accessed Sep. 13, 2017.
Herberger, Simone, et al., "Indoor Air Quality Monitoring Improving Air Quality Perception", 2012.
International Search Report of the ISA/KR regarding International Application No. PCT/US2018/062190 dated Mar. 21, 2019.
International Search Report of the ISA/KR regarding International Application No. PCT/US2019/028402 dated Aug. 7, 2019.
International Search Report of the ISA/KR regarding International Application No. PCT/US2019/028408 dated Aug. 9, 2019.
International Search Report of the ISA/KR regarding International Application No. PCT/US2019/028410 dated Aug. 7, 2019.
International Search Report regarding International Application No. PCT/US2019/028391 dated Aug. 14, 2019.
Notice of Allowance regarding U.S. Appl. No. 16/196,703 dated May 14, 2020.
Notice of Allowance regarding U.S. Appl. No. 16/196,744 dated Apr. 27, 2020.
Notice of Allowance regarding U.S. Appl. No. 16/196,744 dated Mar. 4, 2020.
Notice of Allowance regarding U.S. Appl. No. 16/196,770 dated May 5, 2020.
Notice of Allowance regarding U.S. Appl. No. 161/196,770 dated Mar. 3, 2020.
Shaw, C. Y., "Maintaining acceptable air quality in office buildings through ventilation", Construction Technology Updated No. 3, Institute for Research in Construction, National Research Council of Canada, Jan. 1997; 4 Pages.
Turner, William J.N., et al., "Energy and IAQ implications of residential ventilation cooling", ResearchGate: http://www.researchgate.net/profile/William_Turner10/publication/278961832_Energy_and_IAQ_implications_of_residential_ventilation_cooling/links/5587e12608aef58c03a06547.pdf, Aug. 2014; 52 pages.
Written Opinion of the ISA/KR regarding International Application No. PCT/US2018/062190 dated Mar. 21, 2019.
Written Opinion of the ISA/KR regarding International Application No. PCT/US2019/028391 dated Aug. 14, 2019.
Written Opinion of the ISA/KR regarding International Application No. PCT/US2019/028402 dated Aug. 7, 2019.
Written Opinion of the ISA/KR regarding International Application No. PCT/US2019/028408 dated Aug. 9, 2019.
Written Opinion of the ISA/KR regarding International Application No. PCT/US2019/028410 dated Aug. 7, 2019.
Zhong, Lexuan, et al., "Ozonation Air Purification Technology in HVAC Applications", Concordia University: http://www.researchgate.net/profile/Lexuan_Zhong/publication/260363850_Ozonation_Air_Purification_Technology_in_HVAC_Applications/links/0a85e530e28d98ecf4000000, 2014; 8 Pages.
Extended European Search Report regarding Application No. 19789429 dated Dec. 17, 2021.
Notice of Allowance regarding U.S. Appl. No. 17/048,798 dated Oct. 19, 2021.
Non-Final Office Action regarding U.S. Appl. No. 17/048,982 dated Feb. 1, 2022.
U.S. Appl. No. 17/048,887, filed Oct. 19, 2020, Hung M. Pham.
U.S. Appl. No. 17/048,946, filed Oct. 19, 2020, Stuart K. Morgan.
U.S. Appl. No. 17/048,967, filed Oct. 19, 2020, Hung M. Pham.
U.S. Appl. No. 17/048,982, filed Oct. 19, 2020, Stuart K. Morgan.
Applicant-Initiated Interview Summary regarding U.S. Appl. No. 17/048,982 dated Apr. 15, 2022.
Notice of Allowance regarding U.S. Appl. No. 17/048,887 dated Apr. 14, 2022.
Extended European Search Report regarding Application No. 19787690.7 dated Dec. 10, 2021.

* cited by examiner

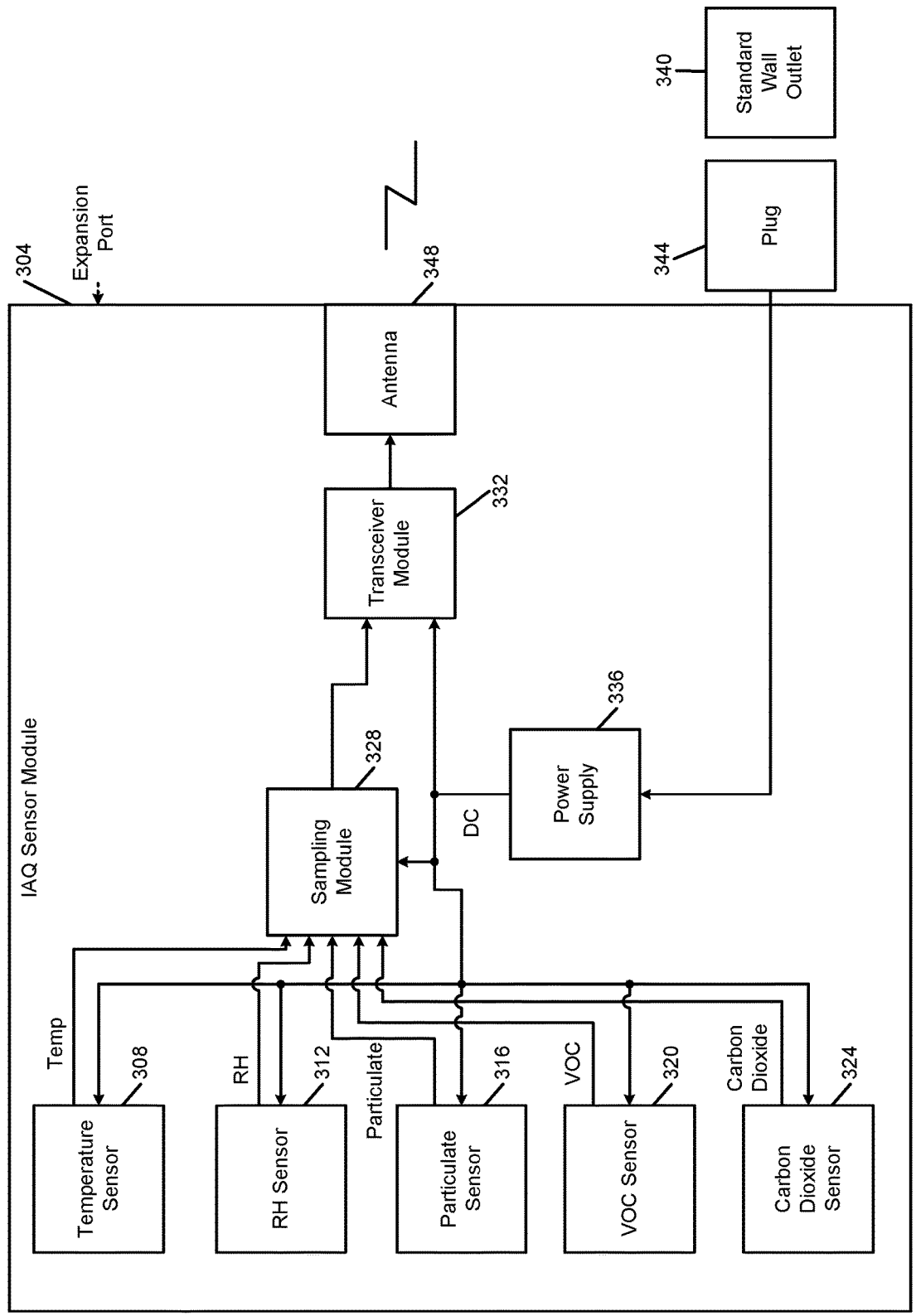

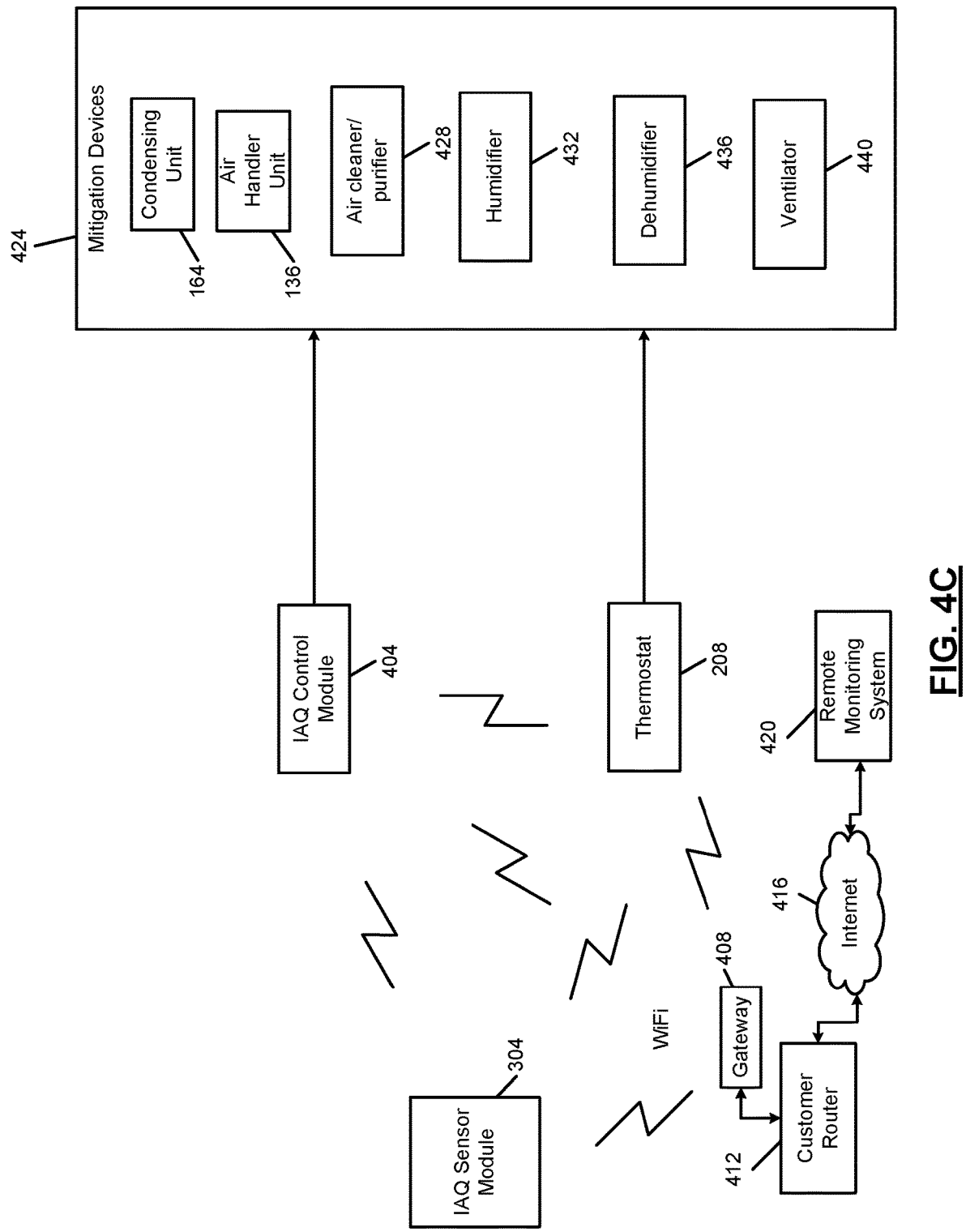

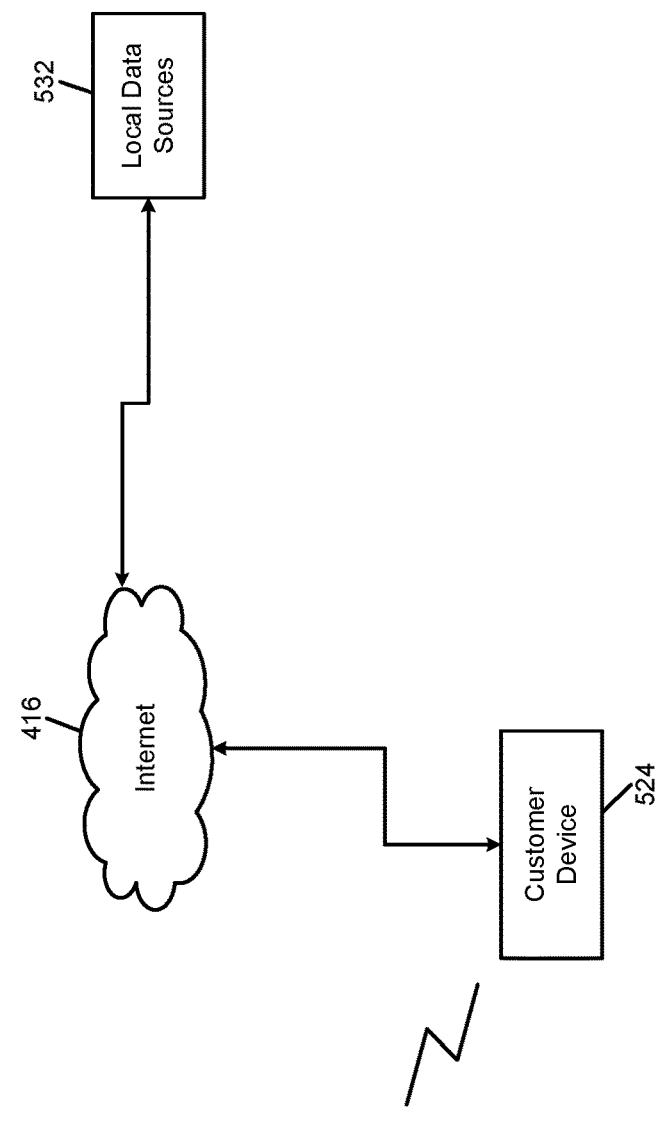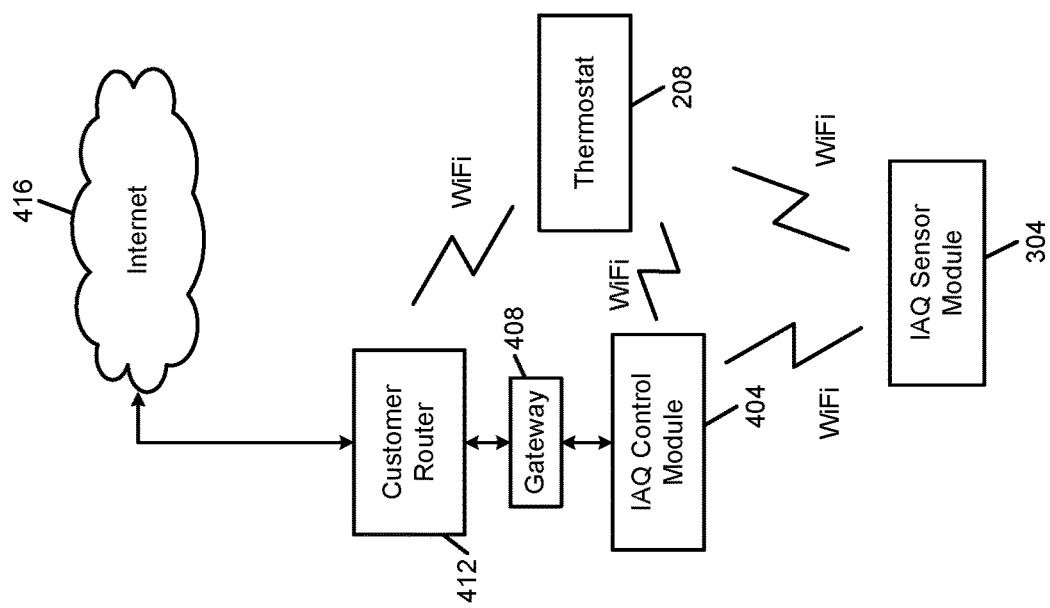
FIG. 5B

| Control Mode | Devices |
|---|---|
| Heat Mode | AC/Heat Pump Stage 1 |
| Extra Heat Mode | AC/Heat Pump Stage 2 |
| Cool Mode | Electric Heat Stage 1 |
| Humidify Mode | Electric Heat Stage 2 |
| Economizer Mode | Reversing Valve |
| Vent Mode | Humidifier |
| Dehumidify Mode | Mixed Air Damper |
| Extra Dehumidify Mode | Economizer |
| DeVOC Mode | Fan |
| DeParticle Mode | Fan Speed Low |
| DeCO2 Mode | Fan Speed Medium |
| Failsafe Mode | Fan Speed High |
| | Ventilator |
| | Purifier |

FIG. 8

SYSTEMS AND METHODS WITH VARIABLE MITIGATION THRESHOLDS

CROSS-REFERENCE TO RELATED APPLICATIONS

This application is a continuation and claims the benefit of U.S. application Ser. No. 17/048,982 filed on Oct. 19, 2020, a 371 of International Application PCT/US2019/028408, filed on Apr. 19, 2019 and U.S. Provisional Application No. 62/660,354, filed on Apr. 20, 2018. The entire disclosure of the application referenced above is incorporated herein by reference.

FIELD

The present disclosure relates to environmental control systems and more particularly to indoor air quality control systems and methods.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A residential or light commercial HVAC (heating, ventilation, and/or air conditioning) system controls temperature and humidity of a building. Upper and lower temperature limits may be specified by an occupant or owner of the building, such as an employee working in the building or a homeowner.

A thermostat controls operation of the HVAC system based on a comparison of the temperature at a thermostat and the target values. The thermostat may control the HVAC system to heat the building when the temperature is less than the lower temperature limit. The thermostat may control the HVAC system to cool the building when the temperature is greater than the upper temperature limit. Heating the building and cooling the building generally decreases humidity, although the HVAC system may include a humidifier that adds humidity to warm air output by the HVAC system during heating of the building.

SUMMARY

In a feature, an indoor air quality (IAQ) system for a building is described. An IAQ sensor is located within the building and is configured to measure an IAQ parameter, the IAQ parameter being one of: an amount of particulate of at least a predetermined size present in air; an amount of volatile organic compounds (VOCs) present in air; and an amount of carbon dioxide present in air. A mitigation module is configured to: selectively turn on a mitigation device based on a comparison of the IAQ parameter with a first ON threshold and a second ON threshold; and selectively turn off the mitigation device based on a comparison of the IAQ parameter with an OFF threshold. A clean module is configured to determine a clean value for the IAQ parameter. A thresholds module is configured to, based on the clean value, determine the first ON threshold and the OFF threshold.

In further features, the thresholds module is configured to set the first ON threshold based on the clean value plus a first predetermined value.

In further features, the thresholds module is configured to set the second ON threshold to a fixed predetermined value.

In further features, the thresholds module is configured to set the OFF threshold based on a second predetermined value plus a greater one of the first and second ON thresholds.

In further features, the mitigation module is configured to turn on the mitigation device in response to a determination that the IAQ parameter is greater than both of the first ON threshold and the second ON threshold.

In further features, the mitigation module is configured to turn off the mitigation device when both (i) the IAQ parameter is less than the OFF threshold and (ii) at least one OFF condition is satisfied.

In further features, the mitigation module is configured to turn off the mitigation device when both (i) the IAQ parameter is less than the OFF threshold and (ii) the IAQ parameter is less than or equal to the clean level.

In further features, the mitigation module is configured to turn off the mitigation device when both (i) the IAQ parameter is less than the OFF threshold and (ii) a slope of the IAQ parameter is within a predetermined amount of zero.

In further features, the mitigation module is configured to turn off the mitigation device when both (i) the IAQ parameter is less than the OFF threshold and (ii) a predetermined period has passed since the IAQ parameter became less than the OFF threshold.

In further features, the IAQ parameter is the amount of particulate, and the IAQ system further includes a time to capacity module configured to determine the predetermined period by solving the following equation for period:

$$\left(\frac{\text{Clean}}{\text{Peak}}\right) = \left(1 - \frac{afr}{vol} * \text{efficiency}\right)^{period},$$

where period is the predetermined period, Clean is the clean value, Peak is a peak value of the amount of particulate, afr is an air flow rate of a blower of an air handler unit of the building, vol is a volume of interior space the building, and efficiency is an efficiency of a filter of the air handler unit.

In further features, the IAQ parameter is one of (i) the amount of VOCs and (ii) the amount of carbon dioxide, and the IAQ system further includes a time to capacity module configured to determine the predetermined period by solving the following equation for period:

$$\left(\frac{\text{Clean}}{\text{Peak}}\right) = \left(1 - \frac{afr}{vol} * \text{percentage}\right)^{period},$$

where period is the predetermined period, Clean is the clean value, Peak is a peak value of the one of (i) the amount of VOCs and (ii) the amount of carbon dioxide, afr is an air flow rate of a ventilator of the building, vol is a volume of interior space the building, and percentage is a percentage of the volume of the building that the ventilator will circulate out of the building per minute.

In a feature, an indoor air method (IAQ) method includes: by an IAQ sensor that is located within a building, measuring an IAQ parameter, the IAQ parameter being one of: an amount of particulate of at least a predetermined size present in air; an amount of volatile organic compounds (VOCs) present in air; and an amount of carbon dioxide present in air; selectively turning on a mitigation device based on a comparison of the IAQ parameter with a first ON threshold and a second ON threshold; selectively turning off the mitigation device based on a comparison of the IAQ parameter with an OFF threshold; determining a clean value for the IAQ parameter; and based on the clean value, determining the first ON threshold and the OFF threshold.

In further features, determining the first ON threshold includes setting the first ON threshold based on the clean value plus a first predetermined value.

In further features, the IAQ method further includes setting the second ON threshold to a fixed predetermined value.

In further features, determining the OFF threshold includes setting the OFF threshold based on a second predetermined value plus a greater one of the first and second ON thresholds.

In further features, selectively turning on the mitigation device includes turning on the mitigation device in response to a determination that the IAQ parameter is greater than both of the first ON threshold and the second ON threshold.

In further features, selectively turning off the mitigation device includes turning off the mitigation device when both (i) the IAQ parameter is less than the OFF threshold and (ii) at least one OFF condition is satisfied.

In further features, selectively turning off the mitigation device includes turning off the mitigation device when both (i) the IAQ parameter is less than the OFF threshold and (ii) the IAQ parameter is less than or equal to the clean level.

In further features, selectively turning off the mitigation device includes turning off the mitigation device when both (i) the IAQ parameter is less than the OFF threshold and (ii) a slope of the IAQ parameter is within a predetermined amount of zero.

In further features, selectively turning off the mitigation device includes turning off the mitigation device when both (i) the IAQ parameter is less than the OFF threshold and (ii) a predetermined period has passed since the IAQ parameter became less than the OFF threshold.

In further features, the IAQ parameter is the amount of particulate, and the IAQ method further includes determining the predetermined period by solving the following equation for period:

$$\left(\frac{\text{Clean}}{\text{Peak}}\right) = \left(1 - \frac{afr}{vol} * \text{efficiency}\right)^{period},$$

where period is the predetermined period, Clean is the clean value, Peak is a peak value of the amount of particulate, afr is an air flow rate of a blower of an air handler unit of the building, vol is a volume of interior space the building, and efficiency is an efficiency of a filter of the air handler unit.

In further features, the IAQ parameter is one of (i) the amount of VOCs and (ii) the amount of carbon dioxide, and the IAQ method further includes determining the predetermined period by solving the following equation for period:

$$\left(\frac{\text{Clean}}{\text{Peak}}\right) = \left(1 - \frac{afr}{vol} * \text{percentage}\right)^{period},$$

where period is the predetermined period, Clean is the clean value, Peak is a peak value of the one of (i) the amount of VOCs and (ii) the amount of carbon dioxide, afr is an air flow rate of a ventilator of the building, vol is a volume of interior space the building, and percentage is a percentage of the volume of the building that the ventilator will circulate out of the building per minute.

In a feature, an indoor air quality (IAQ) system for a building is described. A particulate sensor is located within the building and is configured to measure an amount of particulate of at least a predetermined size present in air. A mitigation module is configured to: selectively turn on a blower of an air handler unit of the building based on a comparison of the amount of particulate with an ON threshold; and selectively turn off the blower based on a comparison of the amount of particulate with an OFF threshold. A timer module is configured to measure a period between a first time when the mitigation module turned the blower ON and a second time when the mitigation module next turned the blower OFF. A time to capacity module is configured to determine an expected period of the blower being ON for a mitigation event when a filter of the air handler unit is new by solving the following equation for period:

$$(\text{Later}/\text{Initial}) = \left(1 - \frac{afr}{vol} * \text{efficiency}\right)^{period},$$

where period is the expected period, Later is the amount of particulate measured by the particulate sensor at the second time, Initial is the amount of particulate measured by the particulate sensor at the first time, afr is an air flow rate of the blower of the air handler unit, vol is a volume of interior space the building, and efficiency is an efficiency of the filter when new. A diagnostic module is configured to selectively generate an indicator to replace the filter based on a comparison of the period and the expected period.

In further features, the diagnostic module is configured to generate the indicator to replace the filter when the period is greater than the expected period by at least a predetermined amount.

In further features, the diagnostic module is configured to generate the indicator to replace the filter when the period is at least twice as long as the expected period.

In further features, the diagnostic module is configured to generate the indicator to replace the filter when the period is at least three times the expected period.

In further features, the diagnostic module is configured to determine an amount that the filter is filled with particulate matter based on a comparison of the period and the expected period and to generate the indicator to replace the filter based on the amount that the filter is filled.

In further features, the diagnostic module is configured to display the indicator to replace the filter on a display of a customer device associated with the building.

In a feature, an indoor air quality (IAQ) method includes: by a particulate sensor that is located within a building, measuring an amount of particulate of at least a predetermined size present in air; selectively turning on a blower of an air handler unit of the building based on a comparison of the amount of particulate with an ON threshold; selectively turning off the blower based on a comparison of the amount of particulate with an OFF threshold; measuring a period between a first time when the blower was turned ON and a second time when the blower is next turned OFF; determining an expected period of the blower being ON for a mitigation event when a filter of the air handler unit is new by solving the following equation for period:

$$(\text{Later}/\text{Initial}) = \left(1 - \frac{afr}{vol} * \text{efficiency}\right)^{period},$$

where period is the expected period, Later is the amount of particulate measured by the particulate sensor at the second time, Initial is the amount of particulate measured by the particulate sensor at the first time, afr is an air flow rate of the blower of the air handler unit, vol is a volume of interior space the building, and efficiency is an efficiency of the filter when new; and selectively generating an indicator to replace the filter based on a comparison of the period and the expected period.

In further features, selectively generating the indicator includes generating the indicator to replace the filter when the period is greater than the expected period by at least a predetermined amount.

In further features, selectively generating the indicator includes generating to replace the filter when the period is at least twice as long as the expected period.

In further features, selectively generating the indicator includes generating the indicator to replace the filter when the period is at least three times the expected period.

In further features, the IAQ method further includes determining an amount that the filter is filled with particulate matter based on a comparison of the period and the expected period, where selectively generating the indicator includes generating the indicator to replace the filter based on the amount that the filter is filled.

In further features, the IAQ method further includes displaying the indicator to replace the filter on a display of a customer device associated with the building.

In a feature, an indoor air quality (IAQ) system for a building is described. An IAQ sensor is located within the building and is configured to measure an IAQ parameter, the IAQ parameter being one of: an amount of particulate of at least a predetermined size present in air; an amount of volatile organic compounds (VOCs) present in air; and an amount of carbon dioxide present in air. A mitigation module is configured to: selectively turn on a mitigation device based on a comparison of the IAQ parameter with an ON threshold; and selectively turn off the mitigation device based on a comparison of the IAQ parameter with an OFF threshold. A timer module is configured to measure a period for a mitigation event between a first time when the mitigation module turned the mitigation device ON and a second time when the mitigation module next turned the mitigation device OFF. An event module is configured to determine an event classification for the mitigation event based on the period and to store the event classification in memory.

In further features, a time to capacity module is configured to determine an expected period for the mitigation event by solving the following equation for period:

$$(\text{Later}/\text{Initial}) = \left(1 - \frac{afr}{vol} * \text{efficiency}\right)^{period},$$

where period is an expected period, Later is the amount of particulate measured by the particulate sensor at the second time, Initial is the amount of particulate measured by the particulate sensor at the first time, afr is an air flow rate of a blower of an air handler unit of the building, vol is a volume of interior space the building, and efficiency is an efficiency of a filter of the air handler unit when new, and the event module is configured to determine the event classification further based on the expected period.

In further features, the event module is configured to set the event classification to a first classification when the period is greater than the expected period.

In further features, the event module is configured to set the event classification to a second classification when the period is less than the expected period.

In further features, the event module is configured to set the event classification to: a first classification when the period is less than a first predetermined period; a second classification when the period is greater than a second predetermined period that is greater than the first predetermined period; and a third classification when the period is greater than the first predetermined period and less than the second predetermined period.

In further features, a time to capacity module is configured to determine an expected period for the mitigation event by solving the following equation for period:

$$(\text{Later}/\text{Initial}) = \left(1 - \frac{afr}{vol} * \text{percentage}\right)^{period},$$

where period is the expected period, Later is a first value of the IAQ parameter at the second time, Initial is a second value of the IAQ parameter at the first time, afr is an air flow rate of the mitigation device, vol is a volume of interior space the building, and percentage is a percentage of the volume of the building that the mitigation device will circulate out of the building per minute, and the event module is configured to determine the event classification further based on the expected period.

In further features, the event module is configured to set the event classification to a first classification when the period is greater than the expected period.

In further features, the event module is configured to set the event classification to a second classification when the period is less than the expected period.

In a feature, an indoor air quality (IAQ) method includes: by an IAQ sensor that is located within a building, measuring an IAQ parameter, the IAQ parameter being one of: an amount of particulate of at least a predetermined size present in air; an amount of volatile organic compounds (VOCs) present in air; and an amount of carbon dioxide present in air; selectively turning on a mitigation device based on a comparison of the IAQ parameter with an ON threshold; selectively turning off the mitigation device based on a comparison of the IAQ parameter with an OFF threshold; measuring a period for a mitigation event between a first time when mitigation device was turned ON and a second time when the mitigation device was next turned OFF; determining an event classification for the mitigation event based on the period; and storing the event classification in memory.

In a feature, the IAQ method further includes determining an expected period for the mitigation event by solving the following equation for period:

$$(\text{Later}/\text{Initial}) = \left(1 - \frac{afr}{vol} * \text{efficiency}\right)^{period},$$

where period is an expected period, Later is the amount of particulate measured by the particulate sensor at the second time, Initial is the amount of particulate measured by the particulate sensor at the first time, afr is an air flow rate of a blower of an air handler unit of the building, vol is a volume of interior space the building, and efficiency is an efficiency of a filter of the air handler unit when new, where determining the event classification includes determining the event classification further based on the expected period.

In further features, determining the event classification includes setting the event classification to a first classification when the period is greater than the expected period.

In further features, determining the event classification includes setting the event classification to a second classification when the period is less than the expected period.

In further features, determining the event classification includes setting the event classification to: a first classification when the period is less than a first predetermined period; a second classification when the period is greater than a second predetermined period that is greater than the first predetermined period; and a third classification when the period is greater than the first predetermined period and less than the second predetermined period.

In further features, the IAQ method further includes determining an expected period for the mitigation event by solving the following equation for period:

$$(\text{Later}/\text{Initial}) = \left(1 - \frac{afr}{vol} * \text{percentage}\right)^{period},$$

where period is the expected period, Later is a first value of the IAQ parameter at the second time, Initial is a second value of the IAQ parameter at the first time, afr is an air flow rate of the mitigation device, vol is a volume of interior space the building, and percentage is a percentage of the volume of the building that the mitigation device will circulate out of the building per minute, where determining the event classification includes determining the event classification further based on the expected period.

In further features, determining the event classification includes setting the event classification to a first classification when the period is greater than the expected period.

In further features, determining the event classification includes setting the event classification to a second classification when the period is less than the expected period.

In a feature, an indoor air quality (IAQ) system for a building is described. An IAQ sensor module is located within the building and comprises at least one of: a temperature sensor configured to measure a temperature of air at the IAQ sensor module; a relative humidity (RH) sensor configured to measure a RH of the air at the IAQ sensor module; a particulate sensor configured to measure an amount of particulate of at least a predetermined size present in the air at the IAQ sensor module; a volatile organic compound (VOC) sensor configured to measure an amount of VOCs present in the air at the IAQ sensor module; and a carbon dioxide sensor configured to measure an amount of carbon dioxide present in the air at the IAQ sensor module. At least one of a thermostat and an IAQ control module is configured to, in response to a determination that one of the temperature, the RH, the amount of particulate, the amount of VOCs, and the amount of carbon dioxide is greater than a predetermined value while one of a plurality of mitigation devices is off: determine an area between: a baseline value; and a curve formed by the one of the temperature, the RH, the amount of particulate, the amount of VOCs, and the amount of carbon dioxide; and selectively turn on the one of the plurality of mitigation devices.

In further features, the mitigation devices include at least two of: an air handler unit of a heating, ventilation, and air conditioning (HVAC) system a blower of an air handler unit of the HVAC system of the building; a condenser unit of the HVAC system of the building; an air purifier configured to receive power via a standard wall outlet and to filter particulate from air within the building; a humidifier configured to humidify air within the building; a dehumidifier configured to dehumidify air within the building; and a ventilator configured to vent air out of the building from within the building.

In further features, the at least one of the thermostat and the IAQ control module is configured to selectively turn on the one of the plurality of mitigation devices based on the area.

In further features, the at least one of the thermostat and the IAQ control module is configured to turn on the one of the plurality of mitigation devices when the area is greater than a predetermined value.

In further features, the at least one of the thermostat and the IAQ control module is configured to maintain the one of the plurality of mitigation devices off when the area is less than the predetermined value.

In further features, the at least one of the thermostat and the IAQ control module is configured to selectively turn on the one of the plurality of mitigation devices when at least two of the temperature, the RH, the amount of particulate, the amount of VOCs, and the amount of carbon dioxide are greater than respective predetermined values.

In further features, the at least one of the thermostat and the IAQ control module is configured to maintain the one of the plurality of mitigation devices off when: only one of the temperature, the RH, the amount of particulate, the amount of VOCs, and the amount of carbon dioxide is greater than the predetermined value; and the area is less than a predetermined value.

In further features, the at least one of the thermostat and the IAQ control module is configured to selectively turn on at least one of the plurality of mitigation devices when: at least two of the temperature, the RH, the amount of particulate, the amount of VOCs, and the amount of carbon dioxide are greater than respective predetermined values; and the area is less than a predetermined value.

In further features, the at least one of the thermostat and the IAQ control module is further configured to turn on the at least one of the plurality of mitigation devices when the area is greater than the predetermined value.

In further features, the at least one of the thermostat and the IAQ control module is configured to selectively turn on at least one of the plurality of mitigation devices when at least three of the temperature, the RH, the amount of particulate, the amount of VOCs, and the amount of carbon dioxide are greater than respective predetermined values.

In a feature, a method includes: at least one of: by a temperature sensor of an indoor air quality (IAQ) sensor module within a building, measuring a temperature of air at the IAQ sensor module; by a relative humidity (RH) sensor of the IAQ sensor module within the building, measuring a RH of the air at the IAQ sensor module; by a particulate sensor of the IAQ sensor module within the building, measuring an amount of particulate of at least a predetermined size present in the air at the IAQ sensor module; by a volatile organic compound (VOC) sensor of the IAQ sensor module within the building, measuring an amount of VOCs present in the air at the IAQ sensor module; and by a carbon dioxide sensor of the IAQ sensor module within the building, measuring an amount of carbon dioxide present in the air at the IAQ sensor module; and in response to a determination that one of the temperature, the RH, the amount of particulate, the amount of VOCs, and the amount of carbon dioxide is greater than a predetermined value while one of a plurality of mitigation devices is off: determining an area between: a baseline value; and a curve formed by the one of the temperature, the RH, the amount of particulate, the amount of VOCs, and the amount of carbon dioxide; and selectively turning on the one of the plurality of mitigation devices.

In further features, the mitigation devices include at least two of: an air handler unit of a heating, ventilation, and air conditioning (HVAC) system a blower of an air handler unit of the HVAC system of the building; a condenser unit of the HVAC system of the building; an air purifier configured to receive power via a standard wall outlet and to filter particulate from air within the building; a humidifier configured to humidify air within the building; a dehumidifier configured to dehumidify air within the building; and a ventilator configured to vent air out of the building from within the building.

In further features, selectively turning on the one of the plurality of mitigation devices includes selectively turning on the one of the plurality of mitigation devices the one of the plurality of mitigation devices based on the area.

In further features, selectively turning on the one of the plurality of mitigation devices includes turning on the one of the plurality of mitigation devices when the area is greater than a predetermined value.

In further features, the method further includes maintaining the one of the plurality of mitigation devices off when the area is less than the predetermined value.

In further features, selectively turning on the one of the plurality of mitigation devices includes selectively turning on the one of the plurality of mitigation devices when at least two of the temperature, the RH, the amount of particulate, the amount of VOCs, and the amount of carbon dioxide are greater than respective predetermined values.

In further features, maintaining the one of the plurality of mitigation devices off when: only one of the temperature, the RH, the amount of particulate, the amount of VOCs, and the amount of carbon dioxide is greater than the predetermined value; and the area is less than a predetermined value.

In further features, selectively turning on the one of the plurality of mitigation devices includes selectively turning on at least one of the plurality of mitigation devices when: at least two of the temperature, the RH, the amount of particulate, the amount of VOCs, and the amount of carbon dioxide are greater than respective predetermined values; and the area is less than a predetermined value.

In further features, the method further includes turning on the at least one of the plurality of mitigation devices when the area is greater than the predetermined value.

In further features, selectively turning on the one of the plurality of mitigation devices includes selectively turning on at least one of the plurality of mitigation devices when at least three of the temperature, the RH, the amount of particulate, the amount of VOCs, and the amount of carbon dioxide are greater than respective predetermined values.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 3 is a functional block diagram of an example indoor air quality (IAQ) sensor module that can be used with an HVAC system and/or other mitigation devices;

FIGS. 4A-4C are a functional block diagram of an example IAQ control system;

FIG. 5B is a functional block diagram of an example monitoring system;

FIGS. 6-9 are example user interfaces displayed by a user computing device during execution of an application based on data received from a remote monitoring system;

In the drawings, reference numbers may be reused to identify similar and/or identical elements.

DETAILED DESCRIPTION

Figure 1:
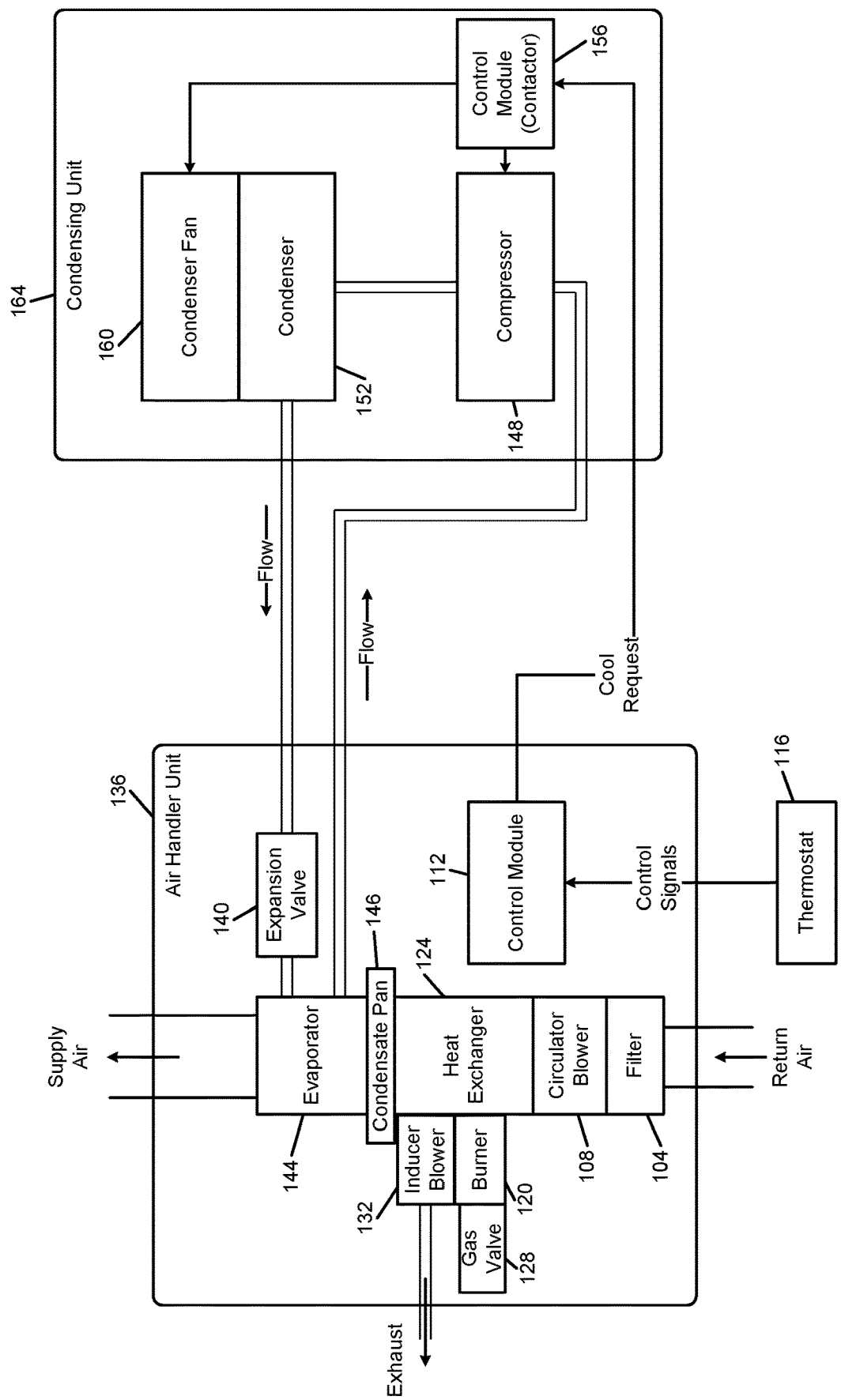
FIG. 1 is a block diagram of an example heating, ventilation, and air conditioning (HVAC) system.

According to the present disclosure, an indoor air quality (IAQ) sensor module can be used with one or more mitigation devices of a residential or light commercial HVAC (heating, ventilation, and/or air conditioning) system of a building and/or one or more other mitigation devices. The IAQ sensor module includes one, more than one, or all of a temperature sensor, a relative humidity (RH) sensor, a particulate sensor, a volatile organic compound (VOC) sensor, and a carbon dioxide ($CO_2$) sensor. The IAQ sensor module may also include one or more other IAQ sensors, such as occupancy, barometric pressure, light, sound, etc. The temperature sensor senses a temperature of air at the location of the IAQ sensor. The RH sensor measures a RH of air at the location of the IAQ sensor. The particulate sensor measures an amount (e.g., concentration) of particulate greater than a predetermined size in the air at the location of the IAQ sensor. The VOC sensor measures an amount of VOCs in the air at the location of the IAQ sensor. The carbon dioxide sensor measures an amount of carbon dioxide in the air at the location of the IAQ sensor. Other IAQ sensors would measure an amount of a substance or condition in the air at the location of the IAQ sensor.

The IAQ sensor module is wirelessly connected to a thermostat of the HVAC system, such as via Bluetooth or WiFi. The IAQ sensor module may additionally or alternatively be wirelessly connected to a control module. The IAQ sensor module communicates measurements from its sensors, and optionally, a time and date to the thermostat and/or the control module.

The control module and/or the thermostat can provide information on the measurements of the IAQ sensor module and other data (e.g., statuses of mitigation devices, local outdoor air conditions, etc.) to one or more user devices (e.g., of tenants, occupants, customers, contractors, etc.) associated with the building. For example, the building may be a single-family residence, and the customer may be the homeowner, a landlord, or a tenant. In other implementations, the building may be a light commercial building, and the customer may be the building owner, a tenant, or a property management company.

The control module and/or the thermostat controls operation of the mitigation devices based on the measurements from the IAQ sensor module. For example, the control module and/or the thermostat controls operation of the mitigation devices based on maintaining a temperature measured by the IAQ sensor module within upper and lower temperature limits, based on maintaining a RH measured by the IAQ sensor within upper and lower RH limits, based on maintaining the amount of particulate in the air at the IAQ sensor module below a predetermined amount of particulate, based on maintaining the amount of VOCs in the air at the IAQ sensor module below a predetermined amount of VOCs, and/or based on maintaining the amount of carbon dioxide in the air at the IAQ sensor module below a predetermined amount of carbon dioxide.

For example, the control module and/or the thermostat may turn on a dehumidifier when the RH is greater than an upper dehumidification RH limit and maintain the dehumidifier on until the RH becomes less than a lower dehumidification RH limit. The control module and/or the thermostat may turn on a humidifier when the RH is less than a lower humidification RH limit and maintain the humidifier on until the RH becomes greater than an upper humidification RH limit. The control module and/or the thermostat may turn on a particulate decreasing device (e.g., an air cleaner/purifier) when the amount of particulate is greater than an upper particulate limit and maintain the particulate decreasing device on until the amount of particulate becomes less than a lower particulate limit. The control module and/or the thermostat may turn on a carbon dioxide decreasing device (e.g., a ventilator) when the amount of carbon dioxide is greater than an upper carbon dioxide limit and maintain the carbon dioxide decreasing device on until the amount of carbon dioxide becomes less than a lower carbon dioxide limit. The control module and/or the thermostat may turn on a VOC decreasing device (e.g., a ventilator or an air/cleaner purifier) when the amount of VOCs is greater than an upper VOC limit and maintain the VOC decreasing device on until the amount of VOCs becomes less than a lower VOC limit.

The limits may be set to predetermined values by default. The limits, however, may be too high or too low for the building under some circumstances. The limits being too high or too low may cause over-use of one or more mitigation devices. The control module may therefore adjust (increase or decrease) one or more of the limits.

Additionally, mitigation of a deviation of one parameter may cause a deviation in another parameter and prompt mitigation of the other parameter. For example, mitigation of VOCs and/or carbon dioxide may cause an increase in RH within the building as air from within the building is vented to outside of the building and more humid outside air is drawn into the building. If the RH within the building increases to greater than the upper dehumidification RH limit due to the mitigation of VOCs and/or carbon dioxide, the control module and/or the thermostat may trigger dehumidification. To prevent mitigation of one parameter from causing another parameter to be mitigated, the control module may adjust (increase or decrease) one or more of the limits. Adjusting one of more of the limits may increase an overall amount of time spent with one or more IAQ parameters between the respective upper and lower limits. Stated differently, one or more of the limits may decrease an overall amount of time spent with one or more IAQ parameters being mitigated or outside of the respective upper and lower limits.

As used in this application, the term HVAC can encompass all environmental comfort systems in a building, including heating, cooling, humidifying, dehumidifying, and air exchanging and purifying, and covers devices such as furnaces, heat pumps, humidifiers, dehumidifiers, ventilators, and air conditioners. HVAC systems as described in this application do not necessarily include both heating and air conditioning, and may instead have only one or the other.

In split HVAC systems, an air handler unit is often located indoors, and a condensing unit is often located outdoors. In heat pump systems, the function of the air handler unit and the condensing unit are reversed depending on the mode of the heat pump. As a result, although the present disclosure uses the terms air handler unit and condensing unit, the terms indoor unit and outdoor unit could be used instead in the context of a heat pump. The terms indoor unit and outdoor unit emphasize that the physical locations of the components stay the same while their roles change depending on the mode of the heat pump. A reversing valve selectively reverses the flow of refrigerant from what is shown in FIG. 1 depending on whether the system is heating the building or cooling the building in a heat pump system. When the flow of refrigerant is reversed, the roles of the evaporator and condenser are reversed—i.e., refrigerant evaporation occurs in what is labeled the condenser while refrigerant condensation occurs in what is labeled as the evaporator.

The control module and/or the thermostat upload data to a remote location. The remote location may be accessible via any suitable network, including the Internet. The remote location includes one or more computers, which will be referred to as servers. The servers execute a monitoring system on behalf of a monitoring company. Additionally or alternatively, a user computing device may serve as the monitoring system. The monitoring system receives and processes the data from the controller and/or thermostat of customers who have such systems installed. The monitoring system can provide performance information, diagnostic alerts, and error messages to one or more users associated with the building and/or third parties, such as designated HVAC contractors.

A server of the monitoring system includes a processor and memory. The memory stores application code that processes data received from the controller and/or the thermostat. The processor executes this application code and stores received data either in the memory or in other forms of storage, including magnetic storage, optical storage, flash memory storage, etc. While the term server is used in this application, the application is not limited to a single server.

A collection of servers may together operate to receive and process data from multiple buildings. A load balancing algorithm may be used between the servers to distribute processing and storage. The present application is not limited to servers that are owned, maintained, and housed by a monitoring company. Although the present disclosure describes diagnostics and processing and alerting occurring in a remote monitoring system, some or all of these functions may be performed locally using installed equipment and/or customer resources, such as on a customer computer or computers.

Customers and/or HVAC contractors may be notified of current and predicted issues (e.g., dirty filter) affecting effectiveness or efficiency of the HVAC system and/or the mitigating devices, and may receive notifications related to routine maintenance. The methods of notification may take the form of push or pull updates to an application, which may be executed on a smart phone, tablet, another type of mobile device, or on a computer (e.g., laptop or desktop). Notifications may also be viewed using web applications or on local displays, such as on the thermostat and/or other displays located throughout the building. Notifications may also include text messages, emails, social networking messages, voicemails, phone calls, etc.

Based on measurements from the control module, the thermostat, and/or the IAQ sensor module, the monitoring company can determine whether various components are operating at their peak performance. The monitoring company can advise the customer and a contractor when performance is reduced. This performance reduction may be measured for the system as a whole, such as in terms of efficiency, and/or may be monitored for one or more individual components.

In addition, the monitoring system may detect and/or predict failures of one or more components of the system. When a failure is detected, the customer can be notified and potential remediation steps can be taken immediately. For example, components of the HVAC system may be shut down to prevent or minimize damage, such as water damage, to HVAC components. A contractor can also be notified that a service call may be required. Depending on the contractual relationship between the customer and the contractor, the contractor may schedule a service call to the building.

The monitoring system may provide specific information to a contractor, such as identifying information of the customer's components, including make and model numbers, as well as indications of the specific part numbers of components. Based on this information, the contractor can allocate the correct repair personnel that have experience with the specific components and/or the system. In addition, a service technician is able to bring replacement parts, avoiding return trips after diagnosis.

Depending on the severity of the failure, the customer and/or contractor may be advised of relevant factors in determining whether to repair or replace some or all of the components. For example only, these factors may include relative costs of repair versus replacement, and may include quantitative or qualitative information about advantages of replacement equipment. For example, expected increases in efficiency and/or comfort with new equipment may be provided. Based on historical usage data and/or electricity or other commodity prices, the comparison may also estimate annual savings resulting from the efficiency improvement.

As mentioned above, the monitoring system may also predict impending failures. This allows for preventative maintenance and repair prior to an actual failure of components. Alerts regarding detected or impending failures reduce the time when the HVAC system is out of operation and allows for more flexible scheduling for both the customer and contractor. If the customer is out of town, these alerts may prevent damage from occurring when the customer is not present to detect the failure of a component. For example, failure of heating components of the HVAC system in winter may lead to pipes freezing and bursting.

Alerts regarding potential or impending failures may specify statistical timeframes before the failure is expected. For example only, if a sensor is intermittently providing bad data, the monitoring system may specify an expected amount of time before it is likely that the sensor effectively stops working due to the prevalence of bad data. Further, the monitoring system may explain, in quantitative or qualitative terms, how the current operation and/or the potential failure will affect operation of the HVAC system. This enables the customer to prioritize and budget for repairs.

For the monitoring service, the monitoring company may charge a periodic rate, such as a monthly rate. This charge may be billed directly to the customer and/or may be billed to the contractor. The contractor may pass along these charges to the customer and/or may make other arrangements, such as by requiring an up-front payment and/or applying surcharges to repairs and service visits.

The monitoring service allows the customer to remotely monitor real-time data within the building, outside of the building, and/or control components of the system, such as setting temperature and RH setpoints and other IAQ setpoints, enabling or disabling heating, cooling, ventilation, air purification, etc. In addition, the customer may be able to track usage data for components of the system and/or historical data.

In addition to being uploaded to the remote monitoring service (also referred to as the cloud), monitored data may be transmitted to a local device in the building. For example, a smartphone, laptop, or proprietary portable device may receive monitoring information to diagnose problems and receive real-time performance data. Alternatively, data may be uploaded to the cloud and then downloaded onto a local computing device, such as via the Internet from an interactive web site.

In FIG. 1, a block diagram of an example HVAC system is presented. In this particular example, a forced air system with a gas furnace is shown. Return air is pulled from the building through a filter 104 by a circulator blower 108. The circulator blower 108, also referred to as a fan, is controlled by a control module 112. The control module 112 receives signals from a thermostat 116. For example only, the thermostat 116 may include one or more temperature set points specified by the user.

The thermostat 116 may direct that the circulator blower 108 be turned on at all times or only when a heat request or cool request is present (automatic fan mode). In various implementations, the circulator blower 108 can operate at one or more discrete speeds or at any speed within a predetermined range. For example, the control module 112 may switch one or more switching relays (not shown) to control the circulator blower 108 and/or to select a speed of the circulator blower 108.

The thermostat 116 provides the heat and/or cool requests to the control module 112. When a heat request is made, the control module 112 causes a burner 120 to ignite. Heat from combustion is introduced to the return air provided by the circulator blower 108 in a heat exchanger 124. The heated air is supplied to the building and is referred to as supply air.

The burner 120 may include a pilot light, which is a small constant flame for igniting the primary flame in the burner 120. Alternatively, an intermittent pilot may be used in which a small flame is first lit prior to igniting the primary flame in the burner 120. A sparker may be used for an intermittent pilot implementation or for direct burner ignition. Another ignition option includes a hot surface igniter, which heats a surface to a high enough temperature that, when gas is introduced, the heated surface initiates combustion of the gas. Fuel for combustion, such as natural gas, may be provided by a gas valve 128.

The products of combustion are exhausted outside of the building, and an inducer blower 132 may be turned on prior to ignition of the burner 120. In a high efficiency furnace, the products of combustion may not be hot enough to have sufficient buoyancy to exhaust via conduction. Therefore, the inducer blower 132 creates a draft to exhaust the products of combustion. The inducer blower 132 may remain running while the burner 120 is operating. In addition, the inducer blower 132 may continue running for a set period of time after the burner 120 turns off.

A single enclosure, which will be referred to as an air handler unit 136, may include the filter 104, the circulator blower 108, the control module 112, the burner 120, the heat exchanger 124, the inducer blower 132, an expansion valve 140, an evaporator 144, and a condensate pan 146. In various implementations, the air handler unit 136 includes an electrical heating device (not shown) instead of or in addition to the burner 120. When used in addition to the burner 120, the electrical heating device may provide backup or secondary (extra) heat to the burner 120.

In FIG. 1, the HVAC system includes a split air conditioning system. Refrigerant is circulated through a compressor 148, a condenser 152, the expansion valve 140, and the evaporator 144. The evaporator 144 is placed in series with the supply air so that when cooling is desired, the evaporator 144 removes heat from the supply air, thereby cooling the supply air. During cooling, the evaporator 144 is cold (e.g., below the dew point of the air within the building), which causes water vapor to condense. This water vapor is collected in the condensate pan 146, which drains or is pumped out.

A control module 156 receives a cool request from the control module 112 and controls the compressor 148 accordingly. The control module 156 also controls a condenser fan 160, which increases heat exchange between the condenser 152 and outside air. In such a split system, the compressor 148, the condenser 152, the control module 156, and the condenser fan 160 are generally located outside of the building, often in a single condensing unit 164.

In various implementations, the control module 156 may include a run capacitor, a start capacitor, and a contactor or relay. In various implementations, the start capacitor may be omitted, such as when the condensing unit 164 includes a scroll compressor instead of a reciprocating compressor. The compressor 148 may be a variable-capacity compressor and may respond to a multiple-level cool request. For example, the cool request may indicate a mid-capacity call for cooling or a high-capacity call for cooling. The compressor 148 may vary its capacity according to the cool request.

The electrical lines provided to the condensing unit 164 may include a 240 volt mains power line (not shown) and a 24 volt switched control line. The 24 volt control line may correspond to the cool request shown in FIG. 1. The 24 volt control line controls operation of the contactor. When the control line indicates that the compressor should be on, the contactor contacts close, connecting the 240 volt power supply to the compressor 148. In addition, the contactor may connect the 240 volt power supply to the condenser fan 160. In various implementations, such as when the condensing unit 164 is located in the ground as part of a geothermal system, the condenser fan 160 may be omitted. When the 240 volt mains power supply arrives in two legs, as is common in the U.S., the contactor may have two sets of contacts, and can be referred to as a double-pole single-throw switch.

Typically, the thermostat 116 includes a temperature sensor and a relative humidity (RH) sensor. When in a heating (heat) mode, the thermostat 116 generates a heat request when the temperature measured by the temperature sensor is less than a lower temperature limit. When in a cooling (cool) mode, the thermostat 116 generates a cool request when the temperature measured by the temperature sensor is greater than an upper temperature limit. The upper and lower temperature limits may be set to a setpoint temperature+ and − a predetermined amount (e.g., 1, 2, 3, 4, 5 degrees Fahrenheit), respectively. The setpoint temperature may be set to a predetermined temperature by default and may be adjusted by a user.

Figure 2A:
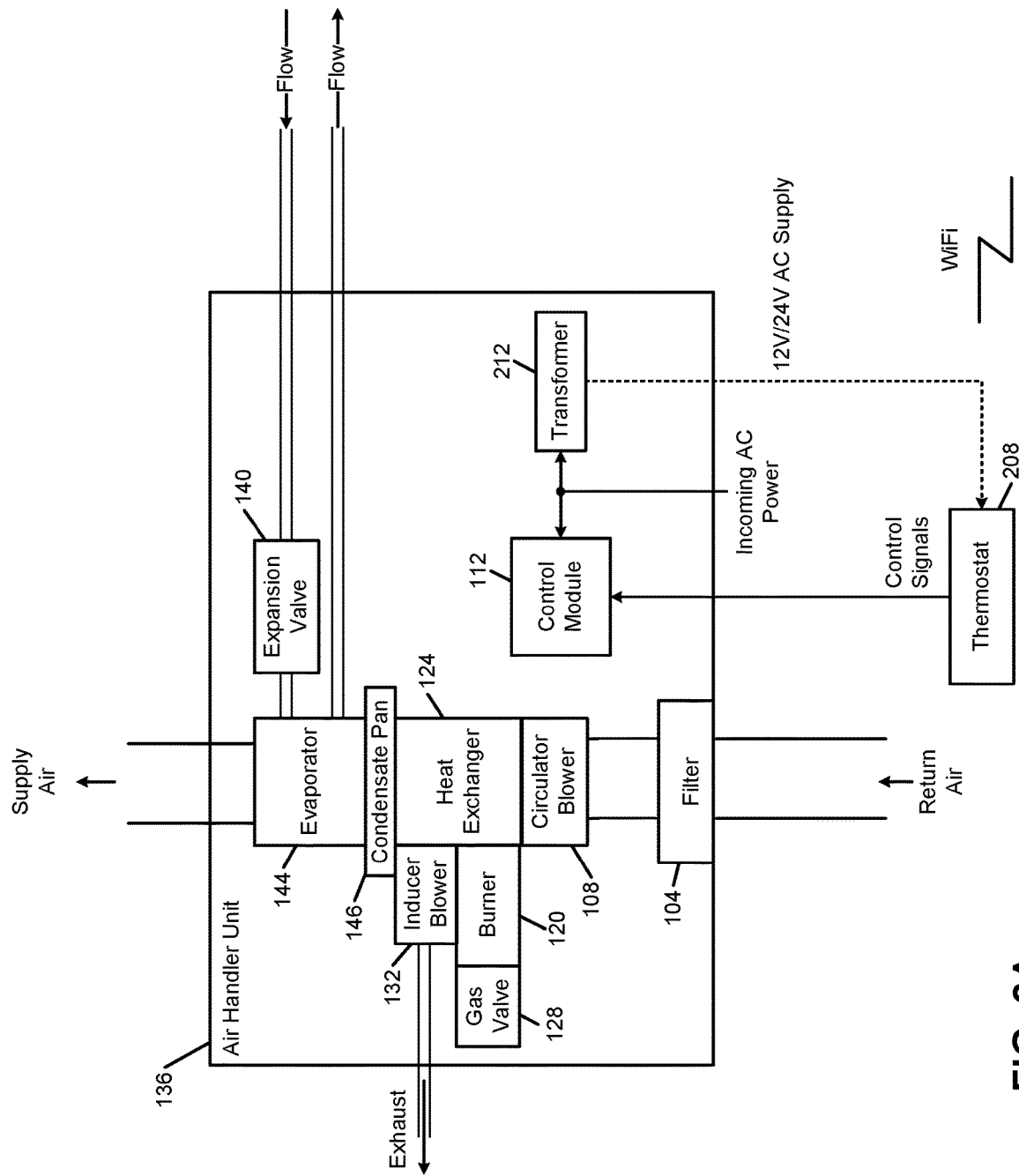
FIG. 2A is a functional block diagram of an air handler unit of an example HVAC system.
Figure 2B:
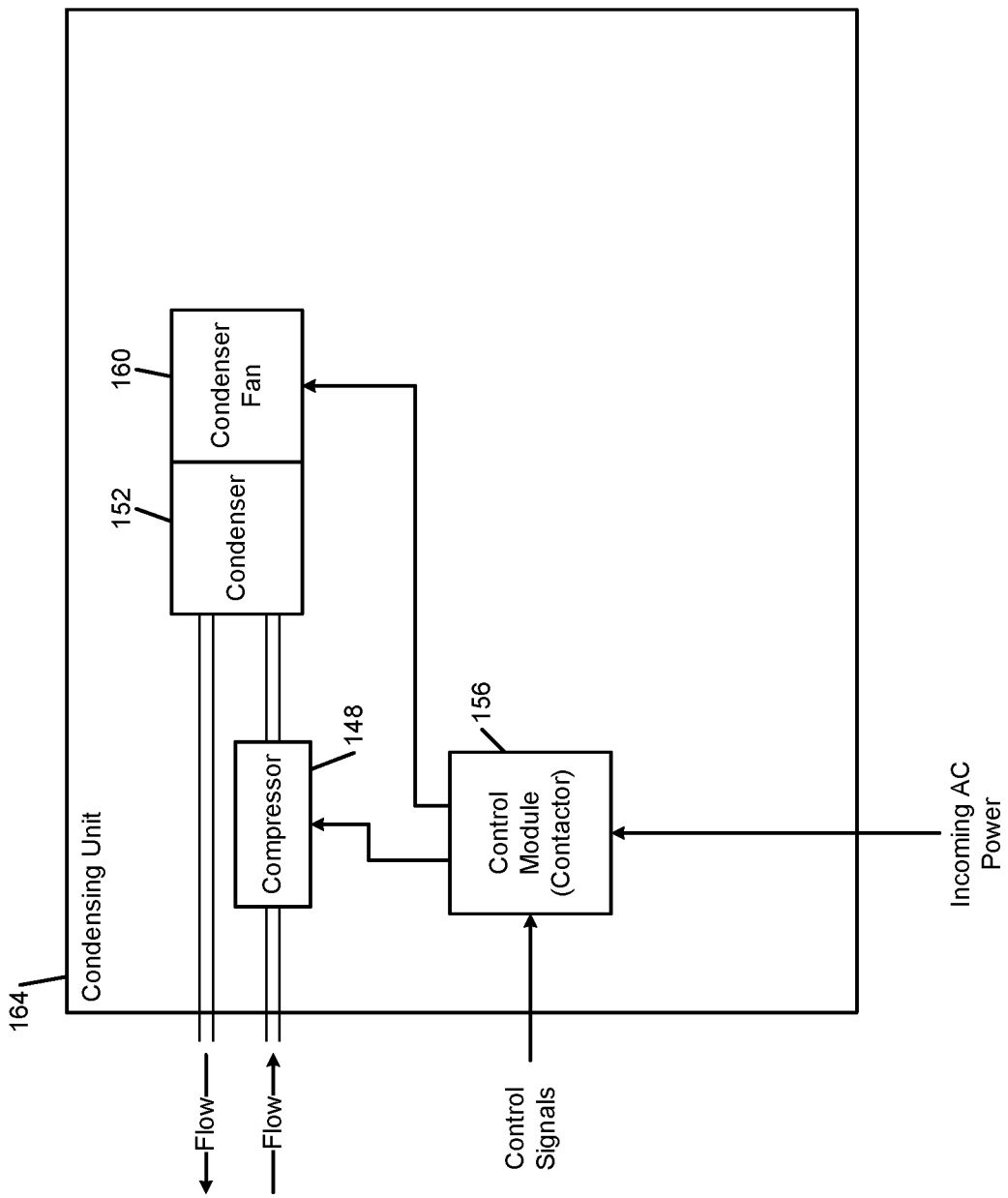
FIGS. 2B and 2C are functional block diagrams of example condenser units of example HVAC systems.

FIGS. 2A-2B are functional block diagrams of an example monitoring system associated with an HVAC system of a building. The air handler unit 136 of FIG. 1 is shown for reference. The thermostat 116 of FIG. 1 is a WiFi thermostat 208 having networking capability.

In many systems, the air handler unit 136 is located inside the building, while the condensing unit 164 is located outside the building. The present disclosure is not limited to that arrangement, however, and applies to other systems including, as examples only, systems where the components of the air handler unit 136 and the condensing unit 164 are located in close proximity to each other or even in a single enclosure. The single enclosure may be located inside or outside of the building. In various implementations, the air handler unit 136 may be located in a basement, garage, or attic. In ground source systems, where heat is exchanged with the earth, the air handler unit 136 and the condensing unit 164 may be located near the earth, such as in a basement, crawlspace, garage, or on the first floor, such as when the first floor is separated from the earth by only a concrete slab.

In FIG. 2A, a transformer 212 can be connected to an AC line in order to provide AC power to the control module 112 and the thermostat 208. For example, the transformer 212 may be a 10-to-1 transformer and therefore provide either a 12V or 24V AC supply depending on whether the air handler unit 136 is operating on nominal 120 volt or nominal 240 volt power.

The control module 112 controls operation in response to signals from the thermostat 208 received over control lines. The control lines may include a call for cool (cool request), a call for heat (heat request), and a call for fan (fan request). The control lines may include a line corresponding to a state of a reversing valve in heat pump systems.

The control lines may further carry calls for secondary heat and/or secondary cooling, which may be activated when the primary heating or primary cooling is insufficient. In dual fuel systems, such as systems operating from either electricity or natural gas, control signals related to the selection of the fuel may be monitored. Further, additional status and error signals may be monitored, such as a defrost status signal, which may be asserted when the compressor is shut off and a defrost heater operates to melt frost from an evaporator.

Figure 2C:
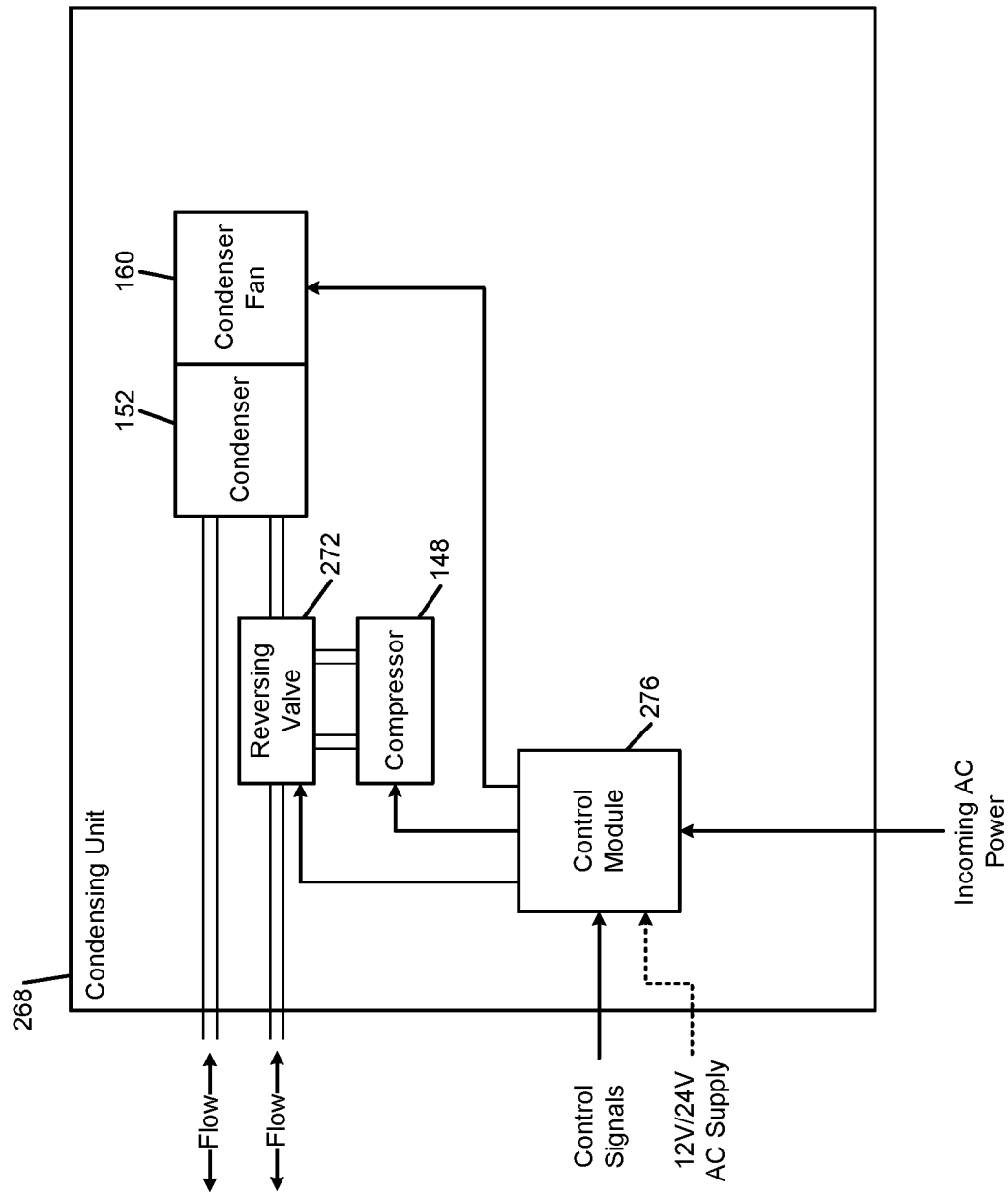

One or more of these control signals (on the control lines) is also transmitted to the condensing unit 164 (shown in FIGS. 2B and 2C). In various implementations, the condensing unit 164 may include an ambient temperature sensor that generates temperature data. When the condensing unit 164 is located outdoors, the ambient temperature represents an outside (or outdoor) ambient temperature. The temperature sensor supplying the ambient temperature may be located outside of an enclosure of the condensing unit 164. Alternatively, the temperature sensor may be located within the enclosure, but exposed to circulating air. In various implementations the temperature sensor may be shielded from direct sunlight and may be exposed to an air cavity that is not directly heated by sunlight. Alternatively or additionally, online (including Internet-based) weather data based on the geographical location of the building may be used to determine sun load, outside ambient air temperature, relative humidity, particulate, VOCs, carbon dioxide, etc.

In FIG. 2C, an example condensing unit 268 is shown for a heat pump implementation. The condensing unit 268 may be configured similarly to the condensing unit 164 of FIG. 2B. Although referred to as the condensing unit 268, the mode of the heat pump determines whether the condenser 152 of the condensing unit 268 is actually operating as a condenser or as an evaporator. A reversing valve 272 is controlled by a control module 276 and determines whether the compressor 148 discharges compressed refrigerant toward the condenser 152 (cooling mode) or away from the condenser 152 (heating mode). The control module 276 controls the reversing valve 272 and the compressor 148 based on the control signals. The control module 276 may receive power, for example, from the transformer 212 of the air handler unit 136 or via the incoming AC power line.

FIG. 3 includes a functional block diagram of an example indoor air quality (IAQ) sensor module 304 that can be used with an HVAC system and/or one or more other mitigation devices. The IAQ sensor module 304 includes one, more than one, or all of: a temperature sensor 308, a relative humidity (RH) sensor 312, a particulate sensor 316, a volatile organic compounds (VOC) sensor 320, and a carbon dioxide sensor 324. The IAQ sensor module 304 may also include a sampling module 328 and a transceiver module 332.

A power supply 336 may receive AC power from a standard wall outlet (or receptacle) 340 via a plug 344. For example, the standard wall outlet 340 may provide nominal 120 volt or nominal 240 volt AC power. The power supply 336 may include an AC to direct current (DC) converter that converts the AC power into DC power, such as 5 volt, 12 volt, or 24 volt DC power. The power supply 336 supplies power to the components of the IAQ sensor module 304 including the sensors, the sampling module 328, and the transceiver module 332. While the example of the power supply 336 being integrated within the IAQ sensor module 304 is provided, the power supply 336 may be integrated with the plug 344 in various implementations. Also, while the example of the power supply 336 providing one DC voltage to the components of the IAQ sensor module 304, the power supply 336 may provide two or more different DC voltages to different components of the IAQ sensor module 304.

Additionally or alternatively, the power supply 336 may include one or more batteries or one or more solar cells that supply power to the components of the IAQ sensor module 304. The one or more batteries may be replaceable or non-replaceable. In the example of the one or more batteries being non-replaceable, the one or more batteries may be re-chargeable, such as via a standard wall outlet. In this example, the IAQ sensor module 304 may include a charger that charges the one or more batteries using power supplied, for example, via a standard wall outlet.

The IAQ sensor module 304 is portable and can be moved into different rooms of a building. The IAQ sensor module 304 could also be placed outside the building, for example, to measure one or more conditions outside of the building, calibration, or for one or more other reasons. The temperature sensor 308 measures a temperature of air at the IAQ sensor module 304. The RH sensor 312 measures a relative humidity of air at the IAQ sensor module 304. The particulate sensor 316 measures an amount (e.g., a mass flow rate, such as micrograms (μg) per cubic meter) of particulate in air at the IAQ sensor module 304 having a diameter that is less than a predetermined size (e.g., 2.5 or 10 micrometers (μm)). The VOC sensor 320 measures an amount (e.g., parts per billion (ppb)) of VOC in air at the IAQ sensor module 304. The carbon dioxide sensor 324 measures an amount (e.g., ppm) of carbon dioxide in air at the IAQ sensor module 304. The included ones of the temperature sensor 308, the RH sensor 312, the particulate sensor 316, the VOC sensor 320, and the carbon dioxide sensor 324 will be referred to collectively as the IAQ sensors.

The sampling module 328 samples (analog) measurements of the IAQ sensors. The sampling module 328 may also digitize and/or store values of the measurements of the IAQ sensors. In various implementations, the IAQ sensors may be digital sensors and output digital values corresponding to the respective measured parameters. In such implementations, the sampling module 328 may perform storage or may be omitted.

The IAQ sensor module 304 may include one or more expansion ports to allow for connection of additional sensors and/or to allow connection to other devices. Examples of other devices include one or more other IAQ sensor modules, one or more other types of the IAQ sensors not included in the IAQ sensor module 304, a home security system, a proprietary handheld device for use by contractors, a mobile computing device, and other types of devices.

The transceiver module 332 transmits frames of data corresponding to predetermined periods of time. Each frame of data may include the measurements of the IAQ sensors over a predetermined period. One or more calculations may be performed for the data of each frame of data, such as averaging the measurements of one or more of the IAQ sensors. Each frame (including the calculations and/or the measurements) may be transmitted to a monitoring system, as discussed further below. The measurements of the IAQ sensors may be sampled at a predetermined rate, such as 10 samples per minute or another suitable rate. Each frame may correspond to a predetermined number of sets of samples (e.g., 10). The monitoring system may provide visual representations of the measurements over predetermined periods of time along with other data, as discussed further below.

The transceiver module 332 transmits each frame (including the calculations and/or the measurements) to an IAQ control module 404 and/or the thermostat 208. The transceiver module 332 transmits the frames wirelessly via one or more antennas, such as antenna 348, using a proprietary or standardized, wired or wireless protocol, such as Bluetooth, ZigBee (IEEE 802.15.4), 900 Megahertz, 2.4 Gigahertz, WiFi (IEEE 802.11). The IAQ sensor module 304 may communicate directly with the IAQ control module 404 and/or the thermostat 208 or with a separate computing device, such as a smartphone, tablet, or another type of computing device. In various implementations, a gateway 408 is implemented, which creates a wireless network for the IAQ sensor module 304, the IAQ control module 404, and the thermostat 208. The gateway 408 may also interface with a customer router 412 using a wired or wireless protocol, such as Ethernet (IEEE 802.3).

Figure 4A:
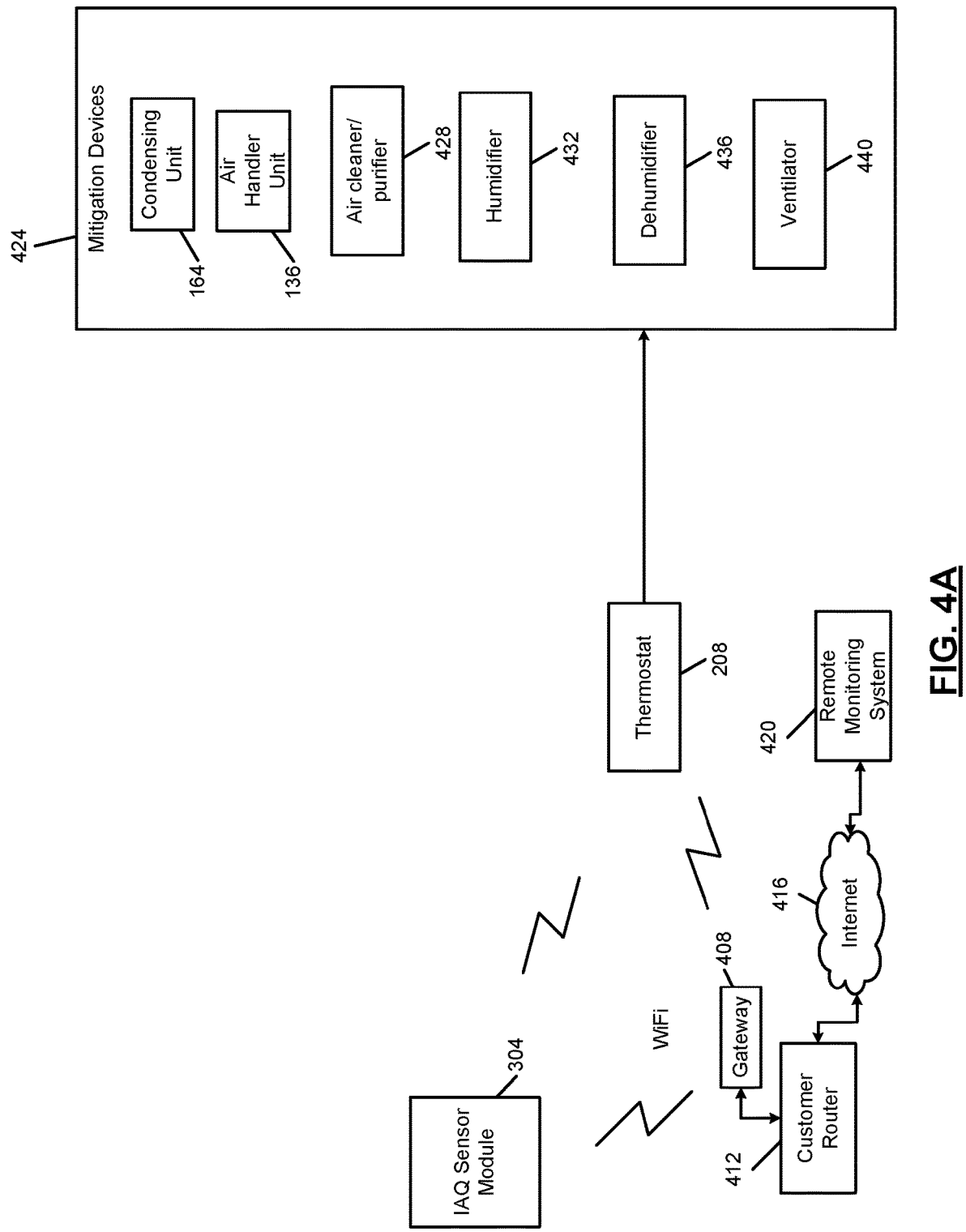
Figure 4B:
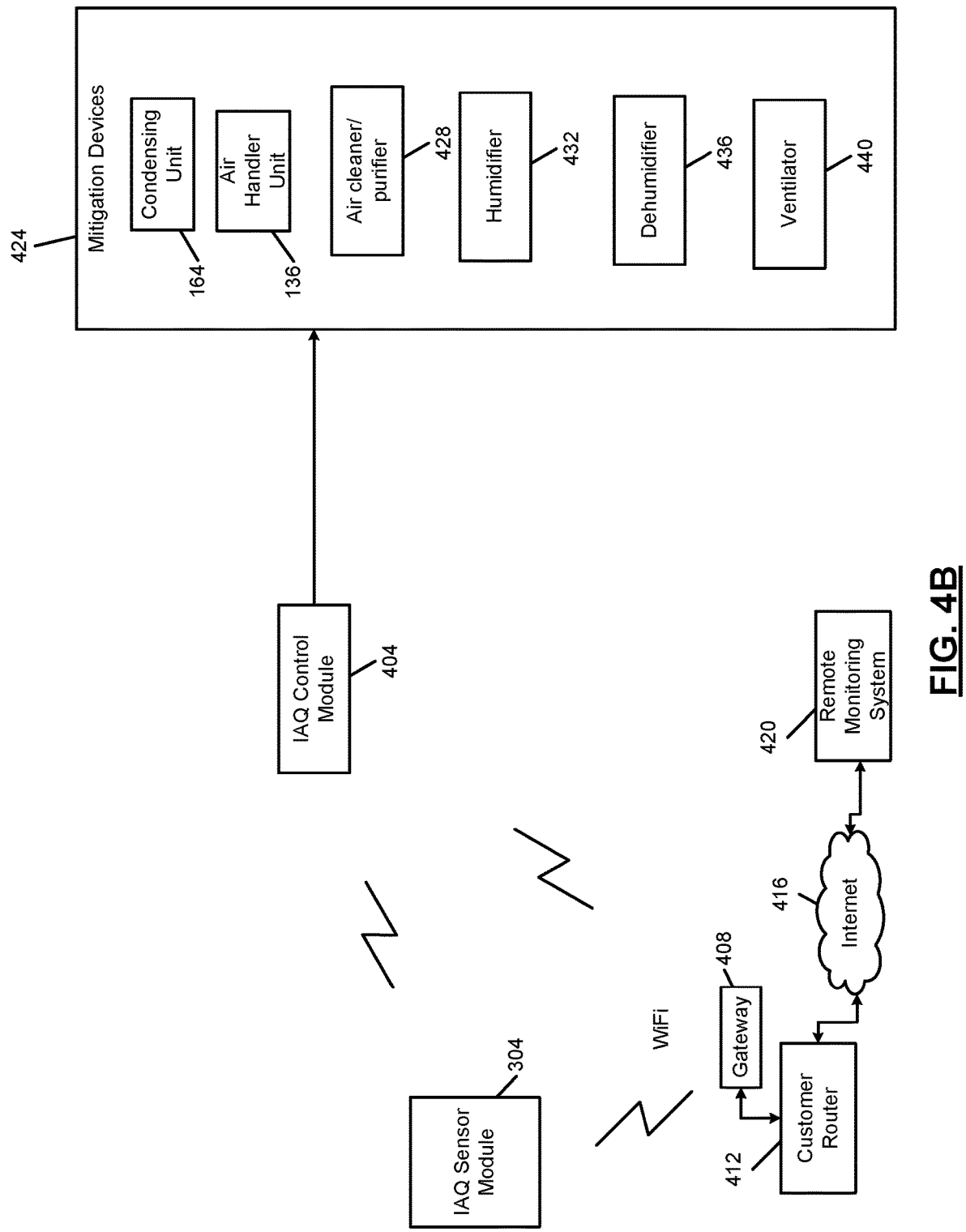

Referring now to FIGS. 4A-4C, functional block diagrams of example IAQ control systems are presented. The IAQ control module 404 may communicate with the customer router 412 using WiFi. Alternatively, the IAQ control module 404 may communicate with the customer router 412 via the gateway 408. The thermostat 208 may also communicate with the customer router 412 using WiFi or via the gateway 408. In various implementations, the IAQ control module 404 and the thermostat 208 may communicate directly or via the gateway 408.

The IAQ sensor module 304, the IAQ control module 404, and/or the thermostat 208 transmits data measured by the IAQ sensor module 304 and parameters of the IAQ control module 404 and/or the thermostat 208 over a wide area network 416, such as the Internet (referred to as the Internet 416). The IAQ sensor module 304, the IAQ control module 404, and/or the thermostat 208 may access the Internet 416 using the customer router 412 of the customer. The customer router 412 may already be present to provide Internet access to other devices (not shown) within the building, such as a customer computer and/or various other devices having Internet connectivity, such as a DVR (digital video recorder) or a video gaming system.

The IAQ sensor module 304, the IAQ control module 404, and/or the thermostat 208 transmit the data to a remote monitoring system 420 via the Internet 416 using the customer router 412. Further discussion of the remote monitoring system 420 is provided below.

The IAQ control module 404 and/or the thermostat 208 control operation (e.g., on, off, speed, etc.) of mitigation devices 424 based on the measurements from the IAQ sensor module 304. For example, the measurements of the IAQ sensor module 304 may be provided to the thermostat 208 and the thermostat 208 may control operation of the mitigation devices 424 in various implementations (e.g., FIG. 4A). The IAQ control module 404 can be omitted in such implementations. While the example of the thermostat 208 controlling the mitigation devices 424 will be discussed, alternatively the IAQ control module 404 may control operation of the mitigation devices 424 (e.g., FIG. 4B), or the thermostat 208 and the IAQ control module 404 may together control the mitigation devices 424 (e.g., FIG. 4C).

The IAQ control module 404 and/or thermostat 208 control and communicate with the mitigation devices 424 wirelessly, by wire, using a combination of wireless and wired connections. In the case of wireless control and communication, the IAQ control module 404, the thermostat 208, and the mitigation devices 424 include respective transceivers.

The mitigation devices 424 include: (i) the condensing unit 164, (ii) the air handler unit 136 (e.g., the circulator blower 108), (iii) an air cleaner/purifier 428, (iv) a humidifier 432, (v) a dehumidifier 436, and (vi) a ventilator 440. The air cleaner/purifier 428 may be separate from the air handler unit 136 (e.g., a standalone air cleaner/purifier). In various implementations, the air handler unit 136 may serve as the air cleaner/purifier 428. The air cleaner/purifier 428 draws in air and forces the air through a filter before expelling filtered air to the building. The filter may be rated (e.g., minimum efficiency reporting value, MERV) to remove a predetermined amount (e.g., 95%) of particulate of the size measured by the particulate sensor 316. Operation of the air cleaner/purifier 428 may include whether the air cleaner/purifier 428 is on or off and, when on, a speed of the air cleaner/purifier 428. The air cleaner/purifier 428 may have a single speed or multiple discrete speeds.

Operation of the air cleaner/purifier 428 may be controlled via wire or wirelessly by the thermostat 208. Examples of wireless communication and control include, but are not limited to, Bluetooth connections and WiFi connections. For example only, the thermostat 208 may wirelessly control whether the air cleaner/purifier 428 is on or off and, if on, the speed of the air cleaner/purifier 428. As one example, the thermostat 208 may turn the air cleaner/purifier 428 on when the amount of particulate measured by the particulate sensor 316 is greater than a first predetermined amount of particulate. The thermostat 208 may leave the air cleaner/purifier 428 on until the amount of particulate measured by the particulate sensor 316 is less than a second predetermined amount of particulate that is less than the first predetermined amount of particulate. The thermostat 208 may turn the air cleaner/purifier 428 off when the amount of particulate measured by the particulate sensor 316 is less than the second predetermined amount of particulate. In various implementations, the thermostat 208 may vary the speed of the air cleaner/purifier 428 based on the amount of particulate measured by the particulate sensor 316. For example, the thermostat 208 may increase the speed of the air cleaner/purifier 428 as the amount of particulate increases and vice versa.

The humidifier 432 humidifies air within the building. The humidifier 432 may be included with the air handler unit 136 or a standalone humidifier. For example, when included with the air handler unit 136, the humidifier 432 may add moisture to the supply air before the supply air is output from vents to the building. The humidifier 432 may add moisture to air, for example, by supplying water to a medium (e.g., a pad) and forcing air (e.g., supply air) through the hydrated medium. Alternatively, the humidifier 432 may spray water in the form of mist into air (e.g., supply air). In the example of a standalone humidifier, the humidifier 432 may spray water in the form of mist into air.

Operation of the humidifier 432 may include whether the humidifier 432 is on or off. In various implementations, operation of the humidifier 432 may also include a humidification rate (e.g., an amount of water supplied to the pad or into the air as mist). The humidifier 432 may be configured to provide only a single humidification rate or multiple different humidification rates.

Operation of the humidifier 432 may be controlled via wire or wirelessly by the thermostat 208. For example only, the thermostat 208 may control (by wire) whether the humidifier 432 included with the air handler unit 136 is on or off. As another example, if the humidifier 432 is implemented separately from the air handler unit 136, the thermostat 208 may wirelessly control whether the humidifier 432 is on or off and a humidification rate when on. Examples of wireless communication include, but are not limited to, Bluetooth connections and WiFi connections. For example only, the thermostat 208 may turn the humidifier 432 on when the RH measured by the RH sensor 312 is less than a first predetermined RH. The thermostat 208 may leave the humidifier 432 on until the RH measured by the RH sensor 312 is greater than a second predetermined RH that is greater than the first predetermined RH. The thermostat 208 may turn the humidifier 432 off when the RH measured by the RH sensor 312 is greater than the second predetermined RH.

The dehumidifier 436 dehumidifies (i.e., removes humidity from) air within the building. The dehumidifier 436 may be included with the air handler unit 136 or a standalone dehumidifier. For example, the dehumidifier 436 may draw moisture from the supply air (or add dry air to the supply air) before the supply air is output from vents to the building. Operation of the dehumidifier 436 may include whether the dehumidifier 436 is on or off.

Operation of the dehumidifier 436 may be controlled via wire or wirelessly by the thermostat 208. For example only, the thermostat 208 may control (by wire) whether the dehumidifier 436 included with the air handler unit 136 is on or off. As another example, the thermostat 208 may wirelessly control whether the dehumidifier 436, implemented as a standalone device, is on or off. For example only, the thermostat 208 may turn the dehumidifier 436 on when the RH measured by the RH sensor 312 is greater than a third predetermined RH. The third predetermined RH may be the same as the second predetermined RH or different than (e.g., greater than) the second predetermined RH. The thermostat 208 may leave the dehumidifier 436 on until the RH measured by the RH sensor 312 is less than a fourth predetermined RH that is less than the third predetermined RH. The thermostat 208 may turn the dehumidifier 436 off when the RH measured by the RH sensor 312 is less than the fourth predetermined RH. The fourth predetermined RH may be the same as the first predetermined RH or different than (e.g., greater than) the first predetermined RH.

The ventilator 440 vents air from within the building out of the building. This also passively draws air from outside of the building into the building. The ventilator 440 may be included with the air handler unit 136 (e.g., the inducer blower 132) or a standalone ventilator. Examples of standalone ventilators include blowers that blow air from within the building out of the building (e.g., range hoods fans, bathroom fans, the inducer blower, etc.). Operation of the ventilator 440 may include whether the ventilator 440 is on or off and, when on, a speed. The ventilator 440 may be configured to operate at a single speed or multiple different speeds.

Operation of the ventilator 440 may be controlled via wire or wirelessly by the thermostat 208. For example only, the thermostat 208 may wirelessly control whether the ventilator 440 is on or off and, if on, the speed of the ventilator 440. As one example, the thermostat 208 may turn the ventilator 440 on when the amount of VOCs measured by the VOC sensor 320 is greater than a first predetermined amount of VOCs. The thermostat 208 may leave the ventilator 440 on until the amount of VOCs measured by the VOC sensor 320 is less than a second predetermined amount of VOCs that is less than the first predetermined amount of VOCs. The thermostat 208 may turn the ventilator 440 off when the amount of VOCs measured by the VOC sensor 320 is less than the second predetermined amount of VOCs.

As another example, the thermostat 208 may turn the ventilator 440 on when the amount of carbon dioxide measured by the carbon dioxide sensor 324 is greater than a first predetermined amount of carbon dioxide. The thermostat 208 may leave the ventilator 440 on until the amount of carbon dioxide measured by the carbon dioxide sensor 324 is less than a second predetermined amount of carbon dioxide that is less than the first predetermined amount of carbon dioxide. The thermostat 208 may turn the ventilator 440 off when the amount of carbon dioxide measured by the carbon dioxide sensor 324 is less than the second predetermined amount of carbon dioxide.

The mitigation devices described above are only described as example. One or more of the example mitigation devices may be omitted. One or more other types of mitigation devices may be included. Additionally, while the example of only one of each type of mitigation device is provided, two or more of a given type of mitigation device may be included and controlled.

Changes in temperature and/or humidity also cause changes in particulate, VOCs, and/or carbon dioxide. For example, a change in temperature may cause a change in VOCs, RH, particulate, and/or carbon dioxide. As another example, a change in RH may cause a change in particulate, VOCs, and/or carbon dioxide. For example, particulate may increase as RH increases and vice versa.

The thermostat 208 therefore controls operation of the mitigation devices 424 based on all of the parameters measured by the IAQ sensor module 304 in an attempt to: adjust the temperature within a predetermined temperature range, adjust the RH within a predetermined RH range, adjust the amount of particulate (if measured) to less than a predetermined amount of particulate, adjust the amount of VOCs (if measured) to less than a predetermined amount of VOCs, and to adjust the amount of carbon dioxide (if measured) to less than a predetermined amount of carbon dioxide.

Figure 5A:
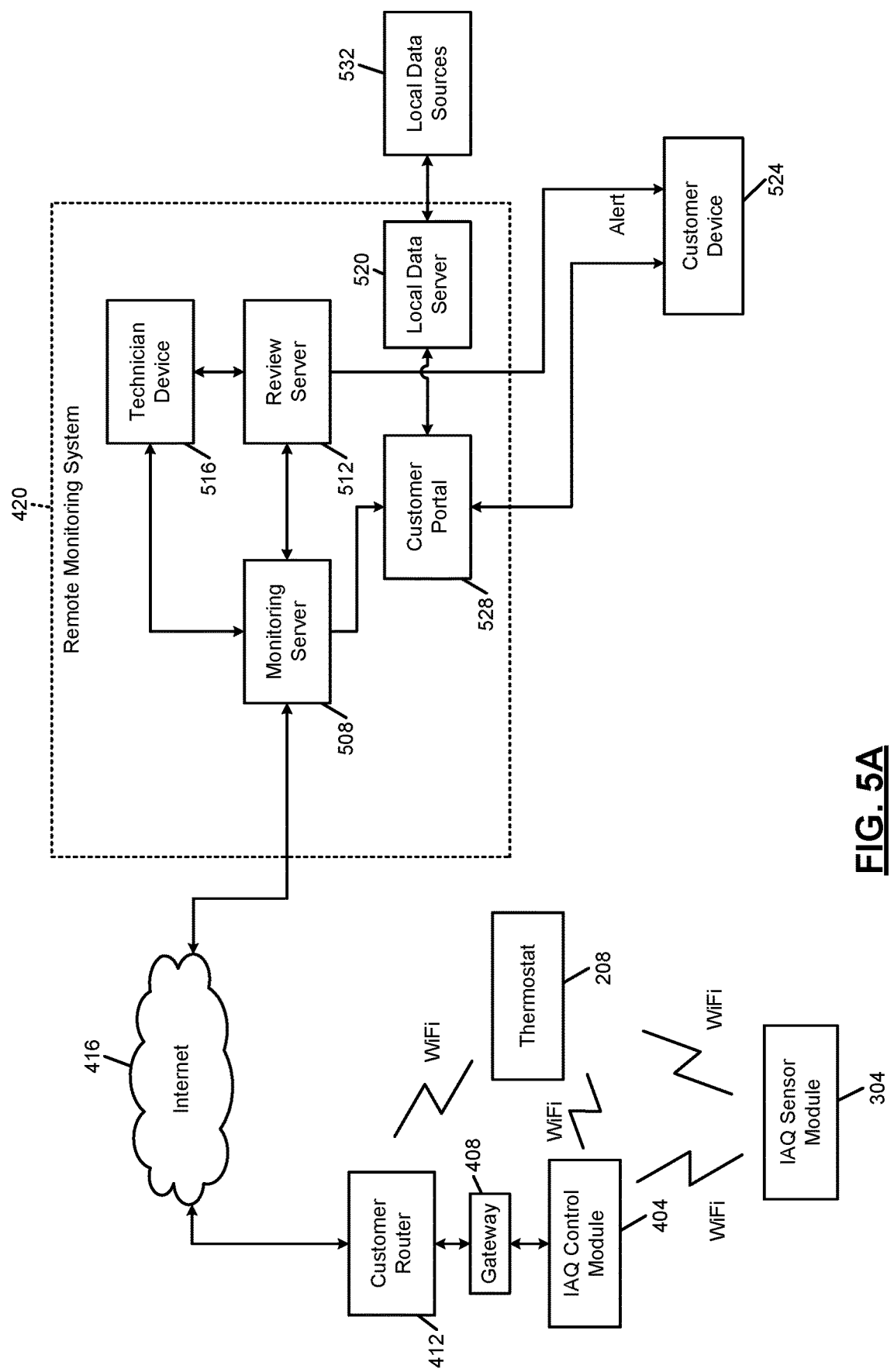
FIG. 5A is a functional block diagram of an example remote monitoring system.

FIG. 5A includes a functional block diagram of an example monitoring system. In FIG. 5A, the IAQ control module 404 and/or the thermostat 208 are shown transmitting, using the customer router 412, data to the remote monitoring system 420 via the Internet 416. In other implementations, the IAQ control module 404 and/or the thermostat 208 may transmit the data to an external wireless receiver. The external wireless receiver may be a proprietary receiver for a neighborhood in which the building is located, or may be an infrastructure receiver, such as a metropolitan area network (such as WiMAX), a WiFi access point, or a mobile phone base station.

The remote monitoring system 420 includes a monitoring server 508 that receives data from the IAQ control module 404 and/or the thermostat 208 and maintains and verifies network continuity with the IAQ control module 404 and/or the thermostat 208. The monitoring server 508 executes various algorithms to store setpoints for the building and to store measurements from the thermostat 208 and/or the IAQ sensor module 304 taken over time.

The monitoring server 508 may notify a review server 512 when one or more predetermined conditions are satisfied. This programmatic assessment may be referred to as an advisory. Some or all advisories may be triaged by a technician to reduce false positives and potentially supplement or modify data corresponding to the advisory. For example, a technician device 516 operated by a technician may be used to review the advisory and to monitor data (in various implementations, in real-time) from the IAQ control module 404 and/or the thermostat 208 via the monitoring server 508.

A technician using the technician device 516 may review the advisory. If the technician determines that a problem or fault is either already present or impending, the technician instructs the review server 512 to send an alert to a customer device 524 that is associated with the building. The technician may determine that, although a problem or fault is present, the cause is more likely to be something different than specified by the automated advisory. The technician can therefore issue a different alert or modify the advisory before issuing an alert based on the advisory. The technician may also annotate the alert sent to the customer device 524 with additional information that may be helpful in identifying the urgency of addressing the alert and presenting data that may be useful for diagnosis or troubleshooting.

In various implementations, minor problems may not be reported to the customer device 524 so as not to alarm the customer or inundate the customer with alerts. The review server 512 (or a technician) may determine whether a problem is minor based on a threshold. For example, an efficiency decrease greater than a predetermined threshold may be reported to the customer device 524, while an efficiency decrease less than the predetermined threshold may not be reported to the customer device 524.

In various implementations, the technician device 516 may be remote from the remote monitoring system 420 but connected via a wide area network. For example only, the technician device 516 may include a computing device such as a laptop, desktop, smartphone, or tablet.

Using the customer device 524 executing an application, the customer can access a customer portal 528, which provides historical and real-time data from the IAQ control module 404 and/or the thermostat 208. The customer portal 528 may also provide setpoints and predetermined ranges for each of the measurements, local outdoor air quality data, statuses of the mitigation devices 424 (e.g., on or off), and other data to the customer device 524. Via the customer device 524, the customer may change the setpoints and predetermined ranges. The monitoring server 508 transmits changed setpoints and predetermined ranges to the thermostat 208 and/or the IAQ control module 404 for use in controlling operation of the mitigation devices 424.

The remote monitoring system 420 includes a local data server 520 that obtains local data at (outside) the building. The local data server 520 may obtain the local data from one or more local data sources 532 via a wide area network, such as the internet 416, using a geographical location of the building. The geographical location may be, for example, an address, zip code, coordinates, or other geographical identifier of the building. The remote monitoring system 420 may obtain the geographical location of the building, for example, via the customer device 524 before providing data to the customer device 524. The local data includes, for example, air temperature within a predetermined geographical area including the geographical location of the building, RH within the predetermined geographical area, amount of VOCs in the air within the predetermined geographical area, amount of particulate of the predetermined size measured by the particulate sensor 316 within the predetermined geographical area, and amount of carbon dioxide within the predetermined geographical area.

FIG. 5B includes a functional block diagram of an example monitoring system where the customer device 524 serves as a monitoring system and provides the functionality of the remote monitoring system 420. The thermostat 208 and/or the IAQ control module 404 transmit data to the customer device 524 wirelessly, such as via a Bluetooth connection, WiFi, or another wireless connection. The customer device 524 may obtain the local data from the local data sources 532 via a wide area network, such as the internet 416. Alternatively, the IAQ control module 404 or the thermostat 208 may serve as a monitoring system and provide the functionality of the remote monitoring system 420.

Figure 6:
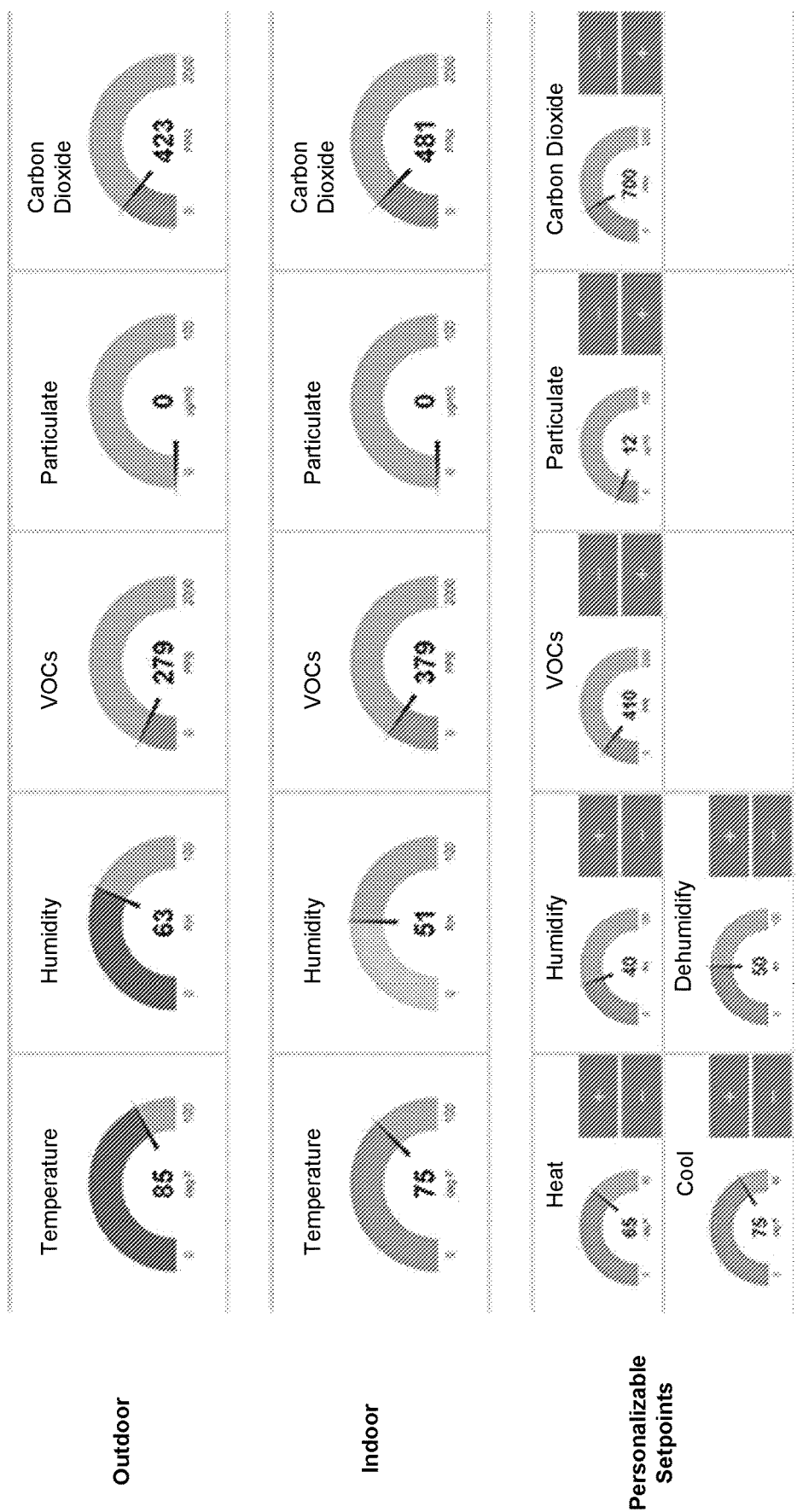

FIG. 6 includes an example user interface displayed by the customer device 524 during execution of the application based on data from the customer portal 528. It should be understood that the following functions are performed by the customer device 524 during execution of the application.

As shown in FIG. 6, the customer device 524 may display real-time values of the temperature, RH, amount of VOCs, amount of particulate, and amount of carbon dioxide (CO2) measured by the IAQ sensor module 304. In FIG. 6, these are illustrated in the row labeled "indoor" as they represent parameters within the building. The real-time values may be received by the customer device 524 from the monitoring server 508 via the customer portal 528.

The customer device 524 may also display real-time values of the temperature, RH, amount of VOCs, amount of particulate, and amount of carbon dioxide (CO2) measured outside of the building but within the predetermined geographical area including the geographical area of the building. In FIG. 6, these are illustrated in the row labeled "outdoor" as they represent parameters outside of the building. The real-time values may be received by the customer device 524 from the monitoring server 508 via the customer portal 528.

The customer device 524 may also display present setpoints for beginning heating (Heat) of the building, cooling (Cool) of the building, humidification (Humidify), dehumidification (Dehumidify), VOC removal (VOCs), particulate removal (Particulate), and carbon dioxide removal (Carbon Dioxide). In FIG. 6, these setpoints are illustrated in the row labeled "setpoints" as they represent setpoints for beginning associated mitigation actions within the building. The present setpoints may be received by the customer device 524 from the monitoring server 508 via the customer portal 528.

A predetermined range for a measurement may be set based on the setpoint for a measurement. For example, a predetermined range for heating may be set to the temperature setpoint for heating plus and minus a predetermined amount. A predetermined range for cooling may be set to the temperature setpoint for cooling plus and minus a predetermined amount. The predetermined amount may be user adjustable in various implementations.

The customer device 524 also allows a user to adjust one or more of the present setpoints via the customer device 524. For example, the customer device 524 may provide positive and negative adjustment inputs in association with one, more than one, or all of the setpoints to allow for adjustment of the present setpoints. FIG. 6 includes the example of +serving as the positive adjustment input and—serving as the negative adjustment input. Adjustment inputs labeled and provided differently, however, may be used.

In response to receipt of input indicative of user interaction (e.g., touching, clicking, etc.) with an adjustment input associated with a setpoint, the customer device 524 may transmit a command to the monitoring server 508 to adjust (i.e., increment or decrement) the setpoint by a predetermined amount. For example, in response to receipt of input indicative of user interaction (e.g., touching, clicking, etc.) with the positive adjustment input associated with the heating temperature setpoint, the customer device 524 may transmit a command to the monitoring server 508 to increment the heating temperature setpoint by a first predetermined amount. In response to receipt of input indicative of user interaction (e.g., touching, clicking, etc.) with the negative adjustment input associated with the heating temperature setpoint, the customer device 524 may transmit a command to the monitoring server 508 to decrement the heating temperature setpoint by the first predetermined amount. As another example, in response to receipt of input indicative of user interaction (e.g., touching, clicking, etc.)

with the positive adjustment input associated with the humidification RH setpoint, the customer device 524 may transmit a command to the monitoring server 508 to increment the humidification RH setpoint by a second predetermined amount. In response to receipt of input indicative of user interaction (e.g., touching, clicking, etc.) with the negative adjustment input associated with the humidification RH setpoint, the customer device 524 may transmit a command to the monitoring server 508 to decrement the humidification RH setpoint by the second predetermined amount.

The monitoring server 508 relays (transmits) received commands for adjusting setpoints to the thermostat 208 and/or the IAQ control module 404 via the internet 416. Alternatively, the customer device 524 may transmit commands for adjusting setpoints to the thermostat 208 and/or the IAQ control module 404 directly or via the internet 416. The thermostat 208 and/or the IAQ control module 404 adjust the associated setpoints in response to the commands received from the monitoring server 508.

Figure 7:
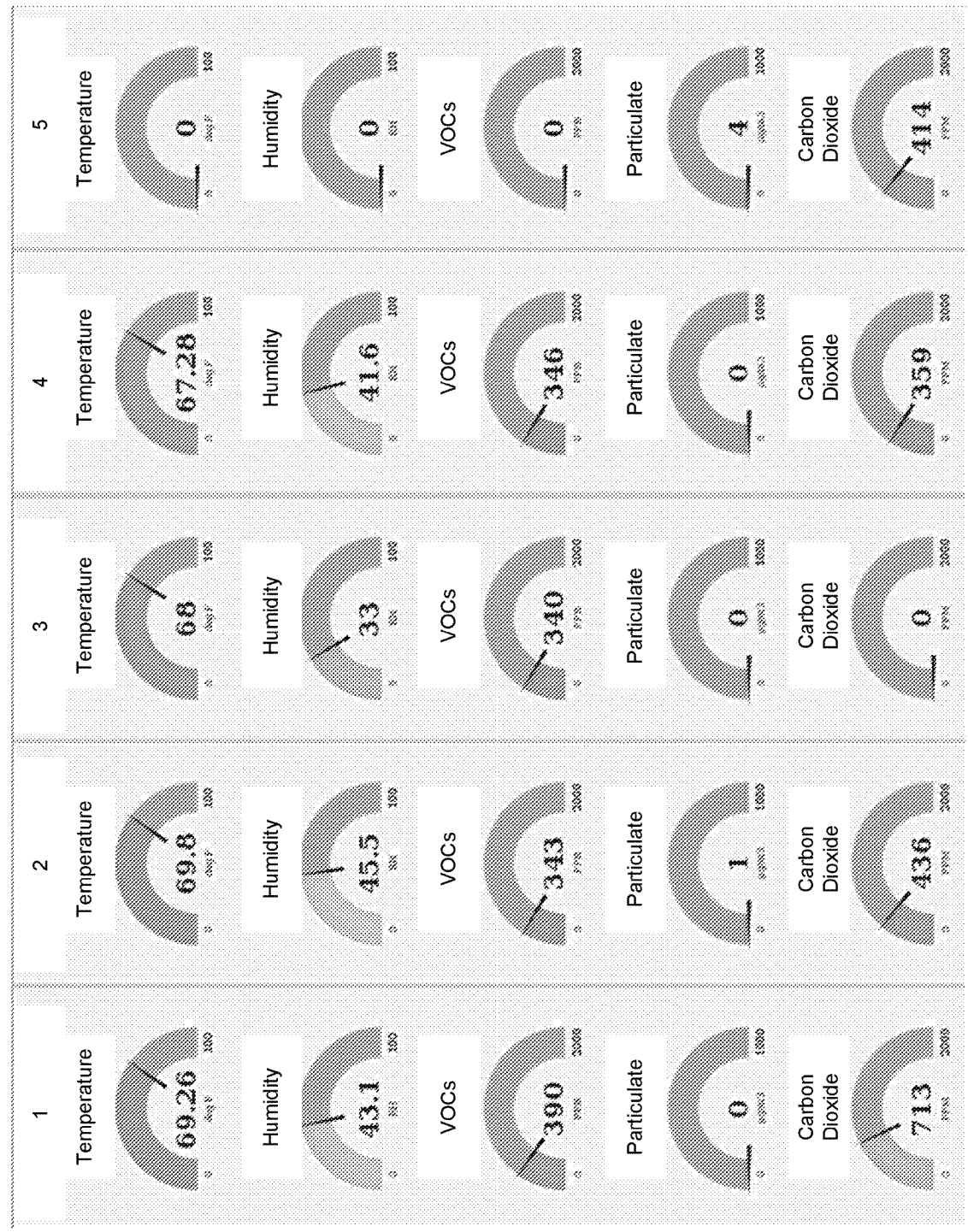

As discussed above, one or more than one IAQ sensor module 304 may be concurrently used within the building, such as in different rooms of the building. FIG. 7 includes an example user interface displayed by the customer device 524 during execution of the application when the building includes multiple IAQ sensor modules. In the example of FIG. 7, the measurements from each IAQ sensor module are shown in a separate column.

As also discussed above, one or more of the IAQ sensors may be omitted from an IAQ sensor module. For example, as shown in the right-most column of FIG. 7, the associated IAQ sensor module only includes a particulate sensor and a carbon dioxide sensor. The temperature, relative humidity, and VOCs of zero in the example of FIG. 7 indicate that the IAQ sensor module does not include a temperature sensor, a humidity sensor, or a VOC sensor.

FIG. 8 includes an example user interface displayed by the customer device 524 during execution of the application based on additional data indicative of present statuses of control modes and present (operation) statuses of various devices and modes of devices of the building. The present statuses may be, for example, on or off. The present status of a control mode, device, or mode of a device may be on (currently in use) or off (not currently in use). One type of indicator may be used to indicate a present status of on, while another type of indicator may be used to indicate a present status of off. The customer device 524 may display the additional data concurrently with the data from one or more IAQ modules, the local data, and/or the setpoint data.

The customer device 524 selectively displays measurements of one or more IAQ sensor modules, local data, control modes, and/or statuses from a predetermined period of time. The predetermined period of time may be, for example, the present day, a predetermined number of days (including or not including the present day), a predetermined number of hours before a present time, a predetermined number of minutes before the present time, or another suitable period. By default, a predetermined period may be selected (e.g., the present day), but a user may select a different predetermined period and the customer device 524 may display the data for the selected predetermined period.

Figure 9:
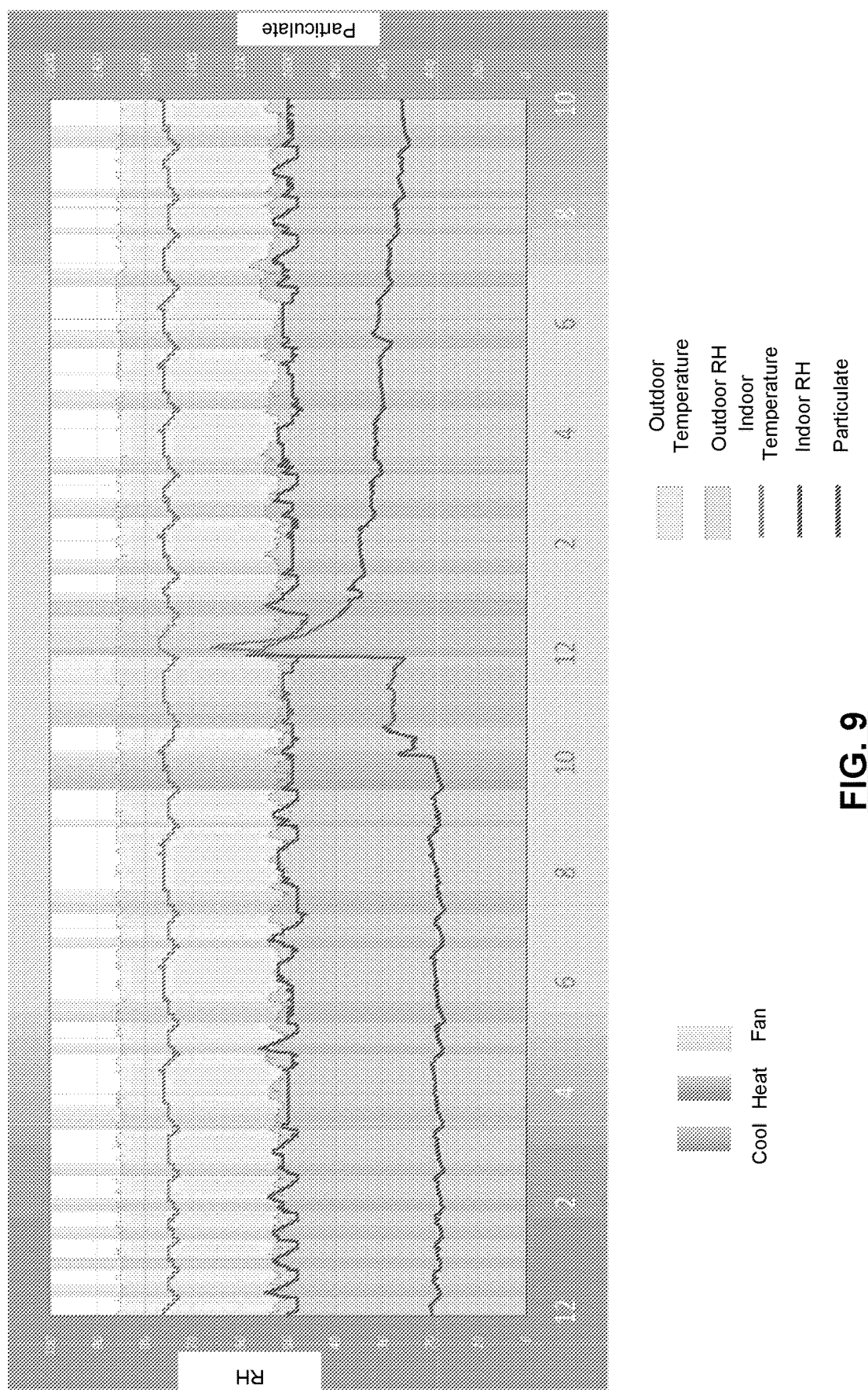

FIG. 9 includes an example user interface displayed by the customer device 524 during execution of the application for the present day (from 12:01 pm of the present day to the present time (approximately 10 pm in this example)). The customer device 524 displays data selected by a user of the customer device 524. By default, all data may be selected, but a user may select less than all of the data to be displayed, and the customer device 524 may display only the selected data.

For example, in FIG. 9, only outdoor temperature (from the local data), outdoor RH (from the local data), indoor temperature (from the IAQ sensor module 304), indoor RH (from the IAQ sensor module 304), and particulate (from the IAQ sensor module 304) are graphed over time. Indicators of the statuses of the cooling mode, the heating mode, and use of the circulator blower 108 are also concurrently shown over time. Indoor Carbon dioxide (from the IAQ sensor module 304, if measured) and indoor VOCs (from the IAQ sensor module 304, if measures) are not graphed over time in this example.

The customer device 524 selectively displays a user interface for user selection of a priority for mitigating deviations in IAQ parameters (temperature, RH, particulate, VOCs, carbon dioxide). For example, the customer device 524 may display a user interface that allows user assignment of an order of prioritization for: (i) temperature control; (ii) RH control; (iii) particulate control; (vi) VOC control; and (v) carbon dioxide control. Temperature control may refer to maintaining, as much as possible, the temperature within the building within a predetermined temperature range. RH control may refer to maintaining, as much as possible, the RH within the building within a predetermined temperature range. Particulate control may refer to maintaining, as much as possible, the amount of particulate within the building less than a predetermined amount of particulate. VOC control may refer to maintaining, as much as possible, the amount of VOCs within the building less than a predetermined amount of VOCs. Carbon dioxide control may refer to maintaining, as much as possible, the amount of carbon dioxide within the building less than a predetermined amount of carbon dioxide. The order of prioritization for (i)-(v) may be initially preset, but may be user selected, as stated above.

The thermostat 208 and/or the IAQ control module 404 may control the mitigation devices 424 based on the prioritization (order). For example, when particulate control is the first priority, the thermostat 208 may control the mitigation devices 424 to decrease particulate as quickly as possible as opposed to, for example, controlling the mitigation devices 424 to more quickly adjust temperature or RH or to more quickly decrease the amount of VOCs and/or the amount of carbon dioxide.

The user interfaces provided by the customer device 524 provide visual information to the user regarding real-time measurements, historical measurements over a period of time, trends, and efficacy of IAQ mitigation and control. The user interfaces also enable the user to adjust setpoints to be used to control the mitigation devices 424 to control comfort and IAQ within the building. The user interfaces also enable the user to adjust prioritization in which IAQ conditions are mitigated. All of the above improves IAQ within the building and user experience regarding IAQ within the building.

Figure 10:
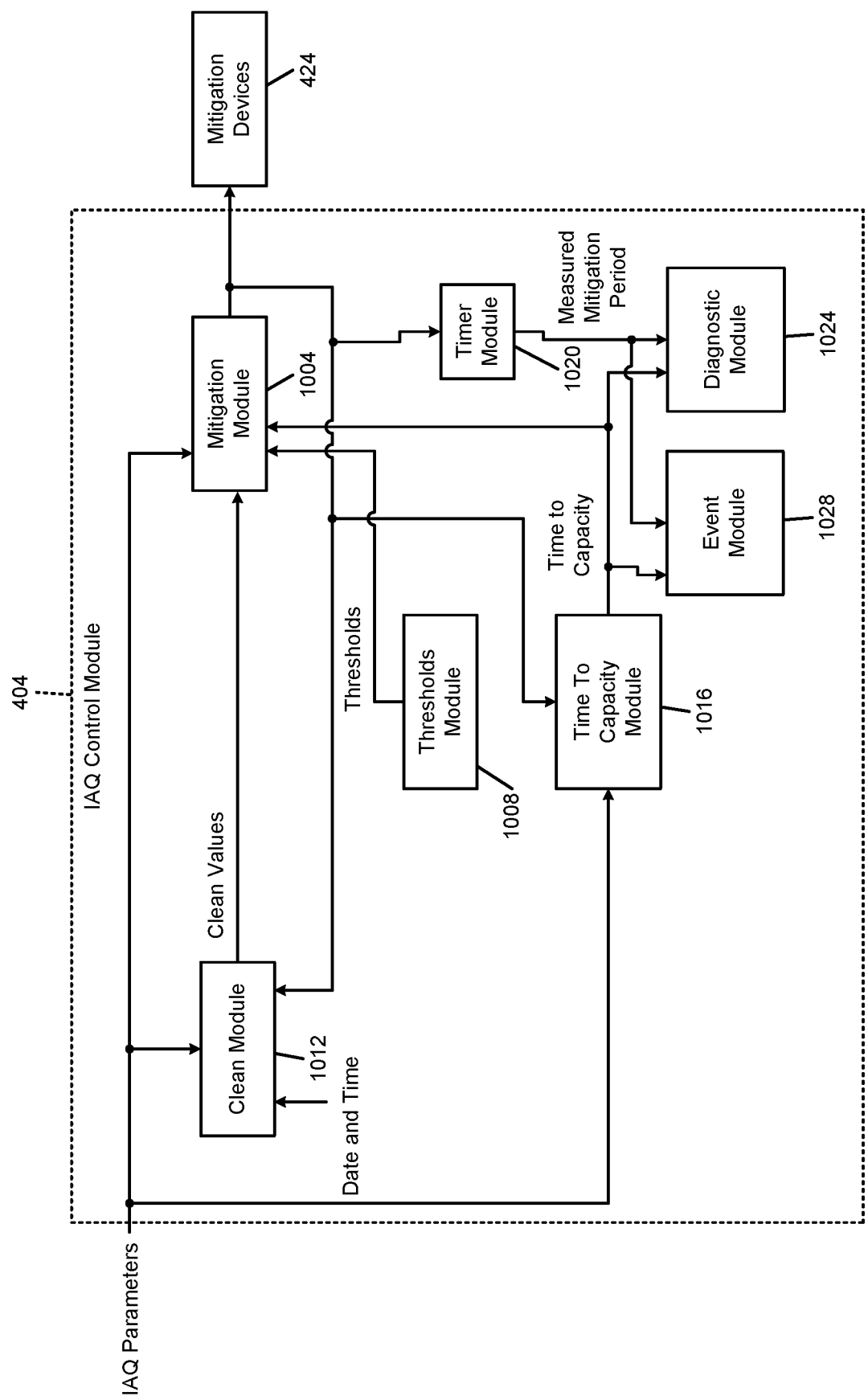
FIG. 10 includes a functional block diagram of an example implementation of an IAQ control module.

FIG. 10 includes a block diagram of an example implementation of a mitigation system using the example of the IAQ control module 404. While the example of the IAQ control module 404 is provided for purposes of discussion, the modules of the IAQ control module 404 may alternatively be implemented within the thermostat 208 or within a combination of the thermostat 208 and the IAQ control module 404.

A mitigation module 1004 selectively turns on and off ones of the mitigation devices 424 based on the associated ones of the IAQ parameters and respective thresholds. A thresholds module 1008 sets the thresholds, as discussed further below. For example, the mitigation module 1004 may turn one or more filtering devices (e.g., the air cleaner/purifier 428 and/or the circulator blower 108) on when the amount of particulate measured by the particulate sensor 316 is greater than a first ON threshold amount of particulate and a second ON threshold amount of particulate, such as described in FIGS. 11 to 13. The mitigation module 1004 may leave the one or more filtering devices on until the amount of particulate measured by the particulate sensor 316 becomes less than an OFF threshold amount of particulate and one or more OFF conditions are satisfied. The mitigation module 1004 may turn the one or more filtering devices off when the amount of particulate measured by the particulate sensor 316 is less than the OFF threshold amount of particulate and one or more OFF conditions are satisfied.

The mitigation module 1004 may turn the ventilator 440 on when the amount of VOCs measured by the VOC sensor 320 is greater than a first ON VOC threshold and a second ON VOC threshold. The mitigation module 1004 may leave the ventilator 440 on until the amount of VOCs measured by the VOC sensor 320 is less than an OFF VOC threshold and one or more OFF conditions are satisfied. The mitigation module 1004 may turn the ventilator 440 off when the amount of VOCs measured by the VOC sensor 320 is less than the OFF VOC threshold and one or more OFF conditions are satisfied.

The mitigation module 1004 may turn the ventilator 440 on when the amount of carbon dioxide measured by the carbon dioxide sensor 324 is greater than a first ON carbon dioxide threshold and a second ON carbon dioxide threshold. The mitigation module 1004 may leave the ventilator 440 on until the amount of carbon dioxide measured by the carbon dioxide sensor 324 is less than an OFF carbon dioxide threshold. The mitigation module 1004 may turn the ventilator 440 off when the amount of carbon dioxide measured by the carbon dioxide sensor 324 is less than the OFF carbon dioxide threshold.

The thresholds module 1008 sets the first ON threshold amount of particulate, the second ON threshold amount of particulate, and the OFF threshold amount of particulate. The thresholds module 1008 also sets the first ON VOC threshold, the second ON VOC threshold, and the OFF VOC threshold. The thresholds module 1008 also sets the first ON carbon dioxide threshold, the second ON carbon dioxide threshold, and the OFF carbon dioxide threshold.

The thresholds module 1008 sets the first ON threshold amount of particulate based on a clean amount of particulate in the air and an ON predetermined amount of particulate. For example, the thresholds module 1008 may set the first ON threshold amount of particulate to the clean amount of particulate plus the ON predetermined amount of particulate. The ON predetermined amount of particulate may be a fixed predetermined value or may be a variable, such as a percentage (less than 100 percent) or a fraction (less than 1) of the clean amount of particulate. This may ensure that there is no nuisance due to sensor response error variability.

The thresholds module 1008 sets the second ON threshold amount of particulate to a fixed predetermined amount of particulate. The fixed predetermined amount of particulate may be greater than, less than, or equal to the clean amount of particulate.

The thresholds module 1008 sets the OFF threshold amount of particulate based on (a) an OFF predetermined amount of particulate and (b) the greater one of the first ON threshold amount of particulate and the second ON threshold amount of particulate. For example, the thresholds module 1008 may set the OFF threshold amount of particulate to (a) the OFF predetermined amount of particulate plus (b) the greater one of the first ON threshold amount of particulate and the second ON threshold amount of particulate. The OFF predetermined amount of particulate may be a fixed predetermined value or may be a variable, such as a percentage (less than 100 percent) or a fraction (less than 1) of the clean amount of particulate. The OFF threshold amount of particulate will therefore be greater than both of the first and second ON threshold amounts of particulate.

The thresholds module 1008 sets the first ON VOC threshold based on a clean amount of VOCs in the air and an ON predetermined amount of VOCs. For example, the thresholds module 1008 may set the first ON VOC threshold to the clean amount of VOCs plus the ON predetermined amount of VOCs. The ON predetermined amount of VOCs may be a fixed predetermined value or may be a variable, such as a percentage (less than 100 percent) or a fraction (less than 1) of the clean amount of VOCs.

The thresholds module 1008 sets the second ON VOC threshold amount of particulate to a fixed predetermined amount of VOCs. The fixed predetermined amount of VOCs may be greater than, less than, or equal to the clean amount of VOCs.

The thresholds module 1008 sets the OFF VOC threshold based on (a) an OFF predetermined amount of VOCs and (b) the greater one of the first ON VOC threshold and the second ON VOC threshold. For example, the thresholds module 1008 may set the OFF VOC threshold amount to (a) the OFF predetermined amount of VOCs plus (b) the greater one of the first ON VOC threshold and the second ON VOC threshold. The OFF predetermined amount of VOCs may be a fixed predetermined value or may be a variable, such as a percentage (less than 100 percent) or a fraction (less than 1) of the clean amount of VOCs. The OFF VOC threshold will therefore be greater than both of the first and second ON VOC thresholds.

The thresholds module 1008 sets the first ON carbon dioxide threshold based on a clean amount of carbon dioxide in the air and an ON predetermined amount of carbon dioxide. For example, the thresholds module 1008 may set the first ON carbon dioxide threshold to the clean amount of carbon dioxide plus the ON predetermined amount of carbon dioxide. The ON predetermined amount of carbon dioxide may be a fixed predetermined value or may be a variable, such as a percentage (less than 100 percent) or a fraction (less than 1) of the clean amount of carbon dioxide.

The thresholds module 1008 sets the second ON carbon dioxide threshold amount of particulate to a fixed predetermined amount of carbon dioxide. The fixed predetermined amount of carbon dioxide may be greater than, less than, or equal to the clean amount of carbon dioxide.

The thresholds module 1008 sets the OFF carbon dioxide threshold based on (a) an OFF predetermined amount of carbon dioxide and (b) the greater one of the first ON carbon dioxide threshold and the second ON carbon dioxide threshold. For example, the thresholds module 1008 may set the OFF carbon dioxide threshold amount to (a) the OFF predetermined amount of carbon dioxide plus (b) the greater one of the first ON carbon dioxide threshold and the second ON carbon dioxide threshold. The OFF predetermined amount of carbon dioxide may be a fixed predetermined value or may be a variable, such as a percentage (less than 100 percent) or a fraction (less than 1) of the clean amount of carbon dioxide. The OFF carbon dioxide threshold will therefore be greater than both of the first and second ON carbon dioxide thresholds.

A clean module 1012 sets the clean amount of particulate, the clean amount of VOCs, and the clean amount of carbon dioxide. The clean amounts can be derived for a given building as the average from the lowest amounts of particulate after the mitigation ON cycles. This calculation may be performed during the first week after initial installation and updated daily, weekly, monthly, annually, or as needed.

The clean module 1012 monitors the date and time, the IAQ parameters, and the mitigation statuses. The clean module 1012 sets the clean amount of particulate based on or equal to an average of all of the amounts of particulate measured while particulate mitigation was OFF (i.e., the filtering device(s) were OFF) during a last predetermined period, such as the last 24 hours. Measurements of the amount of particulate taken while particulate mitigation was ON (one or more of the filtering device(s) were ON) are not considered in the determination of the clean amount of particulate. The clean amount of particulate represents a minimum amount of particulate that the equipment of the building is capable of achieving.

The clean module 1012 sets the clean amount of VOCs based on or equal to an average of all of the amounts of VOCs measured while VOC mitigation was OFF (i.e., the ventilator 440 was OFF) during a last predetermined period, such as the last 24 hours. Measurements of the amount of VOCs taken while VOC mitigation was ON (the ventilator 440 was ON) are not considered in the determination of the clean amount of VOCs. The clean amount of particulate represents a minimum amount of VOCs that the equipment of the building is capable of achieving.

The clean module 1012 sets the clean amount of carbon dioxide based on or equal to an average of all of the amounts of carbon dioxide measured while carbon dioxide mitigation was OFF (i.e., the ventilator 440 was OFF) during a last predetermined period, such as the last 24 hours. Measurements of the amount of carbon dioxide taken while carbon dioxide mitigation was ON (the ventilator 440 was ON) are not considered in the determination of the clean amount of carbon dioxide. The clean amount of particulate represents a minimum amount of carbon dioxide that the equipment of the building is capable of achieving.

Figure 11:
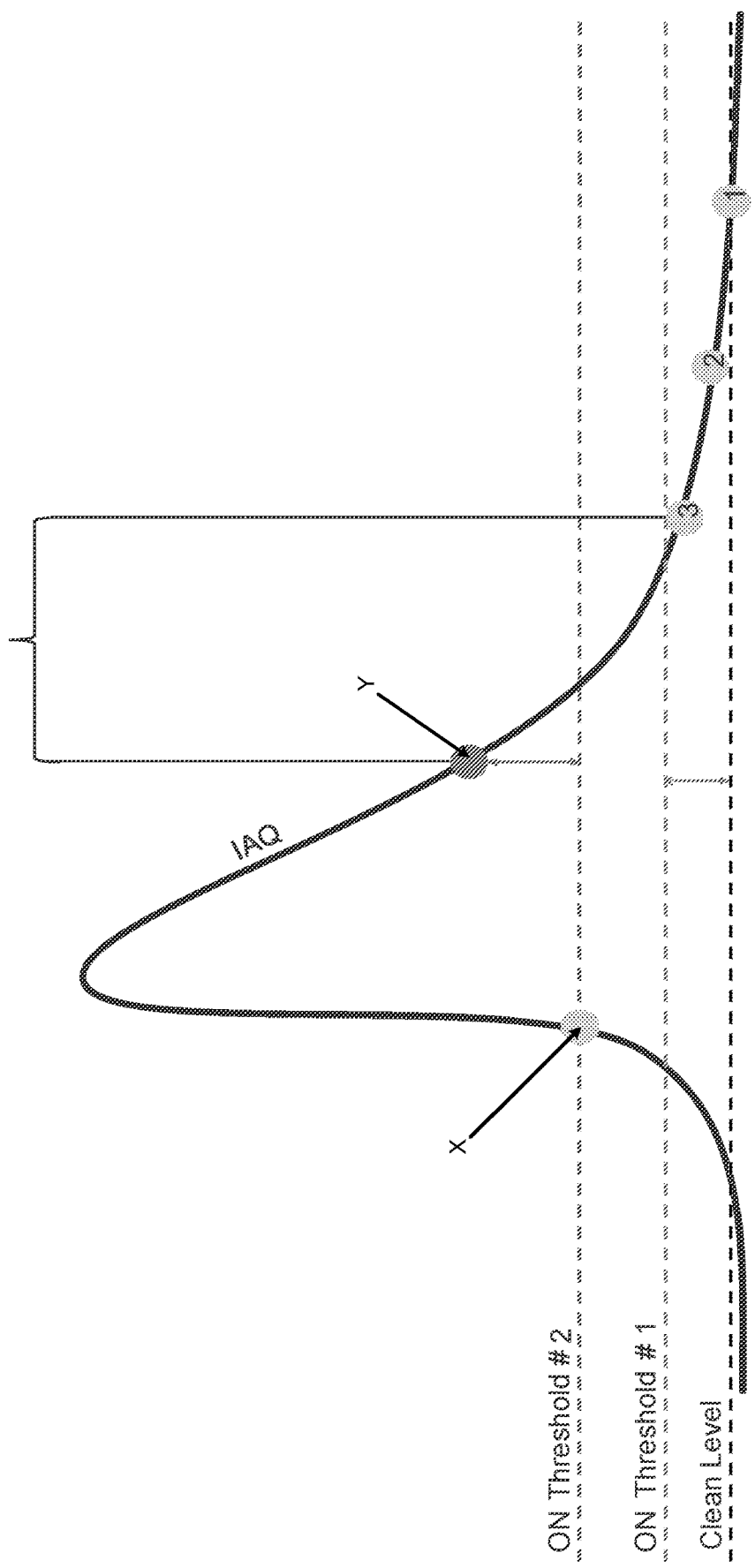
FIGS. 11-13 include example graphs of an IAQ parameter (e.g., amount of particulate, amount of VOCs, or amount of carbon dioxide) over time.

FIG. 11 includes an example graph of an IAQ parameter (e.g., amount of particulate, amount of VOCs, or amount of carbon dioxide) over time. In the example of FIG. 11, the clean amount of that IAQ parameter is less than the first ON threshold for that parameter, and the first ON threshold for that parameter is less than the second ON threshold for that parameter.

Figure 12:
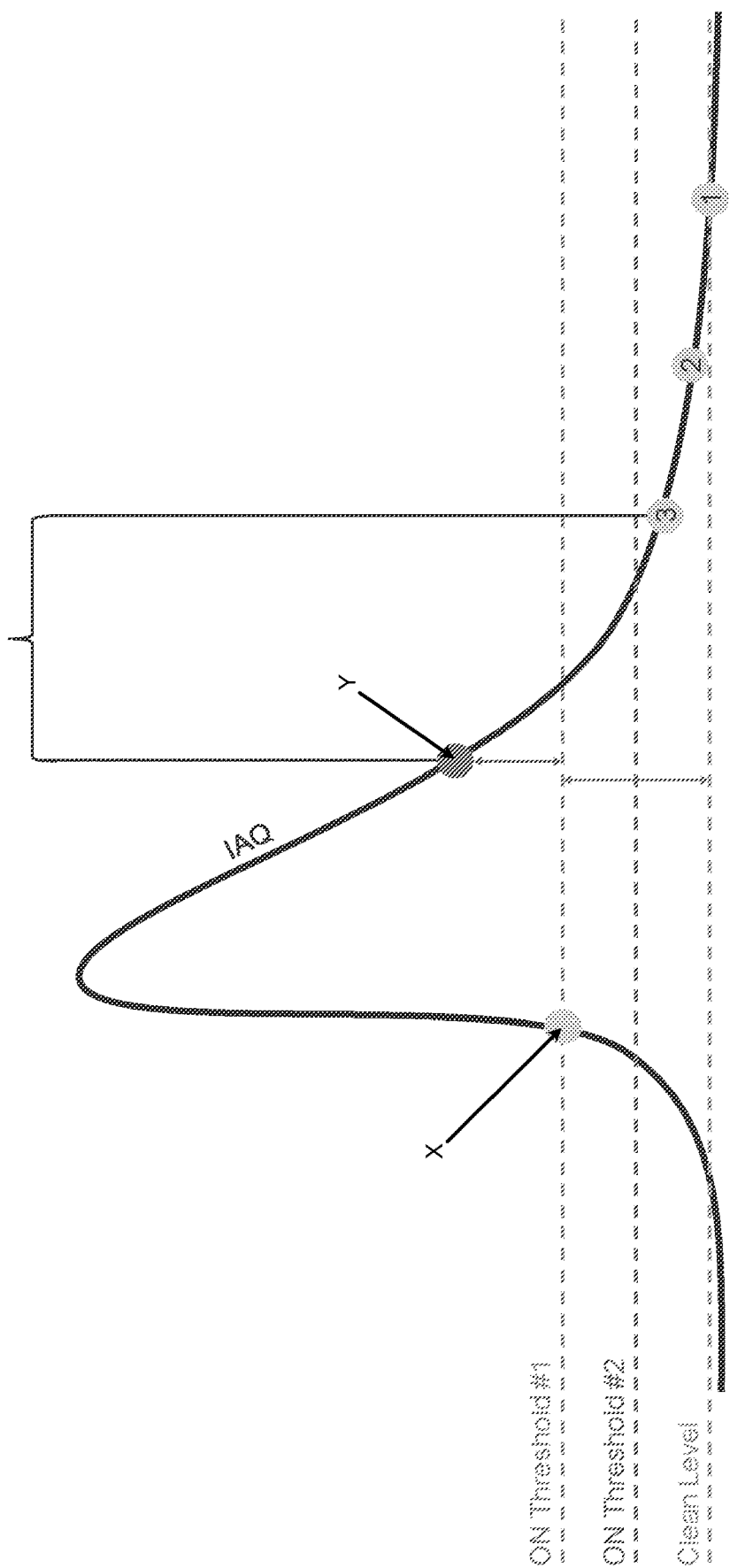

FIG. 12 includes an example graph of an IAQ parameter (e.g., amount of particulate, amount of VOCs, or amount of carbon dioxide) over time. In the example of FIG. 12, the clean amount of that IAQ parameter is less than the second ON threshold for that parameter, and the second ON threshold for that parameter is less than the first ON threshold for that parameter.

Figure 13:
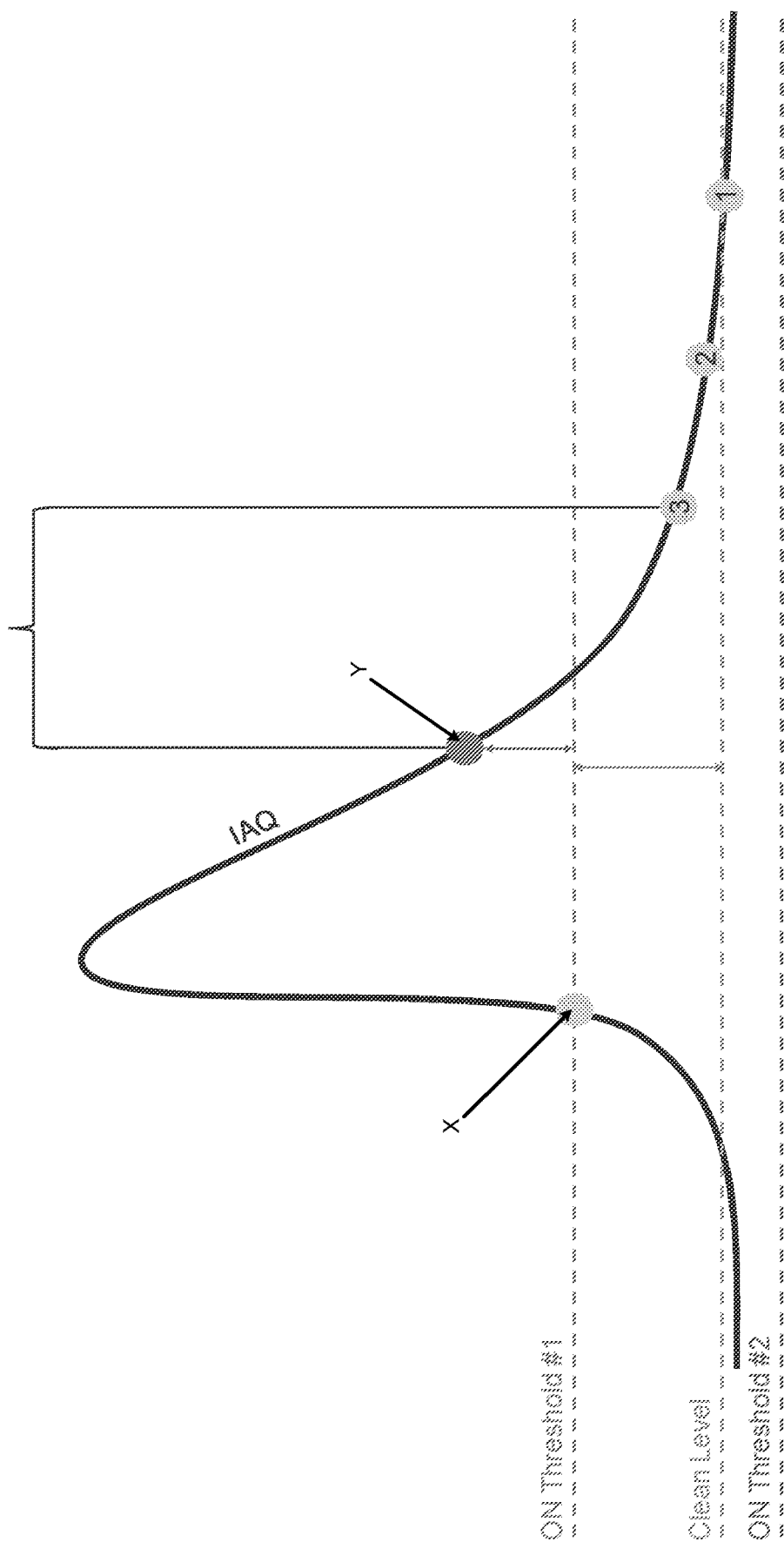

FIG. 13 includes an example graph of an IAQ parameter (e.g., amount of particulate, amount of VOCs, or amount of carbon dioxide) over time. In the example of FIG. 13, the second ON threshold for that parameter is less than the clean amount for that IAQ parameter, and the clean amount for that IAQ parameter is less than the first ON threshold for that parameter.

The use of both of the first and second ON thresholds may avoid nuisance mitigation cycles, for example, where the home is located in an environment where the outdoor pollutant levels are directly impacting the clean level in the home. In this example, the clean level may be close to or greater than second ON threshold (as depicted in FIGS. 12 and 13), and the clean level may vary during the year, such as by season. The use of both of the first and second ON thresholds may avoid nuisance mitigation cycles, for example, when sensor variability may cause a higher than normal measurement.

In the examples of FIGS. 11-13, the mitigation module 1004 turns mitigation of that IAQ parameter ON at time X, when the IAQ parameter is greater than both of the first and second ON thresholds. Y represents the OFF threshold for the parameter. 1, 2, and 3 are potential times when ones of the OFF conditions are satisfied and mitigation module 1004 turns mitigation of that IAQ parameter OFF.

The OFF conditions include: the IAQ parameter being less than or equal to the clean amount of that IAQ parameter; the slope of the IAQ parameter becoming greater than a predetermined negative value and approaching zero (e.g., within a predetermined amount of zero); and the passing of a (time) period after the IAQ parameter becomes less than the OFF threshold. The period may be a predetermined fixed period (e.g., 1 hour) or a period determined, such as based on a time to capacity of the mitigation device(s).

In FIGS. 11-13, time 1 corresponds to when the IAQ parameter is less than or equal to the clean amount of that IAQ parameter. Time 2 corresponds to when the slope of the IAQ parameter is greater than the predetermined negative value and approaching zero. Time 3 corresponds to when the period has passed after the IAQ parameter is less than the OFF threshold.

Use of the OFF conditions may ensure that the IAQ parameters are brought down close to clean amounts, respectively. This therefore provides a more effective control and mitigation strategy than simply using a hard OFF threshold for turning OFF mitigation. Additionally, this ensures that mitigation is not performed for an excessive amount of time.

In various implementations, a time to capacity module 1016 may determine the period, based on an initial value of the IAQ parameter, a later value of the IAQ parameter, and characteristics of the building and the mitigation device(s). For example, for particulate matter mitigation, the time to capacity module 1016 may set the period by solving the following equation for the period:

$$(\text{Later } PM / \text{Initial } PM) = \left(1 - \frac{afm}{vol} * \text{efficiency}\right)^{period},$$

where period is the period, later PM is the later amount of particulate, initial PM is the initial amount of PM, afr is an air flow rate (e.g., in cubic feet per minute (CFM)) of filtering device(s), vol is an internal volume (e.g., in cubic feet) of the building, and efficiency is an efficiency (e.g., particulate filtering percentage) of a filter of the filtering device(s). In the example of turning off, the Initial PM may be equal to the peak amount of particulate that occurred at or shortly after the filtering device(s) were turned on, and the Later PM may be the clean amount of particulate.

Figure 19:
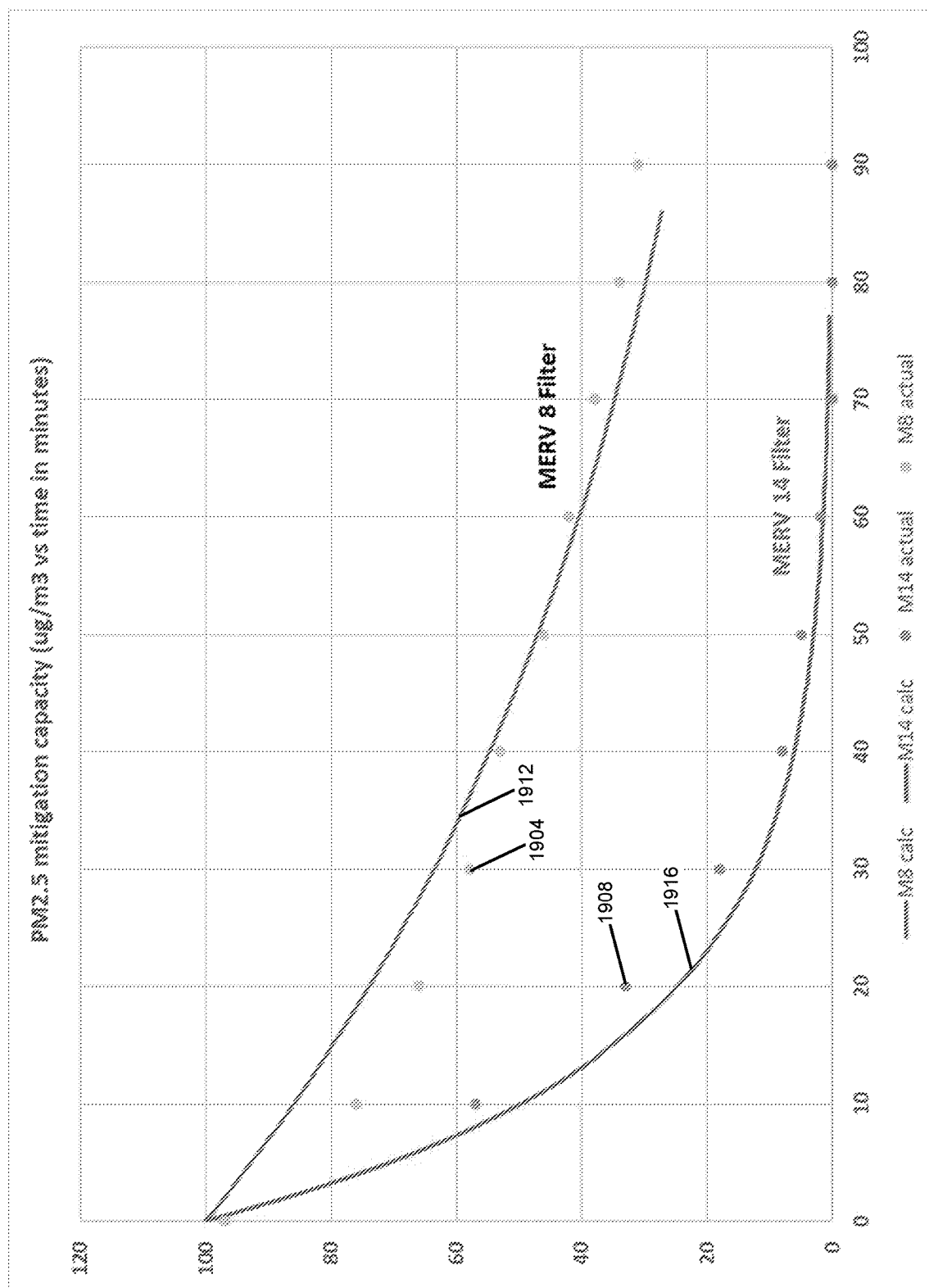
FIG. 19 includes an example graph of amount of particulate versus measured mitigation period.

FIG. 19 includes an example graph of amount of particulate over time (measured mitigation period) during mitigation events. Dashed traces 1904 and 1908 track actual amounts of particulate measured using a particulate sensor during mitigation events with MERV 8 and MERV 14 rated filters. Solid traces 1912 and 1916 track amounts of particulate estimated using the equation above (solving for Later PM) during mitigation events with MERV 8 and MERV 14 rated filters. As shown, the estimated amounts closely track the actual amounts over time for different types of filters.

For carbon dioxide or VOC mitigation, the time to capacity module 1016 may set the period by solving the following equation for the period:

$$(\text{Later}/\text{Initial}) = \left(1 - \frac{afr}{vol} * \text{percentage}\right)^{period},$$

where period is the period, Later is the later amount of VOC or carbon dioxide, Initial is the initial amount of VOC or carbon dioxide, afr is an air flow rate (e.g., in CFM) of the fresh air ventilator 440 (e.g., one or more bath fans), vol is the internal volume (e.g., in cubic feet) of the building, and percentage is the percentage of the volume of the building that the ventilator 440 will circulate out of the building per minute (e.g., 160 cfm/16000 cubic foot building=1 percent). The percentage may be a fixed value or may be a variable based on which ventilator(s) are on and whether one or more other mitigation devices are on. For example, the percentage may be multiplied by 1.5 if the circulator blower 108 is also on simultaneously with the fresh air ventilator(s). In the example of turning off, Initial may be equal to the peak VOC value or the peak carbon dioxide value that occurred shortly at or shortly after the ventilator(s) was(were) turned on, and Later may be the clean VOC amount or the clean carbon dioxide amount.

Figure 20:
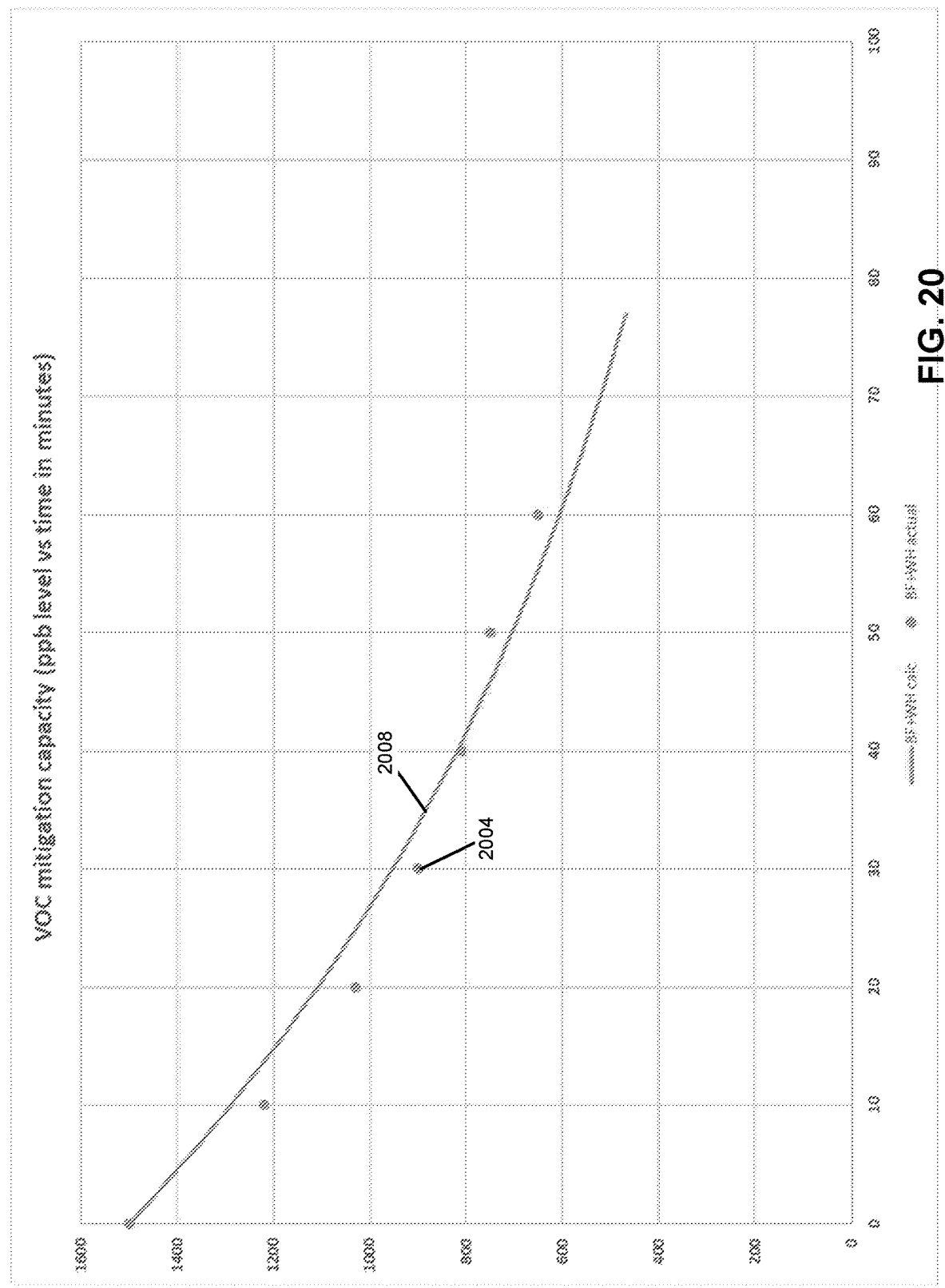
FIG. 20 includes an example graph of an amount of VOCs versus measured mitigation period.

FIG. 20 includes an example graph of amount of VOCs over time (measured mitigation period) during a mitigation event. Dashed trace 2004 tracks actual amounts of VOCs measured using a VOC sensor during mitigation events with both a bath fan (BF) and a circulator blower (WH) of an air handler unit ON. Solid trace 2008 tracks amounts of VOCs estimated using the equation above (solving for Later) during mitigation events with both the bath fan (BF) and the circulator blower (WH) of the air handler unit ON. As shown, the estimated amounts closely track the actual amounts over time.

In various implementations, the period may be determined differently and be used for other reasons. For example, the period may be compared with a measured value of the period to identify a fault, such as a dirty filter, or impending filter life. As another example, the period may be used to classify a mitigation event as a type of mitigation event and a severity.

An example of a failure and impending failure of a mitigation device includes a replacement of the filter 104. Over time, the filter 104 will fill with particulate from the air passing through the filter 104. The equation above could be solved for the period to determine an expected period for the filter 104 to mitigate particulate when the filter 104 is new (initial installation or filter replacement). For example, for particulate matter mitigation, the time to capacity module 1016 may set the period by solving the following equation for the period:

$$(\text{Later } PM/\text{Initial } PM) = \left(1 - \frac{afr}{vol} * \text{efficiency}\right)^{period},$$

where period is the period, Later PM is the later amount of particulate, Initial PM is the initial amount of PM, afr is an air flow rate (e.g., in CFM) of the filter 104, vol is the internal volume (e.g., in cubic feet) of the building, and efficiency is an efficiency (e.g., particulate filtering percentage) of the filter 104 when new. In this example, the Initial PM may be equal to the amount of particulate at the time when the circulator blower 108 is turned on to decrease the amount of particulate in the air, and the Later PM may be the clean amount of particulate. The period would therefore reflect the expected period for the filter 104, when new, to mitigate particulate to the clean level.

When the circulator blower 108 is turned on to decrease (mitigate) the amount of particulate in the air, a timer module 1020 may reset and start a measured mitigation period. The timer module 1020 may increase the measured mitigation period as time passes while the circulator blower 108 is on.

When the mitigation module 1004 turns off the air handler unit 136 circulator blower 108 to stop decreasing the amount of particulate in the air, the measured mitigation period reflects the period that the circulator blower 108 was continuously on to decrease the amount of particulate in the air. A diagnostic module 1024 may compare the expected period for the filter 104, when new, to mitigate particulate down to the clean level with the measured mitigation period when the mitigation module 1004 turns off the circulator blower 108. The diagnostic module 1024 may determine an amount that the filter 104 is filled based on the comparison. The diagnostic module 1024 may determine the amount that the filter 104 is filled, for example, based on a lookup table or an equation that relates measured mitigation periods to filled amounts of the filter 104 given the expected period for the filter when new. The lookup table or equation may be calibrated to increase the amount that the filter 104 is filled as the measured mitigation period increases and vice versa.

As the filter 104 accumulates particulate over time, based on the comparison, the diagnostic module 1024 may display an indicator on the customer device 524 whether the filter 104 should be replaced based on a predetermined amount of particulate accumulation. For example, the diagnostic module 1024 may display the indicator to replace the filter 104 when the measured mitigation period when the mitigation module 1004 turns off the circulator blower 108 is greater than the expected period for the filter 104, when new, by at least a predetermined amount such as two or three times the expected period or X minutes, where X is an integer greater than zero. For example, the expected period for new filter may be 40 minutes while the period for a filter near end of life may be 120 minutes (3 times longer). While the examples of two and three times the expected period are provided, another predetermined amount may be used. The diagnostic module 1024 may display an indicator that replacement of the filter 104 is not needed when the measured mitigation period when the mitigation module 1004 turns off the circulator blower 108 is not greater than the expected period for the filter 104, when new, by at least the predetermined amount.

In various implementations, the diagnostic module 1024 may determine a predicted period until the filter 104 should be replaced based on the measured mitigation period when the mitigation module 1004 turns off the circulator blower 108. For example, the diagnostic module 1024 may decrease the predicted period as the measured mitigation period increases toward a predetermined replacement period. The predetermined replacement period may be set based on the expected period and the predetermined amount. The diagnostic module 1024 may display the predicted period on the customer device 524. The diagnostic module 1024 may display the indicator to replace the filter 104 when the expected period is less than or equal to a predetermined value, such as zero.

Figure 14:
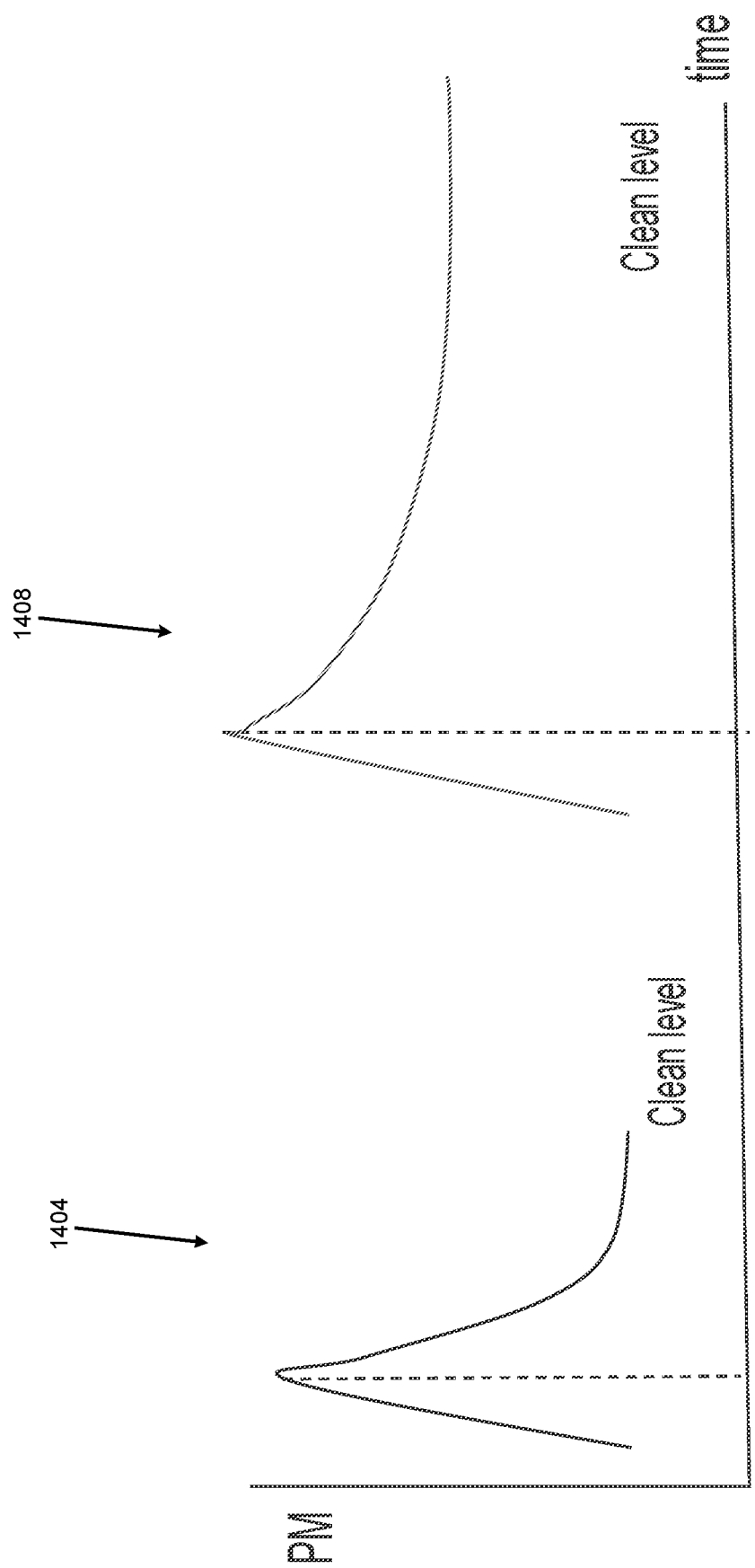
FIGS. 14 and 15 include example graphs of particulate matter (PM) over time.

FIG. 14 includes an example graph of particulate matter (PM) overtime. FIG. 14 includes an example particulate trace 1404 for a first mitigation event of particulate matter (PM) when the filter 104 is new and clean, such as shortly after installation or replacement of the filter 104. FIG. 14 also include an example particulate trace 1408 for a second mitigation event of particulate when the filter 104 is filled for a long period and needs replacement. As illustrated, the measured mitigation period of the second mitigation event is longer than the measured mitigation period of the first mitigation event.

Referring again to FIG. 10, from a first mitigation event of a parameter to a next mitigation event of the parameter, assuming that the mitigation events are of a same magnitude and length (of parameter production), the measured mitigation period should not vary significantly. However, all mitigation events do not have the same magnitude and/or length. For example, one candle being lit for a short amount of time may provide for a shorter mitigation event (a mitigation event having a shorter measured mitigation period) than a longer cooking event (which will have a longer measured mitigation period).

Figure 15:
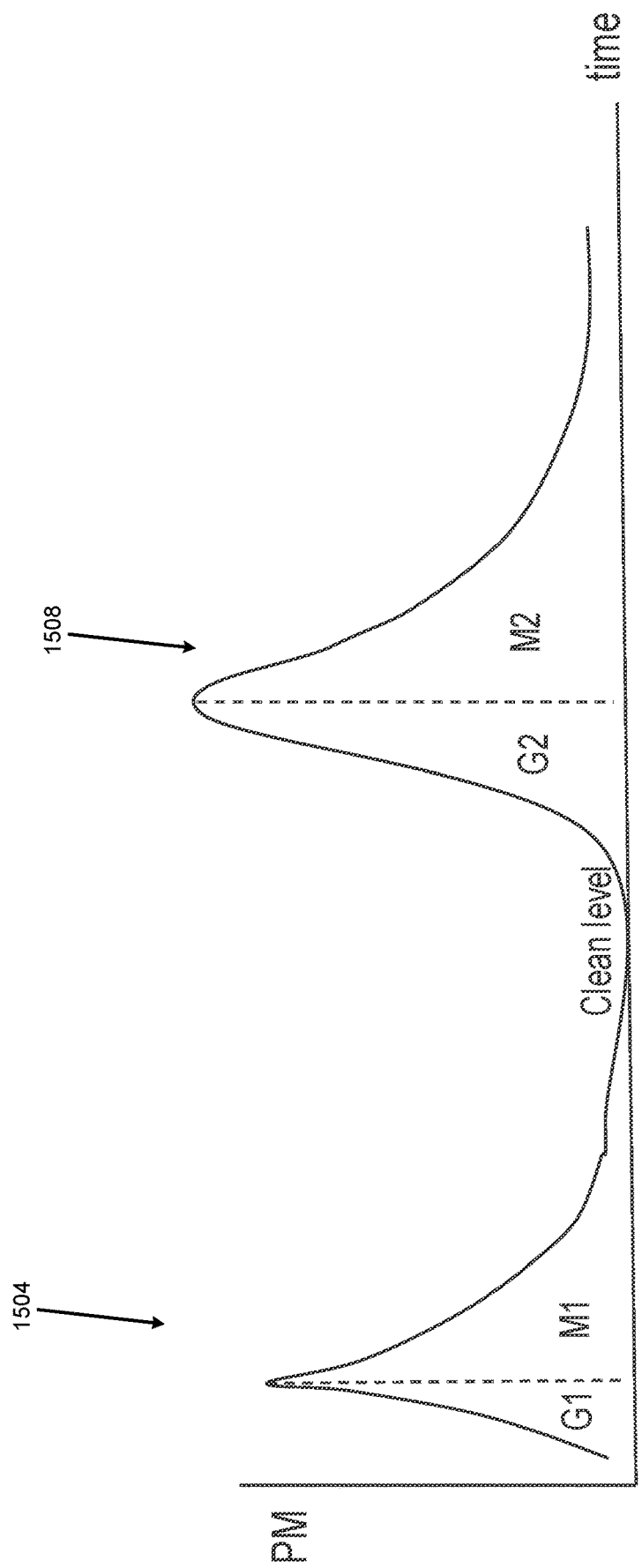

FIG. 15 includes an example graph of particulate matter (PM) overtime. FIG. 15 includes example particulate traces 1504 and 1508 for first and second mitigation events of particulate when the filter 104 is approximately the same level of filled/cleanliness. The particulate trace 1504 corresponds to a shorter mitigation event, such as for a candle being lit. The particulate trace 1508 corresponds to a longer mitigation event, such as for cooking.

Areas G1 and G2 under the traces 1504 and 1508 in FIG. 15 represent the amount of particulates during the event generation phase corresponding to the traces 1504 and 1508, respectively. Areas M1 and M2 under the traces 1504 and 1508 in FIG. 15 represent the amount of particulates mitigated during the event mitigation phases corresponding to the traces 1504 and 1508, respectively. When G2 is greater than G1, M2 should also be greater than M1. The relationship between the area G and the area M of a mitigation event, the relationship between the area G of a mitigation event and the area G of another mitigation event, and/or the relationship between the area M of a mitigation event and the area M of another mitigation event can be used to classify the event type and the severity.

Referring back to FIG. 10, an event module 1028 classifies a mitigation event as a type of a mitigation event based on the measured mitigation period when the mitigation module 1004 shuts the mitigation device(s) off. The event module 1028 may classify each mitigation event.

For example, the event module 1028 may classify a mitigation event as a first type of mitigation event when the measured mitigation period when the mitigation module 1004 shuts the mitigation device(s) off is less than a first predetermined period. The event module 1028 may classify a mitigation event as a second type of mitigation event when the measured mitigation period is greater than a second predetermined period that is greater than the first predetermined period. The event module 1028 may classify a mitigation event as a third type of mitigation event when the measured mitigation period is greater than the first predetermined period and less than the second predetermined period. While the example of three different types of mitigation events is provided, a greater or fewer number of types are possible.

As another example, the event module 1028 may classify a mitigation event as a type of mitigation event when a profile of the decrease in the IAQ parameter matches a predetermined profile associated with the type of mitigation event. A different predetermined profile may be stored for each different type of mitigation event. The event module 1028 may classify the mitigation event as the one of the types of mitigation events associated with the one of the predetermined profiles that most closely matches the profile of the IAQ parameter during the mitigation event.

The event module 1028 stores the classifications in memory. The customer device 524 may display the classified type of a mitigation event in association with that data.

Figure 16:
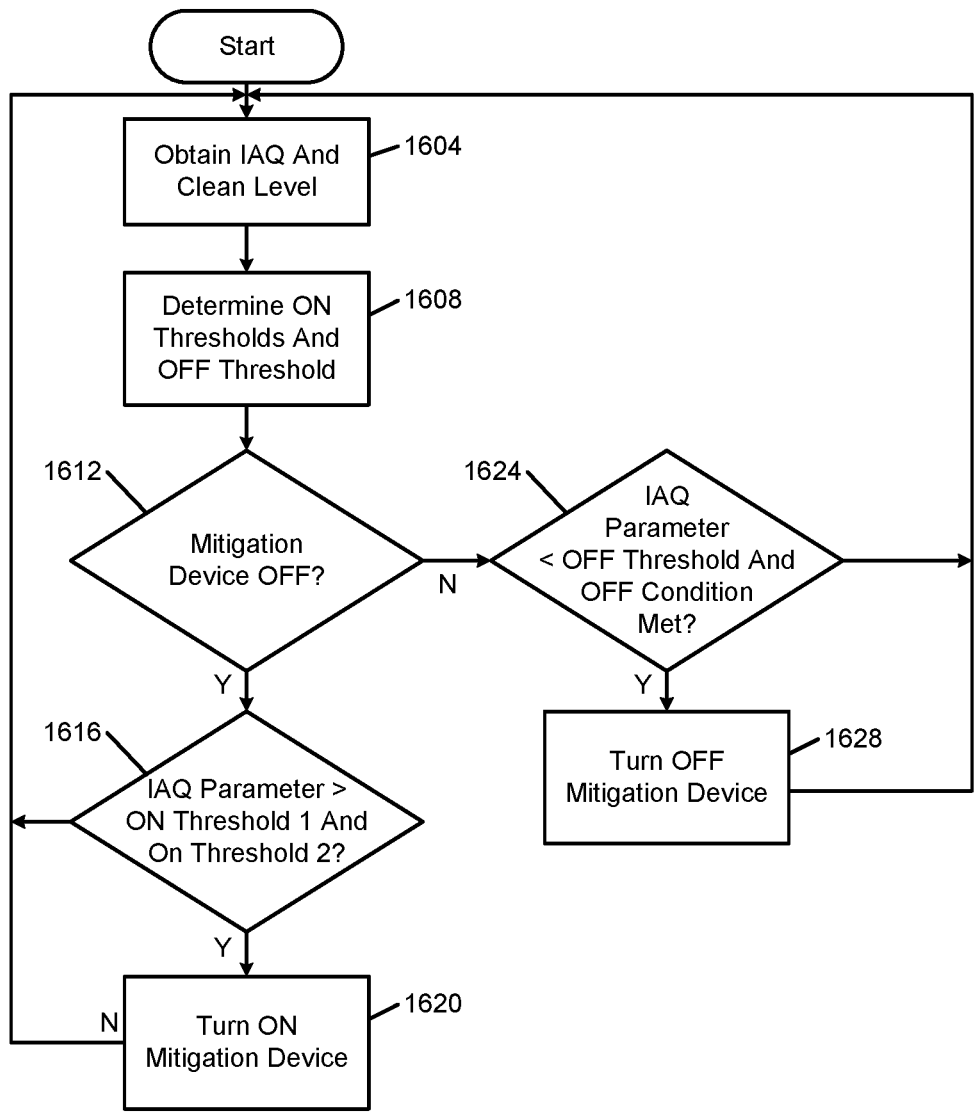
FIG. 16 includes a flowchart depicting an example method of controlling mitigation of an IAQ parameter.

FIG. 16 includes a flowchart depicting an example method of controlling mitigation of an IAQ parameter, such as the amount of particulate, the amount of carbon dioxide, or the amount of VOCs. Control begins with 1604 where the mitigation module 1004 receives the IAQ parameter and the clean level for the IAQ parameter. The clean module 1012 determines the clean level for the IAQ parameter based on the values of the IAQ parameter while mitigation of the IAQ parameter was off during the last predetermined period, such as the last 24 hours prior to the present time.

At 1608, the thresholds module 1008 determines the first and second ON thresholds and the OFF threshold for the IAQ parameter. The thresholds module 1008 determines the first ON threshold for the IAQ parameter based on the clean level and the ON predetermined amount. The thresholds module 1008 sets the second ON threshold to the predetermined value. The thresholds module 1008 sets the OFF threshold for the IAQ parameter based on the OFF predetermined amount and the greater one of the first and second ON thresholds for the IAQ parameter.

At 1612, the mitigation module 1004 determines whether the mitigation device(s) for the IAQ parameter is(are) OFF. If 1612 is true, control continues with 1616. If 1612 is false, control transfers to 1624, which is discussed further below.

At 1616, the mitigation module 1004 determines whether the IAQ parameter is greater than both of the first and second ON thresholds for the IAQ parameter. If 1616 is true, the mitigation module 1004 turns the mitigation device(s) for the IAQ parameter ON at 1620, and control returns to 1604. If 1616 is false, the mitigation module 1004 maintains the mitigation device(s) for the IAQ parameter OFF, and control returns to 1604.

At 1624 (when the mitigation device(s) is(are) ON), the mitigation module 1004 determines whether the IAQ parameter is less than the OFF threshold for the IAQ parameter and at least one of the OFF conditions are satisfied. If 1624 is true, the mitigation module 1004 turns the mitigation device (s) off at 1628 and control returns to 1604. If 1624 is false, the mitigation module 1004 maintains the mitigation device (s) on, and control returns to 1604.

Figure 17:
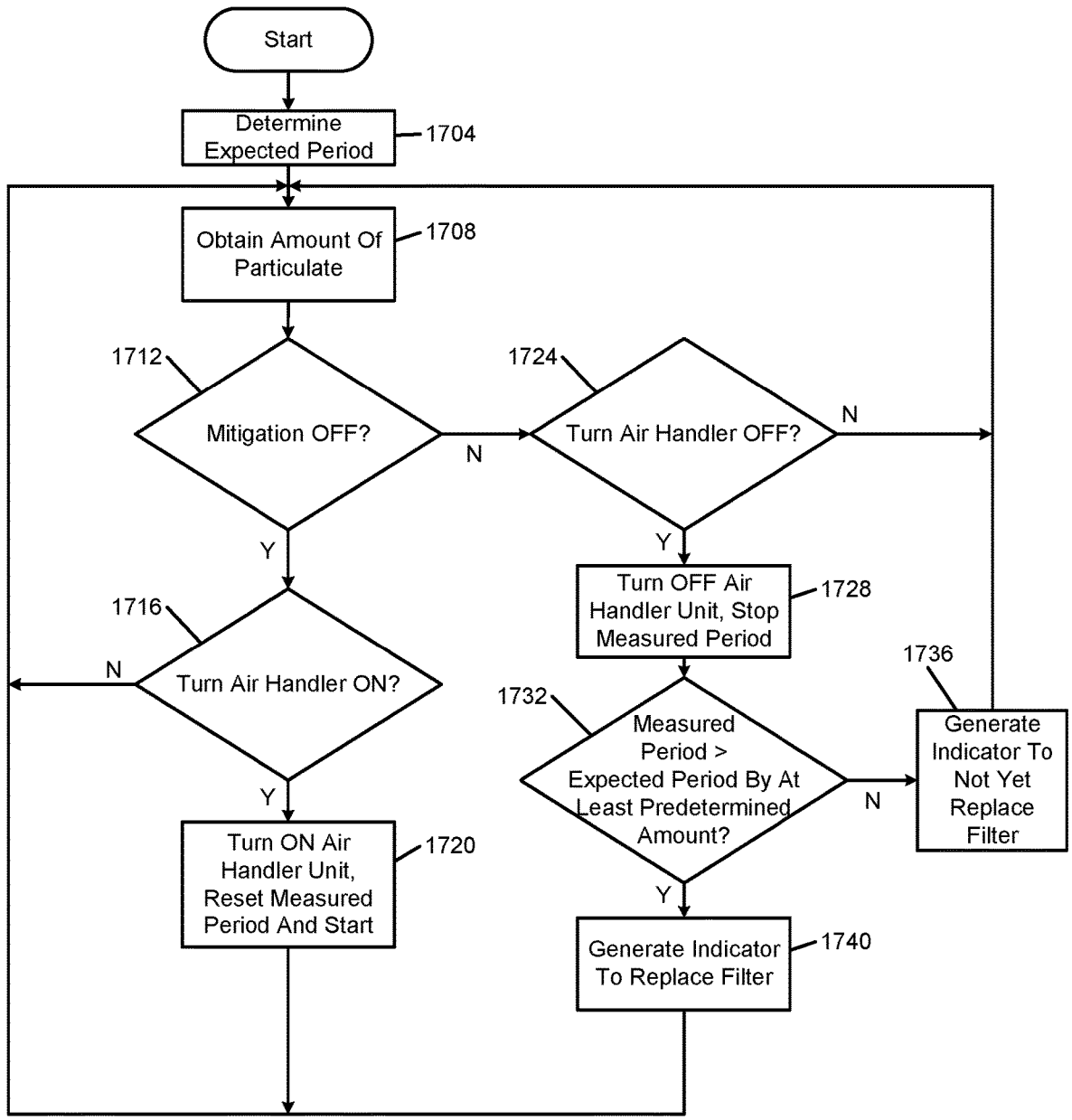
FIG. 17 includes a flowchart depicting an example method of indicating whether to replace a filter of an air handler unit.

FIG. 17 includes a flowchart depicting an example method of indicating whether to replace the filter 104 of the circulator blower 108. Control begins with 1704 where the time to capacity module 1016 determines the expected period of particulate mitigation events when the filter 104 is new, as described above. At 1708, the mitigation module 1004 receives the amount of particulate in the air. At 1712, the mitigation module 1004 determines whether the circulator blower 108 is presently off for particulate mitigation. If 1712 is true, control continues with 1716. If 1712 is false, control transfers to 1724, which is discussed further below.

At 1716, the mitigation module 1004 determines whether to turn the circulator blower 108 ON to mitigate the amount of particulate in the air, as discussed above. If 1716 is true, the mitigation module 1004 turns the circulator blower 108 ON at 1720. The timer module 1020 also resets the measured mitigation period and starts the measured mitigation period.

The measured mitigation period increases as time passes. Control returns to 1708. If 1716 is false, the mitigation module 1004 maintains the circulator blower 108 off, and control returns to 1708.

At 1724, the mitigation module 1004 determines whether to turn the circulator blower 108 OFF to stop mitigating particulate, as discussed above. If 1724 is true, control continues with 1728. If 1724 is false, the mitigation module 1004 leaves the circulator blower 108 ON, and control returns to 1708.

At 1728, the mitigation module 1004 turns the circulator blower 108 OFF, and the timer module 1020 stops the measured mitigation period. At 1732, the diagnostic module 1024 determines whether the measured mitigation period is greater than the expected period by at least the predetermined amount. If 1732 is true, the diagnostic module 1024 generates the indicator to replace the filter 104 of the circulator blower 108 at 1740, and control returns to 1708. For example, the diagnostic module 1024 may set the indicator to a first state. If 1732 is false, the diagnostic module 1024 generates the indicator to indicate that replacement of the filter 104 is not yet needed at 1736, and control returns to 1708. For example, the diagnostic module 1024 may set the indicator to a second state.

Figure 18:
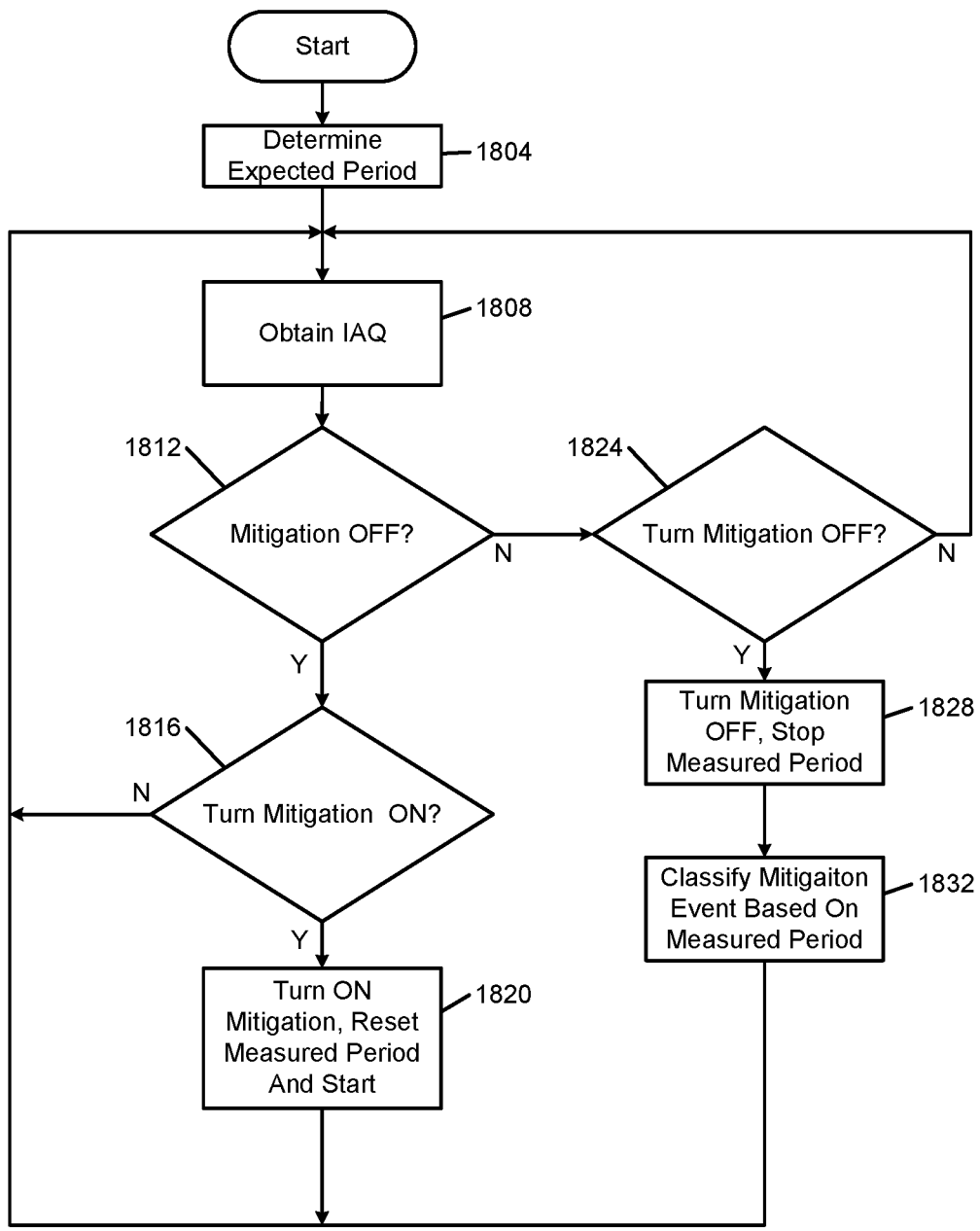
FIG. 18 includes a flowchart depicting an example method of classifying mitigation events.

FIG. 18 includes a flowchart depicting an example method of classifying mitigation events. Control begins with 1804 where the time to capacity module 1016 determines the expected period of a mitigation event (e.g., a particulate mitigation event, a VOC mitigation event, or a carbon dioxide mitigation event) of an IAQ parameter (e.g., particulate, VOCs, or carbon dioxide), as described above. At 1808, the mitigation module 1004 receives the IAQ parameter.

At 1812, the mitigation module 1004 determines whether the mitigation device(s) that mitigate the IAQ parameter are OFF for mitigation of that IAQ parameter. If 1812 is true, control continues with 1816. If 1812 is false, control transfers to 1824, which is discussed further below.

At 1816, the mitigation module 1004 determines whether to turn on the mitigation device(s) associated with the IAQ parameter to mitigate that IAQ parameter, as discussed above. If 1816 is true, the mitigation module 1004 turns on the mitigation device(s) at 1820. The timer module 1020 also resets the measured mitigation period and starts the measured mitigation period. The measured mitigation period increases as time passes. Control returns to 1808. If 1816 is false, the mitigation module 1004 maintains the mitigation device(s) off and control returns to 1808.

At 1824, the mitigation module 1004 determines whether to turn the mitigation device(s) OFF to stop mitigating the IAQ parameter, as discussed above. If 1824 is true, control continues with 1828. If 1824 is false, the mitigation module 1004 leaves the mitigation device(s) ON, and control returns to 1808.

At 1828, the mitigation module 1004 turns the mitigation device(s) associated with the IAQ parameter ON, and the timer module 1020 stops the measured mitigation period. At 1832, the event module 1028 determines the classification for the mitigation event based on the measured mitigation period, as discussed above. The event module 1028 stores the classification in memory.

Figure 21:
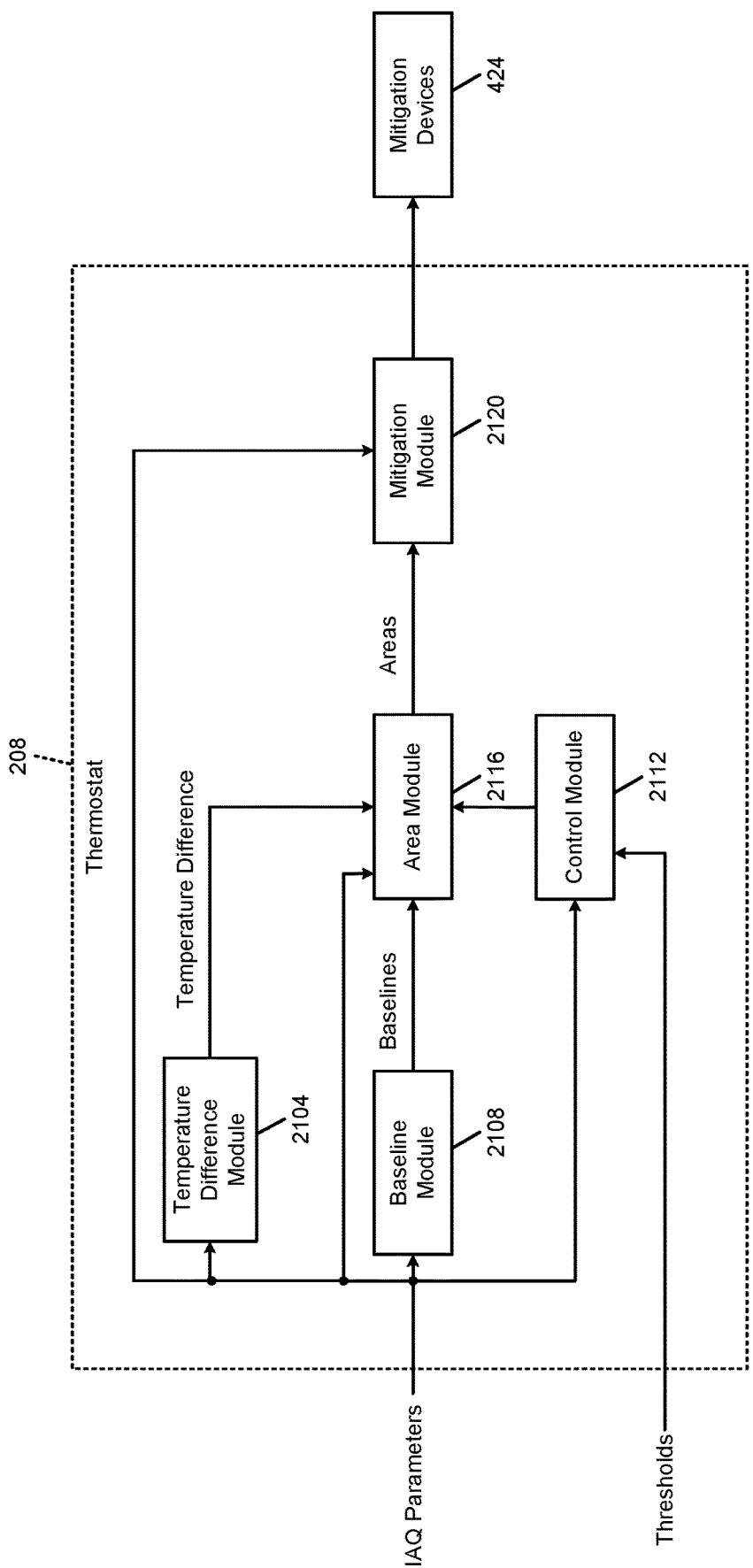
FIG. 21 includes a functional block diagram of an example implementation of a thermostat.

FIG. 21 includes a block diagram of an example implementation of a mitigation system using the example of the thermostat 208. While the example of the thermostat 208 is provided for purposes of discussion, the modules of the thermostat 208 may alternatively be implemented within the IAQ control module 404 or within a combination of the thermostat 208 and the IAQ control module 404.

A temperature difference module 2104 may determine a temperature difference within the building based on a difference between: (i) a highest temperature measured by one of the IAQ sensor modules and the thermostat 208; and (ii) a lowest temperature measured by one of the IAQ sensor modules and the thermostat 208. This provides a greatest difference in temperature between different locations where temperature is measured within the building. For example, the temperature difference module 2104 may set the temperature difference based on or equal to (i) minus (ii).

A baseline module 2108 determines baseline values (Baselines) for the IAQ parameters. For example, the baseline module 2108 may determine a baseline value of the temperature difference, a baseline high RH, a baseline low RH, a baseline amount of particulate, a baseline amount of VOCs, and a baseline amount of carbon dioxide.

The baseline module 2108 may determine the baseline values, for example, based on an average (e.g., non-weighted) of the respective IAQ parameters over a last predetermined window period before the present time. The predetermined window period may be calibratable and may be, for example, a week, a month, or another suitable period. For example, the baseline module 2108 may set the baseline temperature difference based on or equal to an average of all of the temperature differences over the last predetermined window period before the present time. The baseline module 2108 may set a baseline mid RH based on or equal to an average of all of the RHs measured using the RH sensor 312 over the last predetermined window period before the present time. The baseline module 2108 may set the baseline high RH based on or equal to the baseline mid RH plus a predetermined RH. The baseline module 2108 may set the baseline low RH based on or equal to the baseline mid RH minus the predetermined RH.

The baseline module 2108 may set the baseline amount of particulate based on or equal to an average of the amounts of particulate measured using the particulate sensor 316 over the last predetermined window period before the present time. In the example of the baseline amount of particulate, the baseline module 2108 may filter out (from the averaging) amounts of particulate measured by the particulate sensor 316 during excursions.

The baseline module 2108 may set the baseline amount of carbon dioxide based on or equal to an average of the amounts of carbon dioxide measured using the carbon dioxide sensor 324 over the last predetermined window period before the present time. In the example of the baseline amount of carbon dioxide, the baseline module 2108 may filter out (from the averaging) amounts of carbon dioxide measured by the carbon dioxide sensor 324 during excursions.

The baseline module 2108 may set the baseline amount of VOCs based on or equal to an average of the amounts of VOCs measured using the VOC sensor 320 over the last predetermined window period before the present time. In the example of the baseline amount of VOCs, the baseline module 2108 may filter out (from the averaging) amounts of carbon dioxide measured by the carbon dioxide sensor 324 during excursions. The baseline values therefore correspond to normalized values of the respective IAQ parameters within the building.

Figure 22:
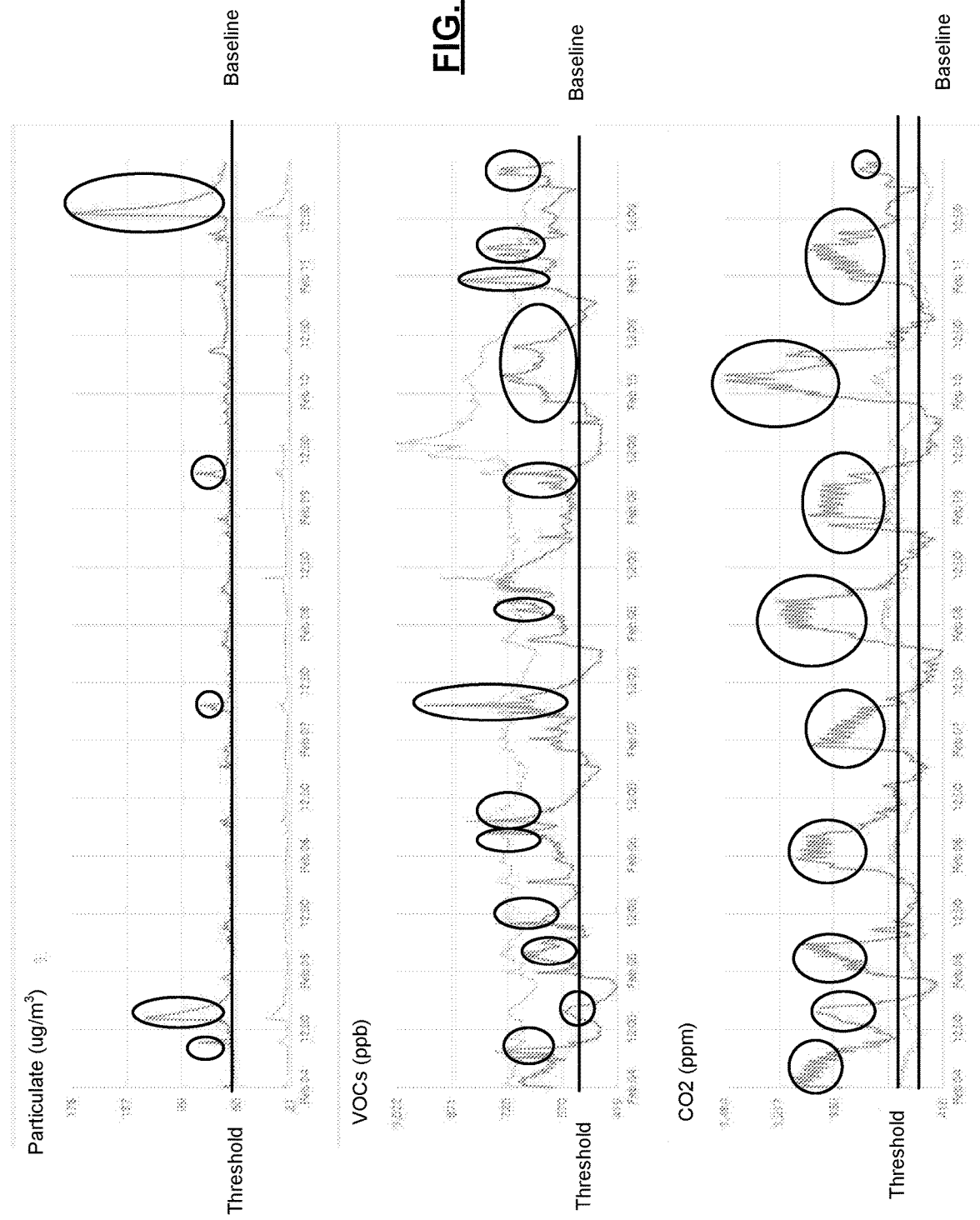
FIG. 22 includes an example graph of particulate, volatile organic compounds (VOCs), and carbon dioxide (CO2) over time.

FIG. 22 includes example graphs of amounts of particulate, amounts of VOCs, and amounts of carbon dioxide over time. Some example excursions are circled. The baseline module 2108 may identify excursions based on the existence of a magnitude of a rate of change (e.g., between consecutive values) that is greater than a predetermined rate of change. Excursions may include values between when a magnitudes of rate of change is greater than the predetermined rate of change and when the IAQ parameters returns to the baseline values.

Referring back to FIG. 21, a control module 2112 selectively enables, disables, and resets areas determined by an area module 2116. The area module 2116 determines areas between respective curves of the IAQ parameters and the respective baseline value for each of the IAQ parameters. For example, the area module 2116 determines an area between a curve formed by the temperature difference and the baseline temperature difference. The area module 2116 determines an area between a high RH curve formed by the RH and the baseline high RH. The area module 2116 determines an area between a low RH curve formed by the RH and the baseline low RH. The area module 2116 determines an area between a curve formed by the amount of particulate and the baseline amount of particulate. The area module 2116 determines an area between a curve formed by the amount of VOCs and the baseline amount of VOCs. The area module 2116 determines an area between a curve formed by the amount of carbon dioxide and the baseline amount of carbon dioxide.

2116 The control module 2112 may enable an area calculation for one of the IAQ parameters, for example, when the one of the IAQ parameters is greater than a respective predetermined value (or threshold). For example, the control module 2112 may enable the area calculation for the temperature difference when the temperature difference is greater than a predetermined temperature difference. The control module 2112 may enable the area calculation for high RH when the RH is greater than the third predetermined RH. The control module 2112 may enable the area calculation for low RH when the RH is less than the first predetermined RH. The control module 2112 may enable the area calculation for particulate matter when the amount of particulate matter is greater than the predetermined amount of particulate matter. The control module 2112 may enable the area calculation for VOCs when the amount of VOCs is greater than the predetermined amount of VOCs. The control module 2112 may enable the area calculation for carbon dioxide when the amount of carbon dioxide is greater than the predetermined amount of carbon dioxide.

In various implementations, to enable the area calculation for one of the IAQ parameters, the control module 2112 may also require a rate of change (ROC) of the one of the IAQ parameters to be greater than a predetermined enabling ROC that is greater than zero. The control module 2112 may disable the area calculation for one of the IAQ parameters, for example, when the ROC of the one of the IAQ parameters is less than the predetermined enabling ROC. The control module 2112 may reset the area calculation for one of the IAQ parameters, for example, when the one of the IAQ parameters is less than the respective baseline value or less than the respective baseline value (continuously) for at least a predetermined reset period. This may be performed for each of the IAQ parameters. In the example of RH, the control module 2112 may reset the area calculation for low RH when the RH is greater than the baseline low RH value or greater than the baseline low RH value (continuously) for at least a predetermined reset period.

When the area of one of the IAQ parameters is greater than a predetermined mitigation value, a mitigation module 2120 operates one or more of the mitigation devices 424 to adjust (e.g., decrease or increase in the example of low RH) that one of the IAQ parameters. For example, the mitigation module 2120 may turn the air cleaner/purifier 428 on when the area for particulate is greater than a predetermined particulate mitigation value. The mitigation module 2120 may leave the air cleaner/purifier 428 on until the amount of particulate measured by the particulate sensor 316 is less than the second predetermined amount of particulate. The mitigation module 2120 may turn the air cleaner/purifier 428 off when the amount of particulate measured by the particulate sensor 316 is less than the second predetermined amount of particulate. In various implementations, the mitigation module 2120 may vary the speed of the air cleaner/purifier 428 based on the amount of particulate measured by the particulate sensor 316. For example, the mitigation module 2120 may increase the speed of the air cleaner/purifier 428 as the amount of particulate (or the area under the curve) increases and vice versa.

The mitigation module 2120 may turn the humidifier 432 on when the area for low RH is greater than a predetermined low RH mitigation value. The mitigation module 2120 may leave the humidifier 432 on until the RH measured by the RH sensor 312 is greater than the second predetermined RH. The mitigation module 2120 may turn the humidifier 432 off when the RH measured by the RH sensor 312 is greater than the second predetermined RH.

The mitigation module 2120 may turn the dehumidifier 436 on when the area for high RH is greater than a predetermined high RH mitigation value. The mitigation module 2120 may leave the dehumidifier 436 on until the RH measured by the RH sensor 312 is less than the fourth predetermined RH. The mitigation module 2120 may turn the dehumidifier 436 off when the RH measured by the RH sensor 312 is less than the fourth predetermined RH.

The mitigation module 2120 may turn the ventilator 440 on when the area for VOCs is greater than a predetermined VOCs mitigation value. The mitigation module 2120 may leave the ventilator 440 on until the amount of VOCs measured by the VOC sensor 320 is less than the second predetermined amount of VOCs. The mitigation module 2120 may turn the ventilator 440 off when the amount of VOCs measured by the VOC sensor 320 is less than the second predetermined amount of VOCs.

As another example, the mitigation module 2120 may turn the ventilator 440 on when the area for carbon dioxide is greater than a predetermined carbon dioxide mitigation value. The mitigation module 2120 may leave the ventilator 440 on until the amount of carbon dioxide measured by the carbon dioxide sensor 324 is less than the second predetermined amount of carbon dioxide. The mitigation module 2120 may turn the ventilator 440 off when the amount of carbon dioxide measured by the carbon dioxide sensor 324 is less than the second predetermined amount of carbon dioxide.

When two or more of the areas are greater than the respective predetermined mitigation values, the mitigation module 2120 may mitigate the respective IAQ parameters, for example, in order according to the prioritization or in order of occurrence.

Using the areas (instead of comparisons of the IAQ values with the respective predetermined values) to trigger turning on of one or more of the mitigation devices 424 may decrease a possibility of mitigation, alerting, etc. in response to IAQ sensor noise and/or error. This may maintain or enhance user trust in the system. Under some circumstances, however, the presence of simultaneous rises in two or more of the IAQ parameters may be indicative of an actionable mitigation event and not IAQ sensor noise and/or error. The mitigation module 2120 may therefore (even when all of the areas are less than the respective predetermined mitigation values) operate one or more of the mitigation devices 424 when two or more of the IAQ parameters simultaneously increase above the respective predetermined values.

Figure 23:
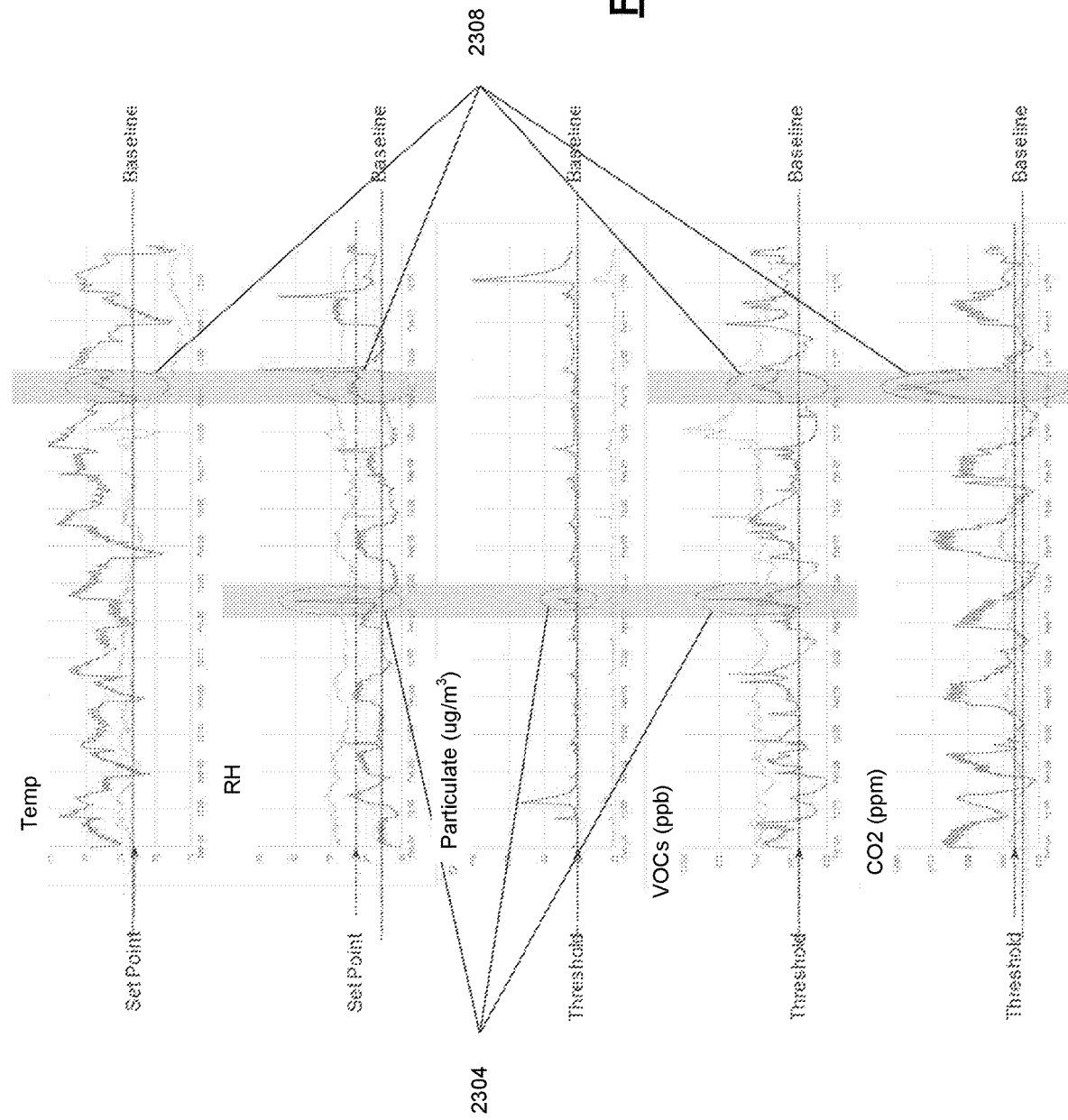
FIG. 23 includes an example graph of particulate, VOCs, CO2, temperature, and relative humidity (RH) over time.

FIG. 23 includes example graphs of temperature, RH, particulate, VOCs, and carbon dioxide over time. Concurrent rises in RH, amount of particulate, and amount of VOCs are present during period 2304. Concurrent rises in temperature, RH, amount of VOCs, and amount of carbon dioxide are present during period 2308.

Concurrent rises in more than two parameters are not as likely to be attributable to sensor noise and/or error. The mitigation module 2120 may therefore operate one or more of the mitigation devices 424 when two or more of the parameters are concurrently greater than the respective predetermined values. The mitigation module 2120 may mitigate the respective IAQ parameters, for example, in order according to the prioritization or in order according to when the IAQ parameters became greater than the respective predetermined values.

Figure 24:
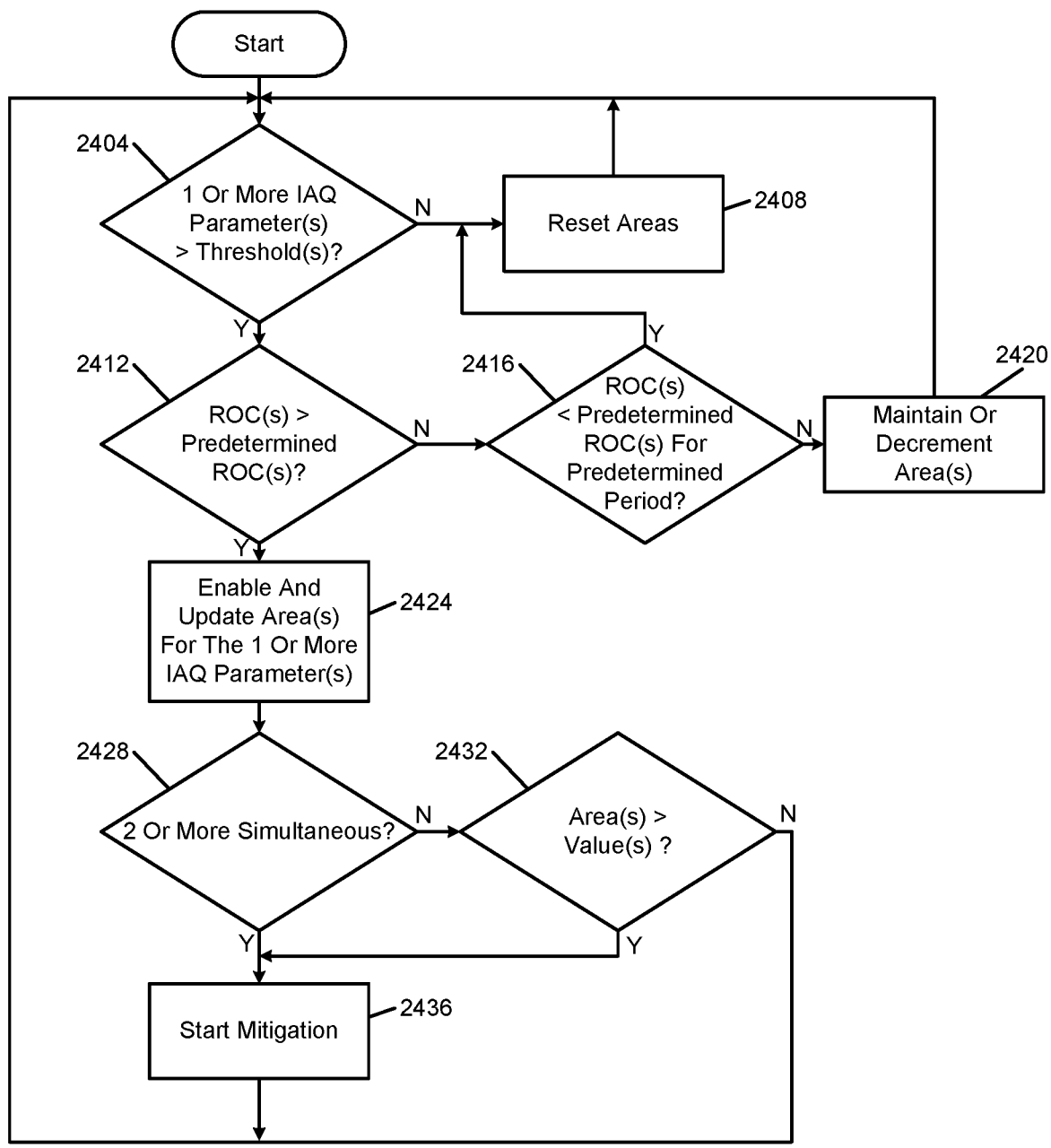
FIG. 24 includes a flowchart depicting an example method of mitigating IAQ parameters.

FIG. 24 includes a flowchart depicting an example method of mitigating IAQ parameters. Control begins with 2404 when the mitigation devices 424 are off. At 2404, the thermostat 208 may determine whether one or more of the IAQ parameters are greater than (or less than) the respective predetermined value (or threshold).

For example, the control module 2112 may determine whether the temperature difference is greater than the predetermined temperature difference. The predetermined temperature difference may be calibratable and may be set to, for example, approximately 2° F. or another suitable temperature. The control module 2112 may also determine whether the RH is greater than the third predetermined RH. The third predetermined RH may be calibratable and may be set to, for example, approximately 50 percent RH or another suitable value. The control module 2112 may also determine whether the RH is less than the first predetermined RH. The first predetermined RH is less than the third predetermined RH. The first predetermined RH may be calibratable and may be set to, for example, approximately 40 percent RH or another suitable value. The control module 2112 may also determine whether the amount of particulate matter is greater than the predetermined amount of particulate matter. The predetermined amount of particulate may be calibratable and may be set to, for example, approximately 12 µg/cubic meter or another suitable value. The control module 2112 may also determine whether the amount of VOCs is greater than the predetermined amount of VOCs. The predetermined amount of VOCs may be calibratable and may be set to, for example, approximately 500 ppb or another suitable value. The control module 2112 may also determine whether the amount of carbon dioxide is greater than the predetermined amount of carbon dioxide. The predetermined amount of carbon dioxide may be calibratable and may be set to, for example, approximately 1000 ppm or another suitable value. If 2404 is false, the control module 2112 may reset the areas determined by the area module 2116 and maintain the mitigation devices 424 off at 2408. Control may return to 2404. If 2404 is true, control may continue with 2412.

In various implementations, if the amount of particulate is greater than the predetermined amount of particulate, the control module 2112 may also determine whether the amount of particulate in the air outside the building is greater than the predetermined amount of particulate. If so, (and no other IAQ parameters are greater than or less than the respective predetermined values, control may transfer to 2408, as discussed above. If not, control may continue with 2412. The local data server 520 determines the amount of particulate in the air outside the building based on the geographical location of the building.

At 2412, the control module 2112 may determine whether the ROC(s) of the one(s) of the IAQ parameters (that are/were greater than or less than the respective predetermined values) is/are greater than the predetermined ROCs. For example, if the amount of particulate was greater than the predetermined amount of particulate and the amount of carbon dioxide was greater than the predetermined amount of carbon dioxide, the control module 2112 may determine whether the ROC of the amount of particulate is greater than a predetermined ROC of particulate and whether the ROC of the amount of carbon dioxide is greater than a predetermined ROC of carbon dioxide. Magnitudes of ROCs may be used in various implementations. If 2412 is true, control may continue with 2424, which is discussed further below. If 2412 is false, control may transfer to 2416.

At 2416, the control module 2112 may determine whether the ROC(s) of the one(s) of the IAQ parameters (that are/were greater than or less than the respective predetermined values) is/are less than the predetermined ROCs (e.g., continuously for at least a predetermined period). For example, if the amount of particulate was greater than the predetermined amount of particulate and the amount of carbon dioxide was greater than the predetermined amount of carbon dioxide, the control module 2112 may determine whether the ROC of the amount of particulate is less than the predetermined ROC of particulate and whether the ROC of the amount of carbon dioxide is less than the predetermined ROC of carbon dioxide. Magnitudes of ROCs may be used.

If 2416 is true, the control module 2112 may reset the areas of the one(s) of the IAQ parameters (that are/were greater than or less than the respective predetermined values) and 2408. The mitigation module 2120 may also turn off ones of the mitigation devices 424 in use to mitigate the IAQ parameters (that are/were greater than or less than the respective predetermined values) at 2408. If 2416 is false, the area module 2116 may maintain or decrement the area(s) at 2420, and control may return to 2404. The mitigation module 2120 may maintain ones of the mitigation devices 424 in use to mitigate the IAQ parameters (that are/were greater than or less than the respective predetermined values) at 2420.

At 2424, the control module 2112 enables and updates the area calculations for the one or more of the IAQ parameters that are greater than or less than the respective predetermined values. The area module 2116 determines the area(s) for the one or more of the IAQ parameters that are greater than or less than the respective predetermined values. The area module 2116 determines the areas for the IAQ parameters based on the IAQ parameters and the baseline values, respectively.

At 2428, the mitigation module 2120 determines whether two or more of the IAQ parameters simultaneously or approximately simultaneously (e.g., within a predetermined period) rose (e.g., had ROCs that are greater than the respective predetermined ROCs). If 2428 is true, the mitigation module 2120 turns on one or more of the mitigation devices 424 at 2436 to mitigate those two or more IAQ parameters to less than (or greater than in the case of low RH) the respective predetermined values. In various implementations, the mitigation module 2120 may mitigate the two or more IAQ parameters according to the prioritization. If 2428 is false, control may transfer to 2432. A likelihood of the occurrence of simultaneous or approximately simultaneous rises in two or more of the IAQ parameters may be low. Therefore, the mitigation module 2120 may turn on one or more of the mitigation devices 424, even though the areas may be less than the predetermined mitigation values.

At 2432, the mitigation module 2120 determines whether one or more of the area(s) are greater than the predetermined mitigation values. If 2432 is false, the mitigation module 2120 may return to 2404 and not turn on one, more than one, or any of the mitigation devices 424. If 2432 is true, the mitigation module 2120 may turn on one or more of the mitigation devices 424 at 2436 to mitigate the associated two or more IAQ parameters to less than (or greater than in the case of low RH) the respective predetermined values. Because mitigation is started when the area(s) are greater than the predetermined mitigation value(s), the mitigation module 2120 may avoid improperly beginning mitigation or issuing an alert in response to simply an IAQ parameter being greater than or less than a threshold. This may improve user experience and perception of the system as a whole.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An indoor air quality (IAQ) system for a building, comprising:
   an IAQ sensor module that is located within the building and that comprises at least one of:
   a temperature sensor configured to measure a temperature of air at the IAQ sensor module;
   a relative humidity (RH) sensor configured to measure a RH of the air at the IAQ sensor module;
   a particulate sensor configured to measure an amount of particulate of at least a predetermined size present in the air at the IAQ sensor module;
   a volatile organic compound (VOC) sensor configured to measure an amount of VOCs present in the air at the IAQ sensor module; and
   a carbon dioxide sensor configured to measure an amount of carbon dioxide present in the air at the IAQ sensor module; and
   at least one of a thermostat and an IAQ control module configured to, in response to a determination that one of the temperature, the RH, the amount of particulate, the amount of VOCs, and the amount of carbon dioxide is greater than a predetermined value while one of a plurality of mitigation devices is off:
   calculate a value of an area between:
   a baseline value; and
   a curve formed by the one of the temperature, the RH, the amount of particulate, the amount of VOCs, and the amount of carbon dioxide; and
   turn on the one of the plurality of mitigation devices when the value of the area is greater than a predetermined value.

2. The IAQ system of claim 1 wherein the mitigation devices include at least two of:
   an air handler unit of a heating, ventilation, and air conditioning (HVAC) system a blower of an air handler unit of the HVAC system of the building;
   a condenser unit of the HVAC system of the building;
   an air purifier configured to receive power via a standard wall outlet and to filter particulate from air within the building;
   a humidifier configured to humidify air within the building;
   a dehumidifier configured to dehumidify air within the building; and
   a ventilator configured to vent air out of the building from within the building.

3. The IAQ system of claim 1 wherein the at least one of the thermostat and the IAQ control module is configured to maintain the one of the plurality of mitigation devices off when the value of the area is less than the predetermined value.

4. The IAQ system of claim 1 wherein the at least one of the thermostat and the IAQ control module is configured to selectively turn on the one of the plurality of mitigation devices when at least two of the temperature, the RH, the amount of particulate, the amount of VOCs, and the amount of carbon dioxide are greater than respective predetermined values.

5. The IAQ system of claim 4 wherein the at least one of the thermostat and the IAQ control module is configured to maintain the one of the plurality of mitigation devices off when:
   only one of the temperature, the RH, the amount of particulate, the amount of VOCs, and the amount of carbon dioxide is greater than the predetermined value; and
   the value of the area is less than a predetermined value.

6. The IAQ system of claim 1 wherein the at least one of the thermostat and the IAQ control module is configured to selectively turn on at least one of the plurality of mitigation devices when:
   at least two of the temperature, the RH, the amount of particulate, the amount of VOCs, and the amount of carbon dioxide are greater than respective predetermined values; and
   the value of the area is less than a predetermined value.

7. The IAQ system of claim 1 wherein the at least one of the thermostat and the IAQ control module is configured to selectively turn on at least one of the plurality of mitigation devices when at least three of the temperature, the RH, the amount of particulate, the amount of VOCs, and the amount of carbon dioxide are greater than respective predetermined values.

8. A method, comprising:
   at least one of:
   by a temperature sensor of an indoor air quality (IAQ) sensor module within a building, measuring a temperature of air at the IAQ sensor module;
   by a relative humidity (RH) sensor of the IAQ sensor module within the building, measuring a RH of the air at the IAQ sensor module;
   by a particulate sensor of the IAQ sensor module within the building, measuring an amount of particulate of at least a predetermined size present in the air at the IAQ sensor module;
   by a volatile organic compound (VOC) sensor of the IAQ sensor module within the building, measuring an amount of VOCs present in the air at the IAQ sensor module; and
   by a carbon dioxide sensor of the IAQ sensor module within the building, measuring an amount of carbon dioxide present in the air at the IAQ sensor module; and
   in response to a determination that one of the temperature, the RH, the amount of particulate, the amount of VOCs, and the amount of carbon dioxide is greater than a predetermined value while one of a plurality of mitigation devices is off:
calculating a value of an area between:
   a baseline value; and
   a curve formed by the one of the temperature, the RH, the amount of particulate, the amount of VOCs, and the amount of carbon dioxide; and
turning on the one of the plurality of mitigation devices when the value of the area is greater than a predetermined value.

9. The method of claim 8 wherein the mitigation devices include at least two of:
   an air handler unit of a heating, ventilation, and air conditioning (HVAC) system a blower of an air handler unit of the HVAC system of the building;
   a condenser unit of the HVAC system of the building;
   an air purifier configured to receive power via a standard wall outlet and to filter particulate from air within the building;
   a humidifier configured to humidify air within the building;
   a dehumidifier configured to dehumidify air within the building; and
   a ventilator configured to vent air out of the building from within the building.

10. The method of claim 9 further comprising maintaining the one of the plurality of mitigation devices off when the value of the area is less than the predetermined value.

11. The method of claim 8 wherein selectively turning on the one of the plurality of mitigation devices includes selectively turning on the one of the plurality of mitigation devices when at least two of the temperature, the RH, the amount of particulate, the amount of VOCs, and the amount of carbon dioxide are greater than respective predetermined values.

12. The method of claim 11 further comprising maintaining the one of the plurality of mitigation devices off when:
   only one of the temperature, the RH, the amount of particulate, the amount of VOCs, and the amount of carbon dioxide is greater than the predetermined value; and
   the value of the area is less than a predetermined value.

13. The method of claim 8 wherein selectively turning on the one of the plurality of mitigation devices includes selectively turning on at least one of the plurality of mitigation devices when:
   at least two of the temperature, the RH, the amount of particulate, the amount of VOCs, and the amount of carbon dioxide are greater than respective predetermined values; and
   the value of the area is less than a predetermined value.

14. The method of claim 8 wherein selectively turning on the one of the plurality of mitigation devices includes selectively turning on at least one of the plurality of mitigation devices when at least three of the temperature, the RH, the amount of particulate, the amount of VOCs, and the amount of carbon dioxide are greater than respective predetermined values.

* * * * *